United States Patent
Conger et al.

(10) Patent No.: US 7,527,020 B2
(45) Date of Patent: *May 5, 2009

(54) CONTAINMENT SYSTEMS AND COMPONENTS FOR ANIMAL HUSBANDRY

(75) Inventors: Dee L. Conger, La Jolla, CA (US); Thomas M. Perazzo, San Diego, CA (US); Matthew D. d'Artenay, San Diego, CA (US); Asa Cannell, Encinitas, CA (US)

(73) Assignee: Innovive, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/300,664

(22) Filed: Dec. 13, 2005

(65) Prior Publication Data

US 2006/0124072 A1    Jun. 15, 2006

Related U.S. Application Data

(60) Provisional application No. 60/635,756, filed on Dec. 13, 2004, provisional application No. 60/690,811, filed on Jun. 14, 2005, provisional application No. 60/717,826, filed on Sep. 16, 2005, provisional application No. 60/734,229, filed on Nov. 7, 2005, provisional application No. 60/734,189, filed on Nov. 7, 2005.

(51) Int. Cl.
*A01K 1/03* (2006.01)
*A01K 39/04* (2006.01)
(52) U.S. Cl. ...................... 119/417; 119/456
(58) Field of Classification Search ......... 119/416–521, 119/751
See application file for complete search history.

(56) References Cited

U.S. PATENT DOCUMENTS

| 513,557 | A |   | 1/1894 | Cobb |
|---|---|---|---|---|
| 2,554,086 | A |   | 5/1951 | Block |
| 3,002,492 | A |   | 10/1961 | Naturale |
| 3,122,127 | A | * | 2/1964 | Shechmeister et al. ...... 119/417 |
| 3,127,872 | A |   | 4/1964 | Finkel |
| 3,163,149 | A |   | 12/1964 | Ivey |
| 3,212,474 | A |   | 10/1965 | Higgins et al. |
| 3,302,615 | A |   | 2/1967 | Tietje |
| 3,334,614 | A |   | 8/1967 | Gass et al. |
| 3,500,831 | A |   | 3/1970 | Schaar |
| 3,518,971 | A |   | 7/1970 | Gass et al. |
| 3,524,431 | A | * | 8/1970 | Graham et al. ............... 119/496 |

(Continued)

FOREIGN PATENT DOCUMENTS

EP    0233134    8/1987

(Continued)

OTHER PUBLICATIONS

JP4023929 English Abstract.

(Continued)

*Primary Examiner*—Michael Carone
*Assistant Examiner*—Joshua J Michener
(74) *Attorney, Agent, or Firm*—Grant Anderson LLP

(57) ABSTRACT

Provided are animal containment systems and components, including single-use animal containment cages and modular rack units. Also provided are methods for assembling and using components of the animal containment systems.

18 Claims, 41 Drawing Sheets

U.S. PATENT DOCUMENTS

| | | | |
|---|---|---|---|
| 3,537,428 A * | 11/1970 | Montgomery | 119/419 |
| 3,547,309 A | 12/1970 | Pusey et al. | |
| 3,649,464 A | 3/1972 | Freeman | |
| 3,718,120 A | 2/1973 | Schwarz | |
| 3,731,657 A | 5/1973 | Alessio | |
| 3,776,195 A | 12/1973 | Willinger | |
| 3,924,571 A | 12/1975 | Holman | |
| 3,965,865 A | 6/1976 | Kundikoff | |
| 4,023,529 A | 5/1977 | Landy | |
| 4,043,256 A | 8/1977 | VanHuis | |
| 4,252,080 A | 2/1981 | Gioia et al. | |
| 4,343,261 A * | 8/1982 | Thomas | 119/418 |
| 4,365,590 A | 12/1982 | Ruggieri et al. | |
| 4,367,728 A | 1/1983 | Mutke | |
| 4,402,280 A * | 9/1983 | Thomas | 119/418 |
| 4,448,150 A | 5/1984 | Catsimpoolas | |
| 4,480,587 A * | 11/1984 | Sedlacek | 119/419 |
| 4,593,650 A | 6/1986 | Lattuada | |
| 4,640,228 A | 2/1987 | Sedlacek et al. | |
| 4,690,100 A * | 9/1987 | Thomas | 119/419 |
| 4,699,088 A | 10/1987 | Murray et al. | |
| 4,699,188 A | 10/1987 | Baker et al. | |
| 4,728,006 A | 3/1988 | Drobish et al. | |
| 4,774,631 A | 9/1988 | Okuyama et al. | |
| 4,779,566 A | 10/1988 | Morris et al. | |
| 4,798,171 A | 1/1989 | Peters et al. | |
| 4,844,018 A * | 7/1989 | Niki | 119/72.5 |
| 4,892,209 A | 1/1990 | Dorfman et al. | |
| 4,940,017 A | 7/1990 | Niki et al. | |
| 4,941,431 A | 7/1990 | Anderson et al. | |
| 4,976,219 A * | 12/1990 | Goguen et al. | 119/496 |
| 4,991,635 A | 2/1991 | Ulm | |
| 5,000,120 A | 3/1991 | Coiro, Sr. et al. | |
| 5,003,922 A | 4/1991 | Niki et al. | |
| 5,031,515 A | 7/1991 | Niemela et al. | |
| 5,044,316 A | 9/1991 | Thomas | |
| 5,048,459 A | 9/1991 | Niki et al. | |
| 5,148,766 A | 9/1992 | Coiro, Sr. et al. | |
| 5,163,380 A | 11/1992 | Duffy | |
| 5,165,362 A | 11/1992 | Sheaffer et al. | |
| 5,213,059 A | 5/1993 | Krantz | |
| 5,307,757 A | 5/1994 | Coiro, Sr. et al. | |
| 5,316,172 A | 5/1994 | Apps et al. | |
| 5,331,920 A | 7/1994 | Coiro, Sr. et al. | |
| 5,349,923 A | 9/1994 | Sheaffer et al. | |
| 5,385,118 A | 1/1995 | Coiro, Sr. et al. | |
| 5,400,744 A | 3/1995 | Coiro, Sr. et al. | |
| 5,407,648 A | 4/1995 | Allen et al. | |
| 5,429,800 A | 7/1995 | Miraldi et al. | |
| 5,474,024 A | 12/1995 | Hallock | |
| 5,513,596 A | 5/1996 | Coiro, Sr. et al. | |
| 5,567,364 A | 10/1996 | Philips | |
| 5,572,403 A | 11/1996 | Mills | |
| 5,572,953 A * | 11/1996 | Phelan et al. | 119/496 |
| 5,605,240 A | 2/1997 | Guglielmini | |
| 5,608,209 A | 3/1997 | Matsuda | |
| 5,624,037 A | 4/1997 | Kozo | |
| 5,655,478 A | 8/1997 | Kiera | |
| 5,657,891 A | 8/1997 | Bilani et al. | |
| 5,664,704 A | 9/1997 | Meadows et al. | |
| 5,694,885 A | 12/1997 | Deitrich et al. | |
| 5,717,202 A | 2/1998 | Matsuda | |
| 5,771,841 A | 6/1998 | Boor | |
| 5,780,130 A | 7/1998 | Hansen et al. | |
| 5,797,350 A | 8/1998 | Smith | |
| 5,832,876 A * | 11/1998 | Brown et al. | 119/706 |
| 5,865,144 A * | 2/1999 | Semenuk | 119/456 |
| 5,894,816 A * | 4/1999 | Coiro et al. | 119/417 |
| 5,915,332 A | 6/1999 | Young | |
| 5,924,384 A * | 7/1999 | Deitrich et al. | 119/419 |
| 5,954,013 A * | 9/1999 | Gabriel et al. | 119/419 |
| 5,954,237 A | 9/1999 | Lampe et al. | |
| 5,996,535 A | 12/1999 | Semenuk et al. | |
| 6,021,042 A | 2/2000 | Anderson et al. | |
| 6,029,604 A | 2/2000 | de Vosjoli | |
| 6,092,487 A | 7/2000 | Niki et al. | |
| 6,112,701 A | 9/2000 | Faith et al. | |
| 6,138,610 A | 10/2000 | Niki | |
| 6,142,732 A | 11/2000 | Chou et al. | |
| 6,158,387 A | 12/2000 | Gabriel et al. | |
| 6,164,311 A | 12/2000 | Momont | |
| 6,217,437 B1 | 4/2001 | Murray et al. | |
| 6,227,146 B1 * | 5/2001 | Gabriel et al. | 119/419 |
| 6,257,171 B1 | 7/2001 | Rivard | |
| 6,293,227 B1 * | 9/2001 | Ver Hage | 119/417 |
| 6,295,826 B1 | 10/2001 | Lee | |
| 6,295,950 B1 | 10/2001 | Deitrich et al. | |
| 6,302,059 B1 | 10/2001 | Faith et al. | |
| 6,308,660 B1 | 10/2001 | Coiro, Sr. et al. | |
| 6,311,644 B1 | 11/2001 | Pugh | |
| 6,341,581 B1 * | 1/2002 | Gabriel et al. | 119/419 |
| 6,357,393 B1 | 3/2002 | Coiro, Sr. et al. | |
| 6,394,032 B1 | 5/2002 | Coiro, Sr. et al. | |
| 6,396,688 B1 | 5/2002 | Davies et al. | |
| 6,407,918 B1 | 6/2002 | Edmunds et al. | |
| 6,408,794 B1 | 6/2002 | Coiro, Sr. et al. | |
| 6,457,437 B1 | 10/2002 | Frasier et al. | |
| 6,463,397 B1 | 10/2002 | Cohen | |
| 6,517,428 B1 | 2/2003 | Murray et al. | |
| 6,532,901 B2 | 3/2003 | Isley | |
| 6,543,387 B1 * | 4/2003 | Stein | 119/419 |
| 6,553,939 B1 | 4/2003 | Austin et al. | |
| 6,571,738 B2 | 6/2003 | Rivard | |
| 6,572,819 B1 | 6/2003 | Wu et al. | |
| 6,584,936 B2 | 7/2003 | Rivard | |
| 6,588,373 B1 * | 7/2003 | Strzempko et al. | 119/496 |
| 6,612,260 B1 * | 9/2003 | Loyd et al. | 119/418 |
| 6,729,266 B1 * | 5/2004 | Gabriel et al. | 119/419 |
| 6,739,846 B2 | 5/2004 | Stoddard et al. | |
| 6,810,833 B2 | 11/2004 | Bonner et al. | |
| 6,853,946 B2 | 2/2005 | Cohen et al. | |
| 6,998,980 B2 | 2/2006 | Ingley, III | |
| 7,086,350 B2 | 8/2006 | Tecott | |
| 7,114,463 B2 * | 10/2006 | Donohoe | 119/472 |
| 7,126,471 B2 | 10/2006 | Ahmed | |
| 7,131,398 B2 | 11/2006 | Cohen et al. | |
| 7,146,931 B2 | 12/2006 | Gabriel et al. | |
| 7,191,734 B2 * | 3/2007 | Strzempko et al. | 119/496 |
| 7,237,509 B2 | 7/2007 | Bonner | |
| 7,389,744 B2 | 6/2008 | Zhang | |
| 2002/0100429 A1 * | 8/2002 | Wade | 119/452 |
| 2002/0195060 A1 | 12/2002 | Dollahan | |
| 2003/0200933 A1 | 10/2003 | Park | |
| 2004/0018105 A1 | 1/2004 | Stoddard et al. | |
| 2004/0191437 A1 | 9/2004 | Asayama et al. | |
| 2005/0066908 A1 * | 3/2005 | Park | 119/419 |
| 2005/0076852 A1 | 4/2005 | Campiotti et al. | |
| 2005/0145191 A1 | 7/2005 | Cohen et al. | |
| 2005/0193957 A1 | 9/2005 | Oshima et al. | |
| 2005/0241591 A1 | 11/2005 | Ingley, III | |
| 2006/0011143 A1 | 1/2006 | Drummond et al. | |
| 2006/0111680 A1 | 5/2006 | Spada et al. | |
| 2006/0278171 A1 | 12/2006 | Conger et al. | |
| 2007/0169714 A1 | 7/2007 | Conger et al. | |
| 2007/0169715 A1 | 7/2007 | Conger et al. | |
| 2007/0169716 A1 | 7/2007 | Conger et al. | |
| 2007/0169717 A1 | 7/2007 | Conger et al. | |
| 2007/0169718 A1 | 7/2007 | Conger et al. | |
| 2007/0175399 A1 | 8/2007 | Conger et al. | |
| 2007/0175404 A1 | 8/2007 | Conger et al. | |
| 2007/0181070 A1 | 8/2007 | Conger et al. | |
| 2007/0181074 A1 | 8/2007 | Conger et al. | |
| 2007/0181075 A1 | 8/2007 | Conger et al. | |

| | | |
|---|---|---|
| 2007/0256643 A1 | 11/2007 | Coiro et al. |

FOREIGN PATENT DOCUMENTS

| | | |
|---|---|---|
| EP | 0279076 | 12/1987 |
| FR | 2696423 A1 | 4/1994 |
| FR | 2824703 | 11/2002 |
| JP | 56-3770 | 1/1981 |
| JP | 62-7852 | 1/1987 |
| JP | 04-9555 | 1/1992 |
| JP | 4-023929 | 1/1992 |
| JP | 4-267826 | 9/1992 |
| JP | 05005499 | 1/1993 |
| JP | 9-168346 | 6/1997 |
| JP | 2003-088263 | 3/2003 |
| JP | 2005-095004 | 4/2005 |
| WO | WO9218084 | 10/1992 |
| WO | WO03051106(A1) | 6/2003 |
| WO | WO03059048 | 7/2003 |

OTHER PUBLICATIONS

Ancare Catalog, "Systems and Supplies for Animal Care," Sep. 2006., from World Wide Web URL "ancare.com".
U.S. Appl. No. 11/695,084, filed Apr. 2, 2007, Conger et al.
U.S. Appl. No. 11/695,087, filed Apr. 2, 2007, Conger et al.
U.S. Appl. No. 11/695,090, filed Apr. 2, 2007, Conger et al.
U.S. Appl. No. 11/868,877, filed Oct. 8, 2007, Conger et al.
Marketing Materials From Trade Show Distributed Nov. 7, 2005.
Web Page describing Nalgene animal cage cover printed from VWR Catalogue on world wide web Dec. 5, 2006.
International Search Report/Written Opinion for PCT/US2007/018255 mailed: Jun. 16, 2008.
International Search Report/Written Opinion for PCT/US2006/23038 mailed: May 28, 2008.
International Search Report/Written Opinion for PCT/US2005/44977 mailed: Sep. 30, 2008.
International Search Report/Written Opinion for PCT/US2006/23038 mailed: May 28, 2008.
International Search Report/Written Opinion for PCT/US2008/059953 mailed: Jul. 16, 2008.
Claim Translation for Japanese Patent Document JP56-3770, 2009.
Statement under 37 C.F.R. section 1.98(a)(3) for Japanese Patent Document JP56-3770, 2009.
Claim Translation for Japanese Patent Document JP62-7852, 2009.
Statement under 37 C.F.R. section 1.98(a)(3) for Japanese Patent Document JP62-7852, 2009.
Claim Translation for Japanese Patent Document JP04-9555, 2009.
Statement under 37 C.F.R. section 1.98(a)(3) for Japanese Patent Document JP04-9555, 2009.

* cited by examiner

CONTAINMENT SYSTEMS AND COMPONENTS FOR ANIMAL HUSBANDRY

RELATED APPLICATIONS

This patent application claims the benefit of U.S. Provisional Patent Application Nos. 60/635,756, 60/690,811 and 60/717,826 filed on 13 Dec. 2004, 14 Jun. 2005 and 16 Sep. 2005, respectively, entitled "Animal Containment Systems And Components," naming Thomas Perazzo and Dee Conger as inventors, respectively. This patent application also claims the benefit of U.S. Provisional Patent Application Nos. 60/734,229 and 60/734,189, each filed on 7 Nov. 2005, entitled "Containment Systems And Components For Animal Husbandry," naming Thomas Perazzo and Dee Conger as inventors, respectively. The content and subject matter of each of these patent applications is hereby incorporated by reference in its entirety, including all text and drawings.

FIELD OF THE INVENTION

Described herein are containment systems and components for housing animals. Such systems and components are useful in animal husbandry, for example, such as for maintaining, breeding, observing and studying animals.

DESCRIPTION

Animal containment systems are utilized in a variety of applications, such as for animal transportation, breeding and maintenance. Animals contained in the systems often are laboratory animals such as rodents, and such animals often are contained in a vivarium. Containment systems often include animal cages in which the animals are housed and a rack unit onto which cages are mounted. Animals contained in such systems emit several gaseous and particulate contaminates that are health risks to housed animals and human personnel maintaining the systems. Accordingly, cages generally are designed for multiple use, which requires they are washed and sterilized about every week for two years or more in an animal containment facility, for example, especially in a facility practicing Good Laboratory Procedures (GLPs). Multiple-use cages generally have relatively thick walls and components often are constructed from resilient materials that can withstand multiple washes and sterilizations. Air often is delivered to cages by a low-pressure system (e.g., a pressure of less than 0.5 inches of water). Typical rack units generally are not modular and are not readily disassembled. As a result, large pieces of equipment are required to cleanse the rack units.

Due to these aspects of multiple-use and non-modular animal containment systems, a significant portion of animal containment resources is not utilized to house animals. Instead, resources for washing and sterilizing multiple-use components and non-modular components represent a comparatively large fraction of the total resources required for animal containment. Also, airflow delivered by low pressure systems often is not readily adjustable and a range of airflows often cannot be provided to cages. Further, typical multiple-use cage designs often limit air exchange within the cage volume and air often is not exchanged at efficient rates. Multiple-use cage designs also can present disadvantages with respect to contamination, such as requiring contaminated air filter handling or exposure of cage components to the environment when a cage impacts a surface (e.g., a cage is dropped by a user or falls from an elevation), for example, which bear especially on handling of animals in higher biosafety level animal facilities.

Provided herein are animal containment systems that comprise disposable, single-use components, which do not require washing and sterilization for re-use. The animal containment systems and components can be used for transportation of animals and can be used for containment of animals for research and breeding, for example. Cages of such systems often comprise relatively thin walls constructed from a polymer. Features of these cages described herein substantially reduce or prevent the possibility contained animals damage the relatively thin polymeric material (e.g., gnawing damage). The low weight and relative flexibility of single-use cages, as compared to thicker, rigid multiple-use cages, provide for cages less prone to breakage or disassembly upon impact. These features reduce the likelihood that cage contents (e.g., animals, animal contaminants and any harmful substances in the cage) are exposed to the outside environment upon impact (e.g., cage bases and covers remain sealed after impact). The provided cages and associated components also can be efficiently nested, thereby advantageously reducing required storage space. Ventilated systems provided herein efficiently exchange air in cages and efficiently maintain temperature. Such ventilated systems can be operated at relatively high air pressures and without adjustable valves, providing for airflow and air pressure uniformity and efficient airflow control across a range of air pressures. Also provided are animal containment systems that comprise modular components, often components that are readily disassembled. In some embodiments, rack units comprise one or more attachable and detachable rack modules that are readily disassembled for washing. These and other features of the components disclosed herein can reduce the amount of resources required for animal containment, can enhance quality of care afforded to the housed animals, and can minimize health risks to human personnel who care for or study the contained animals.

These and other aspects are described hereafter in the following description, claims and drawings.

BRIEF DESCRIPTION OF THE DRAWINGS

The drawings illustrate embodiments of the invention.

FIG. 2 shows individual parts that comprise a cage assembly embodiment.

FIG. 3 is a cross sectional view taken at the center of the water bottle in an embodiment. FIG. 104 is a cross sectional view taken through the food tray (103) of an embodiment.

FIG. 5 is a cross sectional view taken trough the end of the food trough of an embodiment. FIG. 6 is a cross sectional view taken through the end of the food trough, showing an orientation of the trough engaged with the cage base. FIG. 7A is a cross sectional view taken through the middle of the cage in an embodiment, and FIG. 7B is an expanded view of the encircled region of FIG. 7A. FIG. 8 is a cross sectional view taken through the middle of a food trough embodiment, and shows airflow streamlines caused by food trough.

FIG. 16 is an isometric view of a food trough embodiment. FIG. 17A is a top view of the food trough embodiment. FIG. 17B is a side view of a food trough embodiment.

FIG. 18A is an isometric view of a water bottle embodiment. Tapered shoulder (155) seals with the vertical surface of the top cover to form a seal. Tapered wall (105) allows for increased water capacity. FIG. 18B is a front view of the water bottle embodiment. Surface (157) is slightly tapered confers added strength to the neck region of the bottle. Tapered wall (158) allows for increased water capacity.

ANIMAL CAGES

Figure 1:
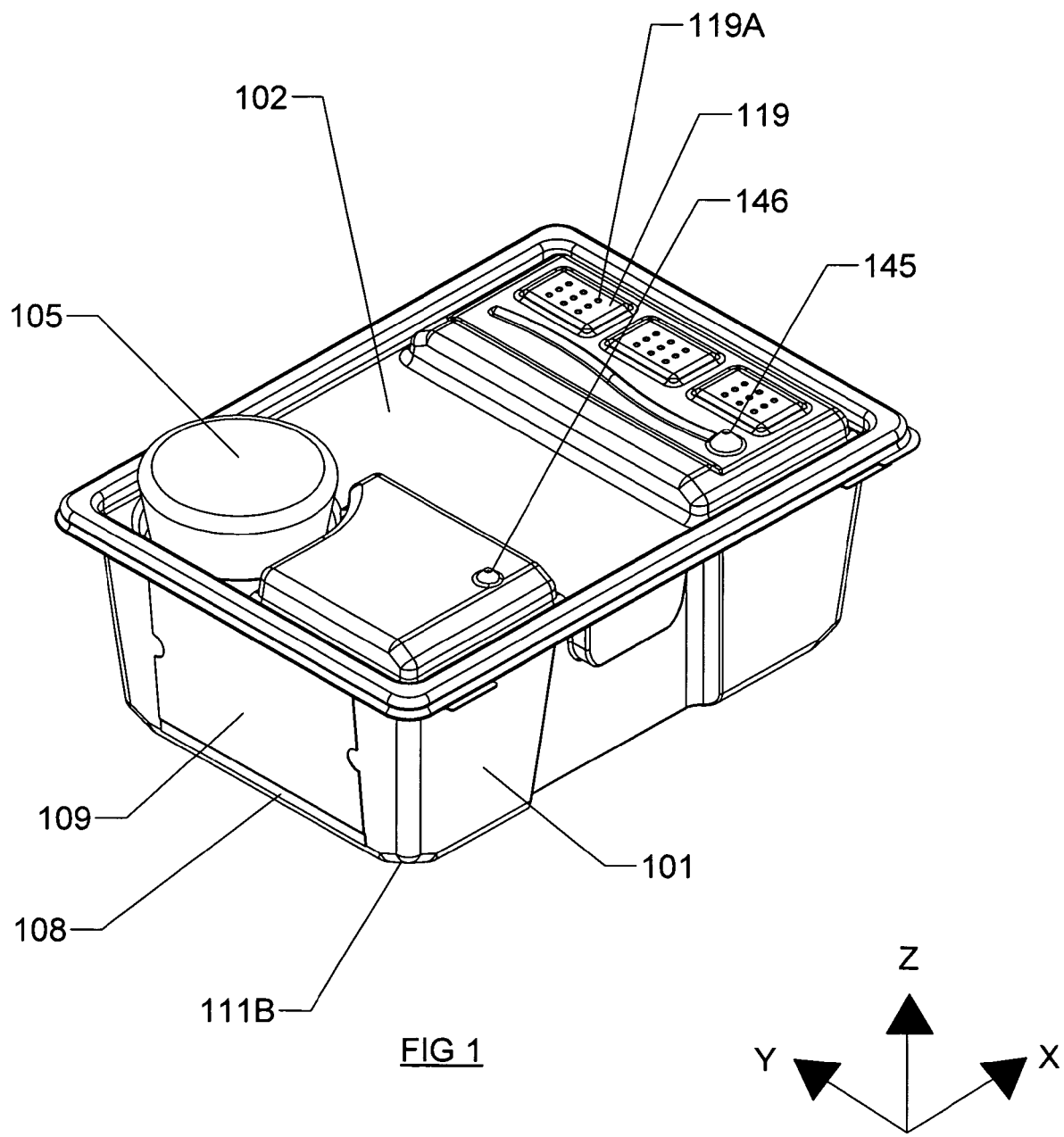
FIG. 1 shows a top isometric view of assembled cage embodiments, such as single-use cage embodiments. The figure shows a general overview of an assembled cage from the upper front perspective.

Animal cage units often comprise a cage unit base member, a cover member, and an optional insertion member. An animal cage base sometimes is provided separately from a cover, the cover often can be sealingly attached to the cage base and the cover often is readily detachable from the base. An animal and/or optional insertion member often is placed in a cage base before a cover is sealingly attached.

A variety of animals can be contained within cages described herein. Rodents often are contained within such units, including but not limited to mice, rats, hamsters, gerbils, guinea pigs, chinchillas and rabbits. The animal can be transgenic, inbred, immunodeficient, lack one or more functional genes (e.g., knock-out animal), and/or can include one or more xenografts. Examples of immunodeficient mice include nude mice and severe combined immune deficiency (SCID) mice. Cells from cultured cell lines, cultured primary cells or directly from another animal or tissue (e.g., biopsy) may be utilized for xenografts (e.g., cancer cells from a human). The animals contained in cages and systems described herein can be utilized in a variety of manners, including but not limited to studying cancer and other diseases, assessing parameters of potential drugs (e.g., toxicity, efficacy, maximum tolerated doses, effective doses and other pharmacokinetic parameters), producing and isolating antibodies and producing and isolating cells useful for preparing hybridomas, for example.

Cage Bases

A cage base is of any geometry suitable for housing animals, such as cylindrical, substantially cylindrical, conical, rectangular, square, cubic, rhomboid and the like, for example. A cage base often comprises a bottom member that supports a plurality of sidewall members (e.g., four sidewall members). One sidewall member often is referred to as the "front sidewall member" and the opposite sidewall member often is referred to as the "rear sidewall member." Opposing sidewall members sometimes are parallel, substantially parallel, not parallel, rhomboid, substantially rhomboid or a combination thereof. In some embodiments, opposing sidewalls are not parallel, and are not vertical with respect to the bottom. In such embodiments, a sidewall, and sometimes all sidewalls, are at a non-90 degree angle with respect to the bottom, such as an angle between about 91 degrees and about 105 degrees, an angle of about 92 degrees to about 98 degrees or an angle of about 95 degrees, for example. Such angled sidewall configurations (with respect to the bottom) can promote cage base nesting (described in greater detail hereafter).

Each edge junction or corner junction of a wall or walls and/or the bottom has a geometry convenient for manufacture and use, such as a sharp edge, smooth edge or rounded edge. It has been determined that certain corner and edge geometries in animal containment components advantageously reduce or abrogate the possibility of damage caused by animal residents (e.g., gnawing damage by rodents). This resistance to damage caused by contained animals is especially applicable to single-use containment components having thin polymer walls (e.g., about 0.01 inches to about 0.08 inches). Damage resistant edge and corner orientations have been determined based upon a combination of (i) angle of edge or corner surfaces (in degrees) and (ii) edge or corner radius (in inches). The angle alpha between two surfaces is measured from the side of the surfaces on which an animal resides. When alpha is less than 180 degrees, the edge or corner minimum radius may be zero. When alpha is between 180 degrees and 360 degrees, a minimum radius can be determined by the following equation:

minimum radius=0.25/(tan((pi/360)(360−alpha))).

For example, minimum edge and corner radii of 0.02, 0.04, 0.07, 0.09, 0.12, 0.14, 0.18, 0.21, 0.25, 0.30, 0.36, 0.43, 0.54, 0.69, 0.93, 1.42, 2.86 and 5.73 inches often are incorporated when the corresponding angle alpha is 190, 200, 210, 220, 230, 240, 250, 260, 270, 280, 290, 300, 310, 320, 330, 340, 350 and 355 degrees, respectively, in accordance with this relation. Thus, provided are edge and corner angle/minimum radius combinations in accordance with the above relation.

Thus, a cage base often comprises rounded junctions of a suitable radius, which can minimize damage caused by gnawing or clawing of housed animals, for example. Thus in some embodiments, bottom corners, each formed at the junction of the bottom and two sidewalls, often are not sharp corners and often are smooth corners defined by a radius. Each corner in some embodiments is effectively split into multiple edges (e.g., three effective corners (111B) as shown in the FIG. 1), which can improve crumple resistance to impact. Crumple resistance to impact provides benefits of maintaining nesting efficiency, reducing potential damage caused by animal gnawing (e.g., impact can crumple a corner and introduce a sharp edge on which an animal may gnaw), and maintaining cage integrity upon impact (e.g., not exposing the cage interior to the outside environment). In certain embodiments, a corner is effectively split into 10, 9, 8, 7, 6, 5, 4 3 or 2 corners, each often defined by a radius.

The top edge of one or more sidewall members often is contiguous with a flange portion that extends, often vertically, from the outer surface of the sidewall member. The flange sometimes forms a continuous surface around the top perimeter of the cage and its surface often is horizontal when the cage rests on its bottom member. The flange can be any width, sometimes about 0.03 inches to about 1 inch. The flange can increase cage base rigidity and sometimes is configured to mate with a portion of a cover member, described further herein. In some embodiments, the flange includes an optional downward extending lip member, which sometimes mates with a corresponding member of a cover to form a detachable seal. The profile of the lip member of the base is of any shape to allow a fit with a corresponding structure on the cover, where the profile sometimes is curved, and sometimes is S-shaped, V-shaped or J-shaped. The lip member and/or flange member of the cage base sometimes are shaped to deflect when mated with a cover member to form a seal between the cage base and the cover. The seal between the cage base and the cover is of any convenient or useful type, including but not limited to an adhesive seal, compression fit or interference fit, for example. The seal sometimes results from an interference fit of any suitable configuration, an embodiment of which is described hereafter in greater detail.

A cage base sometimes comprises one or more indents in a sidewall member that extends towards the interior of the cage base. One, two, three, four or more sidewalls sometimes include one or more indents, which can increase sidewall rigidity. Sidewall integrity enhancement can provide an advantage of increasing impact resistance to crumpling, advantages of which are described above. The depressed surface area of an indent can be trapezoidal or rectangular. The depressed distance of the indent vertical from a sidewall from which the indent extends often is continuous from the top of the indent to the bottom (e.g., the face is parallel to the side wall from which the indent is extended), and may be greater at the top of the indent, sometimes tapering from the top portion of the indent to the bottom portion. Such configurations allow for nesting of cage bases when they are not housing an animal, as described hereafter. An indent often is located in close proximity to a baffle or feeding structure integrated with or in association with a cover member (described in greater detail hereafter), thereby reducing airflow along sidewalls of the cage base and increasing airflow parallel to and nearer to the cage bottom. An indent sometimes is configured to orient one or more optional cage insert members described hereafter (e.g., feeding tray), and sometimes it or a portion thereof is referred to as a "mount," "cradle" or "support member" when utilized in this manner. A mount is of any geometry useful for supporting and orienting a cage insert member, and sometimes is an extension comprising a planar upper surface parallel with a base unit bottom surface. In some embodiments (e.g., FIGS. 2, 5 and 6), a mount or support member sometimes is formed by a wall of a cage base and a depression in the indent, and is of a shape adapted to receive a cage insert. In an embodiment shown in FIG. 5 and FIG. 6, the profile of the mount has a flat bottom extending to curved sides. The curved sides can include a detent (e.g., formed by surfaces 101B and 101C shown in FIG. 6) adapted to receive a corresponding structure in the cage insert (e.g., surfaces 103B and 103C of the feeding trough in FIG. 6). The horizontal end of each indent or mount sometimes is equidistant to an adjacent sidewall in some embodiments, and its horizontal midpoint thereby is located at the midpoint of the sidewall with which it is integrated. In embodiments illustrated in FIG. 6, each mount supports each end of the feeding trough, and extends away from the surface of the indent (e.g., about 1 cm), sometimes substantially flush with the sidewall surface. A cage base bottom also may include one or more indents, which also can increase rigidity and crumple resistance.

A cage base may include one or more mounts located on an outside surface of a sidewall member or bottom member, which sometimes are referred to herein as "outer support members" or "outer guide members," which allow for convenient mounting of the cage into a rack unit. The outer support members or outer guide members are of any configuration allowing for mounting of the cage base into a rack unit member, and sometimes mate with or are supported by corresponding members in the rack unit. In some embodiments, a flange member contiguous with the top of one or more sidewall members serves as a guide member and/or support member. In certain embodiments, a guide member and/or support member is a flange, projection, rib or groove located on the exterior surface of a bottom member and/or one or both cage sidewall members (e.g., sidewall member adjacent to the front sidewall and rear sidewall), and often is parallel with the top edges of the sidewall members. Such guide members and support members sometimes extend from the front edge of a sidewall member, sometimes extend to the rear edge of a sidewall member, sometimes extend from a point in a sidewall member a distance from the front edge, and sometimes extend to a point in a sidewall member a distance from the rear edge. Such members sometimes are oriented in the middle half of the vertical length of a sidewall member, and sometimes are oriented in the middle of the vertical length. In some embodiments, guides are low profile, and sometimes are grooves or depressions, that do not substantially interfere with nesting of cage bases.

A cage base is manufactured from any material suitable for housing an animal, such as a small rodent, for a time period of about one week or greater. The material may be rigid, and often is a semi-rigid or flexible material. The cage base sometimes is constructed entirely, or in part, from a translucent or transparent material. Examples of materials utilized for manufacture of a cage base include, but are not limited to, polypropylene (PE), high-density polyethylene, low-density polyethylene, polyethylene teraphthalate (PET), polyvinyl chloride (PVC), polyethylenefluoroethylene (PEFE), polystyrene (PS), high-density polystryrene, acrylnitrile butadiene styrene copolymers and the like. In certain embodiments, a cage is constructed from PET or PS (e.g., high density PS). Sidewall members and bottom members are of any thickness for substantially maintaining cage integrity for about one, two, three or four or more weeks of animal containment, and the thickness sometimes is about 0.01 inches to about 0.08 inches. The sidewalls often are of substantially uniform thickness. A cage base often is manufactured as a single unit and by any convenient process, sometimes in an injection molding, thermoforming or vacuum forming process, for example. A cage base often is packaged for shipment, sometimes as a single unit and sometimes with other like units (e.g., as a nested set described hereafter). A cage base sometimes is washed and/or sterilized (e.g., U.V. irradiation, gamma irradiation) prior to packaging. Cage bases can be packaged in any material, including but not limited to materials containing polystyrene, polyvinyl chloride, low-density polyethylene and the like.

Cage Covers

A cover often is provided separately from a cage base, often reversibly mates with a cage base, sometimes in sealing attachment, and is of any suitable geometry allowing for attachment to the base. A cover member often comprises one or more members that directly mate with and seal with one or more members of a base; sometimes has no side wall members; and sometimes is planar or substantially planar. A cover member is constructed from any material that allows for animal containment for about one week or greater. Materials for constructing a cover sometimes are selected to allow for sealing attachment to a cage base. Examples of materials from which the cover can be constructed include those described above for cage bases. Sometimes the cover and base are constructed from the same material and sometimes are of a similar or the same thickness.

The cover often is flexible or semi-rigid. A cover member often comprises a substantially planar region and a flange region. The substantially planar region often comprises one or more components described herein. The flange region sometimes is embossed, can be raised, often comprises a region that extends downwards as a lip (referred to herein as a "lip"). A flange and optional lip region may extend continuously around the perimeter of the cover. The profile of the flange and optional lip often correspond to a flange and optional lip on a cage base, and often allow the cover to seal with the base via an interference fit. The flange and optional lip are of any shape to effect an interference fit with the base, and sometimes are S-shaped, V-shaped or J-shaped, for example. A cover member sometimes comprises one or more of a continuously solid surface, an imperforate surface region, and/or a perforated surface region (e.g., a region containing air holes or a grid structure). A cover member sometimes comprises, sometimes within a substantially planar region, an aperture, a groove, a channel, a depressed or indented region, a bossed region, a rib (e.g., an embossed rib or solid rib), and sometimes a combination of the foregoing. Such a structure or structures often are located near a heavier structure in the cover, such as around or near a water supply receptacle or a connector that receives a corresponding non-cover connector. A cover member sometimes comprises other components, such as a filter, a baffle, a feeding structure, and/or a watering structure, holders of the foregoing, and combinations of the forgoing, where each structure is integral or provided as a component separate from the cover member. Edges or corners in a cover often are rounded, often defined by a radius and/or angle described herein for cage bases. A cover in certain embodiments may be rigid. A cover member may comprise a combination of a flexible region with a rigid or semi-rigid region, the rigid or semi-rigid region sometimes acting as a frame that allows a cover to be handled efficiently and conveniently when attaching it to a cage base, for example. A cover or a portion of it sometimes is translucent or transparent.

In some embodiments, a cover and base are adjoined in a "clamshell" arrangement, and share a common edge. There often is a seam or hinge of thinner material at the common edge such that the cover can "fold" onto the base. The common side in such embodiments often is a longer side of the cover and base opening where each is rectangular (e.g., one of the longer sides of the rectangular cover and base in FIG. 1). A flange edge in the cover and a corresponding flange edge in the base may be joined in such a clamshell orientation.

The cover member can be sealingly mated to the base unit in any suitable manner, configuration and material that allow for attachment and detachment. In some embodiments, a cover member can be attached and detached from a base unit member multiple times. A cover often is directly mated to a base in any convenient manner, such as by compression fit or interference fit (e.g., a snap interference fit, friction interference fit and the like), for example. In interference fit embodiments, the cover often comprises a flange and/or a lip member (e.g., a lip having an S-shaped profile) adapted to mate with a corresponding member in the base, embodiments of which are described herein. The cover may be sealingly attached to the base unit by electrostatic pressure or by an adhesive. An adhesive may be applied to the cover member, or to the top of the base member that joins with the cover member (e.g., a flange at the top of the base unit), and may be applied at the time of manufacture. An adhesive may be mated with a removable backing that exposes the adhesive when removed before the cover is sealingly attached to the top of the base unit.

A cover sometimes comprises an air filter. The air filter often is configured to filter components (e.g., particulates) in air exiting the cage. The filter is composed of any filter material useful for housing animals, including but not limited to spunbonded polyester, pressed pulp (depth filter), a Reemay filter (e.g., Reemay 2024), high-efficiency particulate air (HEPA) filter and the like (e.g., U.S. Pat. No. 6,571,738). The filter sometimes excludes particles 1-5 microns in size or 0.3-1 microns in size. The filter often is in effective connection with a portion of the surface area of a cover member, and often not the entire surface area of the cover member. In some embodiments, the filter is in effective connection with 80% or less, 70% or less, 60% or less, 50%. or less, 40% or less, 30% or less, 25% or less, or 20% or less of the cover member surface area. A filter sometimes is integrated with the cover (e.g., the filter is not reversibly mounted to the cover member), and may be provided separately from the cover. When provided separately from the cover, a filter often is placed in effective connection with a portion of the cover, often a perforated portion of the cover (e.g., a portion having air apertures or a grid structure). A filter may be affixed to a cover in any manner, often by reversible attachment and/or sealing attachment, and in some embodiments, the filter comprises an adhesive, sometimes on the outer perimeter of the filter, sometimes across the entire surface area of the filter, and often on one side of the filter. Where the filter comprises an adhesive, it sometimes is provided with a peel-off backing that exposes the adhesive, and the adhesive often allows for reversible adhesion (e.g., the filter can be affixed, removed or partially peeled back from the cover, and then affixed again, which can be repeated multiple times). A filter may be attached to a cover by a manufacturer of the cover, and/or may be attached/detached by a user. In some embodiments, the filter is in connection with a flexible film, the latter of which is coated on a surface (e.g., the entire surface or a portion of the surface) with an adhesive. When an adhesive is utilized, it often is not substantially toxic to animals housed in the cage and sometimes is a food grade adhesive. The filter and/or film often is adjacent to or in effective connection with one or more apertures of the cover.

In certain embodiments, a filter is sandwiched between the cover and a holding member attached to the cover. The holding member often includes one or more apertures through which air can flow, and holding member often is sealingly attached to the cover (e.g., attached by an adhesive). In such embodiments, a substantial surface area of the filter often is not in direct contact with the holding member, which can provide an advantage of reducing potential gnawing damage caused by a contained animal (such a holding member also is referred to herein as a "filter shield").

A filter sometimes is connected directly to a cover member or shield member and often is not connected directly to a cover of shield member but effectively filters air into or from a cage. In the latter embodiments, a filter can be located in proximity to an aperture or apertures of a cover member or shield member, for example, and filter air entering or exiting the apertures. Standing an air filter away from surfaces of the cover and optional filter shield(s) provides certain advantages, such as permitting efficient airflow and protecting filter material from possible damage caused by contained animals (e.g., animals cannot effectively contact the filter). For example, filter (104) generally has a small percentage of area open for airflow. Pore size sometimes is about 0.5 microns and there may be approximately 1000 pores per inch. The corresponding percentage of open area for this type of filter is about 2%. A relatively large filter surface therefore sometimes is utilized to permit airflow through the filter without significant restriction or pressure drop. Filter dimensions in the cover sometimes are about six (6) inches by about two (2) inches. The resulting area available to airflow for a filter of these dimensions is about 12 square inches multiplied by 2%. The area available to airflow would be significantly limited by exhaust apertures in the cover if the filter paper were in direct contact with the cover (e.g., the area available to flow is that of the area of the apertures, which can be (the square of 0.125/4 multiplied by 27 holes multiplied by 2%). Thus, standing a filter away from apertures in the cover and optional filter shield(s) can significantly enhance airflow by allowing the entire filter paper to breathe.

Characteristics of cages provided herein advantageously contain cage components when the cages are exposed to physical impact. For example, combinations of (i) sealing attachment of a cage base to a cover, (ii) light weight of the cage base and cover resulting from thin walls, (iii) flexibility of the semi-rigid base and cover, and (iv) base corner geometry (e.g., effectively split into more than one corner), reduce the possibility that cage contents (e.g., animals, animal waste and cage additives) are exposed to the outside environment as compared to reusable, rigid cages. In the event a cage is exposed to impact (e.g., dropped or falls to a floor from an elevated position) these features advantageously protect contained animals from the exterior environment and protect personnel from cage contents. These features are advantageous for application in higher biosafety level environments (described hereafter), for example.

A cover sometimes comprises a substance that scavenges emissions from an animal in the cage. Emissions sometimes are gaseous or particulate compositions, such as those resulting from exhalation (e.g., water vapor, carbon dioxide), urination and defecation (e.g., ammonia, microbes), and exfoliation (e.g., dander, hair follicles, allergens, fomites, microbes (e.g., bacteria, fungi and viruses)), for example. The scavenging substance sometimes is a catalyst or is utilized in combination with a catalyst that breaks down an emission from an animal into innocuous substances (e.g., biocatalyst). A scavenging substance sometimes is included in a filter or is located adjacent to a filter, and sometimes is located in another portion of a cage (e.g., on a floor and/or below a sub-floor). Any scavenging substance suitable for use with animals can be used, such as charcoal or other form of carbon.

As described above, a cover member sometimes comprises a delivery component for delivering a consumable element to a housed animal, such as air, water or food. The delivery component sometimes is integral with the cover, sometimes the cover is in contact with a separate delivery component (e.g., a surface of the cover is in contact with a flange member of a food trough), sometimes the cover comprises a holder or receptacle for the delivery component, and sometimes the cover includes an aperture adapted to receive the delivery component.

In some embodiments the cover comprises one or more connectors adapted to receive an air supply or air exhaust component or water supply component (e.g., a nozzle or nozzle receptacle). A connector can be of any geometry to receive a corresponding connector from an air supply, air exhaust or water supply component. The cage cover connector often mates with the air supply, air exhaust or water supply connector by a sealing attachment, and often by a reversible connection, and the connectors are of any suitable type. For example, the connection may be defined by cylindrical, square, rectangular or conical side geometry, and flat, rounded, tip or point geometry for the top or bottom, for example. The connecting member in the cover may be a protrusion or a void (e.g., concave or convex, respectively) that receives a corresponding mating void or protrusion, respectively. In some embodiments the connector structure in the cover is a void that comprises two apertures, a larger aperture and a smaller aperture, where the larger aperture is spaced above the smaller aperture. In such embodiments, the mating nozzle connector is seated, often reversibly, in the void, thereby forming a substantially air-tight seal. In some embodiments the connector structure in the cover comprises a protrusion having an aperture, where the aperture is at the apex of the protrusion. In such embodiments, a void in the mating connector fits over the protrusion in the cover, often reversibly, and forms a substantially air-tight seal. Connection geometry in the latter described embodiments can provide advantages of (a) expanding air exiting an air supply connector along inner walls of the cover connector and other cover and cage surfaces, which expansion cools air in the cage and compensates for thermal load of a contained animal, and (b) substantially reducing or preventing the possibility of damage caused by contained animals (e.g., gnawing, clawing). FIG. 1 shows a conical convex connection member in the cover, and the connection member may be conical concave in certain embodiments. The nozzle connector of the air supply component can be seated in the cover by hand or by any other method, and connection may be a gravity fit, pressure fit, screw fit or another suitable fit. In some embodiments, the conical connector is held in a carriage that guides the connector into the cover. Such carriages sometimes are connected to a rack unit, often to a shelf thereon, embodiments of which are described hereafter. The conical void sometimes is located in an embossed region of the cover, where the top surface of the embossed region sometimes is substantially elliptical. Where the cover comprises a flange, the height of the embossed region sometimes is equal to or substantially equal to the highest point of the flange.

A connector, such as an air supply and/or air exhaust or water supply connector, sometimes is in contact with a channel. The channel is formed within the cover in some embodiments, and may be formed by raised corresponding raised portions on each side of the cover. The channel in some embodiments is formed by the mating of (a) a bossed portion of the cover and (b) a corresponding bossed portion in a filter barrier member. The channel often includes one or more apertures on the side opposite the connector, such that air introduced through the connector may enter the cage. In embodiments where the channel is formed in part by a filter shield, the filter shield may comprise one or more apertures. In some embodiments, two or more apertures are distributed across the length of the channel, which can provide an advantage of distributing or exhausting airflow across the width of the cage, or a portion thereof (e.g., across the Y-axis in FIG. 1). The channel may be of any suitable shape for permitting airflow: the channel cross section may be circular, ovular, semi-circular, semi-ovular, rectangular, square, rhomboid or trapezoidal, for example, and the length of the channel may comprise or consist of a linear, circular, triangular, rectangular, ellipsoid, arc, sinusoidal or zig-zag geometry, for example. The length of the channel sometimes is not entirely linear and sometimes it is non-linear. The latter embodiments provide an advantage of reducing adherence of a filter to the cover or a filter barrier as a filter surface cannot depress as readily across a non-linear depression as a linear depression.

In some embodiments, the cover comprises or is in connection with an airflow baffle. A baffle often extends downwards from the inner surface of the cover into a portion of the cage interior. A baffle often is located between an air inlet aperture and an air exit aperture, thereby directing airflow around the baffle. Sides of a baffle often are in close contact or substantially contacted with sidewalls of a cage base so that airflow is directed towards the bottom of the cage base and does not bypass the baffle along cage sidewalls. In some embodiments, a feed tray is configured such that a wall of the tray acts as a baffle. Directing airflow towards the bottom of the cage and then up through the top of the cover is advantageous for purging gaseous waste from bedding material located at the cage bottom and for reducing airflow required for maintaining the animals. In some embodiments, the baffle is formed by a food trough in connection with a cover and a base that projects towards the bottom of the cage base. The food trough in such embodiments often is a member separate from the cover and the base and rests on a cradle (i.e., mount) formed in an indent within the cage base.

The cover may comprise a water supply component. The cover sometimes comprises an integral water supply reservoir to which an emitter is connected or integrated. In some embodiments, the cover comprises a water supply receptacle or holder into which a water supply that includes an optional emitter is seated, and in certain embodiments, the cover comprises an aperture through which a water reservoir is fixed and/or suspended. Water supplies are described herein.

In some embodiments, the cover is connection with or comprises a feed supply component, often referred to herein as a "feeder," "food trough," or "food tray." The cover sometimes comprises an integral food tray, and sometimes is in connection with a member of a separate food tray module when the cover is mated with a cage base. In some embodiments, the cover comprises a food tray holder into which a food tray is seated, and in certain embodiments, the cover comprises an aperture through which a food tray is fixed and/or suspended. Food trays are described herein.

The cover often is semi-rigid or flexible. A cover member may comprise a semi-rigid member, flexible member and/or a filter member. A semi-rigid member sometimes forms a continuous perimeter around the cover member and sometimes includes one or more cross support members continuous with and extending perpendicularly from one side to another side of the cover member. A semi-rigid member sometimes comprises a cellulose composition (e.g., cardboard) that provides a framework for the cover member allowing for convenient handling by human personnel, and sometimes comprises a material that imparts moisture resistance. The flexible member sometimes is fixed to the semi-rigid member, sometimes by an adhesive, sometimes has elastic properties, sometimes forms an air-tight seal if punctured by an air outlet member of an airflow system, and sometimes deforms when positive air pressure is introduced to a cage comprising the cover. The filter member often is fixed to the semi-rigid member, sometimes by an adhesive. In some embodiments, the cover member comprises a multilayered region, or sometimes an entire cover member is multilayered. One layer often comprises a material that can be punctured by a tube structure (e.g., the material sometimes is elastic and provides an air-tight seal around the tube structure), and another layer sometimes is constructed from a thicker material. The cover sometimes is a multilayered flexible assembly. In embodiments in which the cover comprises a flexible material, the material sometimes is elastic. An elastic material utilized sometimes is punctured by a tube structure, such as a needle, and has an elasticity sufficient to form a seal around the tube structure after it is punctured. In some embodiments, the seal is air-tight. An elastic material sometimes has sufficiently elasticity to deform when positive air pressure is delivered to a cage, which can provide a visual indication that positive airflow is being delivered to a cage. In some embodiments, a cover member includes a region of elastic material that is readily punctured by a tube structure or acicular structure, such as a needle. In some embodiments, a cover member comprises a break-away member, that can be adapted to receive a watering component, feeding component, air supply or air exhaust component, for example. A cover member sometimes does not comprise an air exhaust connector and sometimes does not comprise an air inlet connector. Accordingly, in some cover member embodiments: the cover member sometimes is rigid, semi-rigid, or flexible, or comprises a flexible region; the cover member sometimes comprises a flexible material and a semi-rigid material, and sometimes a filter; a filter in a cover often covers a portion of the surface area of a cover member and not the entire surface area of the cover member; the cover member sometimes comprises a continuously solid surface area and a filter, where the solid surface area is rigid, semi-rigid, flexible or a combination thereof; the cover member sometimes comprises a continuously solid surface area and a filter, where the continuously solid surface area is imperforate and not a grid.

Additional Cage Components

Examples of cage members in addition to a cage base and cover include watering devices and feeding structures separate from a cage base or cage cover or integrated with the foregoing. These additional members are referred to herein as "insert members." A cage insert member sometimes is placed in a cage base or cage cover before a cover is sealingly attached to the top of the base. In some embodiments, an insert member is located near the top of a cage base in proximity to the cover, such as in food trough embodiments described herein. In some embodiments, the inert member defines a top portion of a containment space for one or more animals housed in the cage. An insert member sometimes rests on or is positioned by one or more mounts or cradles extending from an inner surface of one or more sidewall members of a cage base (e.g., food tray in FIG. 5 and FIG. 6). In some embodiments, an insert is a substantially flat, planar member, where the surface of the insert is parallel to the surface of the cage base bottom member. One or more edges of the insert member often substantially mate, sometimes are substantially flush, sometimes are in close proximity, and sometimes are sealingly contacted with the inner surface of one or more sidewall members. In some embodiments, each edge of the insert substantially mates, is substantially flush, is in close proximity, or is sealingly contacted with the inner surface of each corresponding sidewall member. An edge of an insert member is of any thickness appropriate for the material from which it is constructed for housing an animal, and sometimes is about 0.010 inches to about 0.080 inches. An insert member is constructed of any material suitable for containing an animal using materials and manufacturing process such as those described for manufacturing cage bases, for example.

An example of an insert member is a food tray. A food tray often comprises a bottom integrated with four wall members, and optionally comprises a lid adapted to sealing attach to the food tray. One or more sidewall members and/or the bottom, can include one or more openings or slots that expose food in the feeding structure to a housed animal. Opposing sidewalls sometimes are parallel, non-parallel, curved, elliptical or rhomboid, where two or more of the sidewall members may taper downwards to a bottom member having a surface area less than the surface area of the top opening or cover member. Edge and corner junctions between the sidewalls and bottom often are curved and have a radius convenient for manufacture and animal feeding. A radius sometimes is selected to minimize abrasions caused by housed animals. A food tray may comprise a flange member surrounding the top edge of the food tray. In some embodiments, the food tray bottom is curved and not flat, and in certain embodiments the food tray is constructed from a plurality of vertically arranged tubular structures (e.g., wire). A food tray is constructed of any material suitable for feeding animals, examples of which include but are not limited to: a metal alloy, stainless steel, steel, nickel, nickel alloy, zinc, zinc alloy, a polymer, polypropylene, high-density polyethylene, low-density polyethylene, polyethylene teraphthalate, polyvinyl chloride, polyethylenefluoroethylene, polystyrene, high-density polystyrene, acrylnitrile butadiene styrene copolymers and the like, and combinations of the foregoing. In some embodiments, a food tray is constructed from a polymer, such as the same polymer from which the cover is manufactured, in certain embodiments the food tray is a metal alloy and in some embodiments the food tray is a combination of a metal structure and a polymer coating. In certain embodiments, the tray is constructed from polyethylene teraphthalate or polystyrene (e.g., high-density polystyrene). In some embodiments, the food tray, and sometimes the cage and/or cover, is constructed from a substantially hard polymer. Such polymers are known and measures of hardness include Rockwell (e.g., Rockwell M or R), Brinell, Shore, Izod (e.g., Izod impact, notched), Charpy (e.g., Charpy impact, notched) and Vickers measures. Substantially hard polymers, as opposed to softer polymers, may reduce the possibility of gnawing damage caused by contained animals without increasing or substantially increasing material thickness.

Another example of an insert member is a water supply, which also is referred to herein as a "reservoir." Water or another suitable hydrating liquid is emitted to contained animals via the water supply. The water supply or reservoir, and corresponding reservoir holder or aperture for receiving a reservoir in a cage component (e.g., cover), is of any geometry convenient for dispensing water. A reservoir can be a box-shaped structure, sometimes is a substantially cylindrical structure, and sometimes is a substantially cylindrical structure with gently tapered side walls (slightly conical) and a chamfer. A reservoir sometimes is geometrically configured to reduce the potential of abrasions caused by housed animals (e.g., reduce abrasions caused by animals gnawing on the watering structure), and in some embodiments, a reservoir comprises rounded corners (e.g., a rounded junction between a bottom edge and a sidewall member edge) and/or edges (e.g., rounded junction between two sidewall member edges). Rounded corner radiuses are described herein. A reservoir sometimes is adapted to mate with a sealingly attachable lid or cap located in a convenient location of the bottle (e.g., the top or bottom), such as a screw-on lid or snap on lid, for example, such that the reservoir can be filled with water and then sealed with the lid. Accordingly, a reservoir often includes male or female threads adapted to receive threads from a screw-on lid or a fitting for a snap-on lid. A portion of the reservoir exposed to the inside of a cage (e.g., the bottom of the reservoir, cap or lid) often includes a small aperture that can retain water by surface tension until contacted by an animal. A side wall region of the reservoir may be chamfered and sometimes can mate with a corresponding chamfer in a receptacle of the cover. Such a chamfer can function as a key that ensures alignment of the reservoir in the cover. A step in a radius of the aperture also may generate an interference fit with the reservoir receptacle, ensuring a tight seal between the reservoir and the cover and thereby reducing and substantially preventing air leakage. A reservoir is constructed of any material suitable for containing a fluid for hydrating animals (e.g., water) including but not limited to: polypropylene, high-density polyethylene, low-density polyethylene, polyethylene teraphthalate, polyvinyl chloride, polyethylenefluoroethylene, acrylnitrile butadiene styrene copolymers, cellulose, cellulose lined with a polymer or metallic foil, and the like.

For embodiments in which a cover comprises a water reservoir holder, the reservoir holder sometimes is substantially cylindrical with slightly tapered sidewalls and a chamber located in the side and bottom. Such a geometry of the holder can key a similarly shaped reservoir, where the chamfers of the holder and the reservoir mate. Such holders often include an aperture, often in the chamfer region, adapted to receive an emitter from the reservoir, such that the emitter is accessible to a housed animal. Such holders often are adapted to receive a reservoir that includes a step in the radius such that the top portion of the reservoir has a larger diameter than the lower portion, which provides an interference fit with the inner wall of the holder and a substantially air tight fit.

In some embodiments, an emitter contains a valve sometimes located in the emitter and sometimes located at the junction of the emitter and the reservoir. In some embodiments, the emitter contains no valve. A quick release coupling sometimes connects the emitter to the reservoir. In certain embodiments, the emitter is conical with the larger cross sectional area connected to the reservoir and a small aperture on the opposite end accessible to a housed animal. In such embodiments, the aperture is sized to retain water in the reservoir by surface tension and to emit water when contacted by a housed animal. In certain embodiments, provided is a water bottle for use in conjunction with a cover, which comprises a cap having an aperture that retains water via the inherent surface tension of water within the cap face, the latter of which is defined by a flat surface. In the latter embodiments, the cape face is not conical and does not include a projection.

In certain embodiments the water supply comprises an aperture or emitter, and water sometimes is retained at the aperture or emitter by surface tension. The aperture often is located in a cap in connection with the water supply. The cap sometimes is reversibly attached to the water supply, or may be integrated with the water supply. In some embodiments, the cap comprises a removable barrier over the aperture, which sometimes is an adhesive tab that prevents water spillage during shipping. The removable barrier can be removed by a user before use. The cap sometimes comprises a planar or substantially planar surface. The planar surface often comprises a centered aperture, and often does not comprise a raised member, and may contain an emitter that retains water by surface tension. The water supply sometimes is a water bottle, which can be mounted in a receptacle in the cover.

Other insert members may be in association with a cage assembly, such as a shelter structure, bedding material, and/or a sub-floor, for example. A shelter structure is of any shape or geometry that allows an animal to enter the structure and become covered or partially covered by the structure. Any convenient structure for housing animals can be used, and in some embodiments, a shelter is a perforated pipe structure. An example of a combined feeding and shelter structure is described in U.S. Pat. No. 6,571,738.

A bedding material often is placed in a cage. Any bedding material suitable for housing animals can be used, such as wood chips are newspaper, for example. In some embodiments, a removable sub-floor sometimes is positioned in association with a cage base. A sub-floor is constructed from any material and is of a geometry that allows foodstuffs, liquid emissions and/or solid emissions from a housed animal to pass through the sub-floor to the cage base bottom member, and in some embodiments, a sub-floor member or a portion thereof is reticulated or perforated (e.g., http address www.s-sponline.com/bed.html). A scavenging substance described previously may be placed under the sub-floor in certain embodiments.

In some embodiments, an insert member comprises two or more connected planar members, where each planar member has a surface parallel to a surface of another planar member and the bottom surface of one planar member is elevated with respect to the top surface of another planar member. In the latter embodiments, each planar member is connected by a riser member, where a surface of the riser member sometimes is perpendicular to surfaces of the connected planar members and sometimes connects the planar members at a non-perpendicular angle (e.g., about 10 degrees to about 95 degrees). The planar members and one or more riser members often are contiguous, often with seamless junctions. An insert member often is manufactured by a process that renders a unit having no seams or disconnections between the planar and riser members. An insert member sometimes comprises an aperture or a combination of an aperture and a recessed flange adapted to receive a component useful for meeting requirements of a housed animal, such as a feeding structure, watering structure and/or shelter structure, for example. An insert member sometimes comprises one or a plurality of sidewall members (e.g., two, three or four sidewall members) extending downwards into the interior of a cage base member also adapted to support a component useful for meeting requirements of a housed animal. The outer surface of a sidewall member often is perpendicular to the bottom surface of an insert planar member from which it extends and often are contiguous with the bottom surface of an insert member. In some embodiments, a bottom edge of a sidewall member is not parallel to the bottom surface of an insert planar member, and sometimes a side edge of a sidewall member is not perpendicular to the bottom surface of an insert planar member. An insert may comprise one or more apertures allowing air to enter and/or exit the cage. In some embodiments, the one or more apertures, sometimes referred to as "vents," diffuse air entering a cage at the top surface of the insert. In certain embodiments, one or more vents are in the front portion of the insert so that air flows from the front of the cage to the back of the cage, sometimes by laminar flow (e.g., downward near the front to upward near the rear). The apertures are of any geometry allowing for air flow, such as circular, rectangular, square, rhombus and/or reticulated, for example. An insert member often is not connected to a filter. An insert member may comprise one or more openings, apertures or recesses for receiving other structures, and sometimes is integrated with one or more other structures. Such structures sometimes are utilized for feeding, watering and/or sheltering animals housed in the cage. Two or more of such structures sometimes are integral, such as an integrated feeding/shelter structure. Where an insert member includes an opening, aperture or recess for receiving another structure, the other structure often is in removable association with the insert, and in some embodiments, the other structure is sealingly mated with the insert member.

Cage and Cage Component Embodiments

In accordance with the foregoing descriptions of cages and cage components, examples of specific embodiments are described hereafter. In some embodiments, provided herein are animal containment cages comprising a wall or walls and a bottom, where the cage is constructed from a polymer, and the thickness of each wall is about 0.01 inches to about 0.08 inches. Examples of suitable polymers are described above. In certain embodiments, the thickness of the bottom is about 0.01 inches to about 0.08 inches. The wall or walls and bottom often are of a substantially uniform thickness. The thickness of the wall or walls or bottom sometimes is about 0.01 inches to about 0.05 inches, at times is about 0.02 inches to about 0.06 inches, and can be about 0.02 inches to about 0.03 inches. In some embodiments, the cage is semi-rigid and can flex. The single-use cages provided herein generally are flexible or semi-rigid in comparison to multiple-use plastic cages (e.g., U.S. Pat. No. 5,894,816). The cages provided herein can weigh about 250 grams or less or about 225 grams or less, and they sometimes weigh about 150 grams or less or 125 grams or less (e.g., about 115 grams) due to the relatively thin plastic walls and bottom. Sidewalls of a cage often are coextensive with the bottom. In certain embodiments the cage sometimes includes three walls (e.g., the cage bottom having a triangle or generally pie-slice geometry) or is cylindrical (e.g., the cage bottom is circular or oval and coextensive with a wall). A cage often comprises four walls, and the interior surface of the bottom sometimes is a square, rectangular, rhombus, trapezoid or parallelogram. In certain embodiments, at least one set of opposing walls taper inwards towards the cage bottom, and often all walls taper inwards towards the bottom. One or more walls, and sometimes all walls, often are at an angle of greater than 90 degrees with respect to the bottom. In the latter embodiments, the angle sometimes is about 91 degrees to about 105 degrees, and can be about 92 degrees to about 98 degrees, or about 95 degrees.

In certain embodiments, one or more of the wall or walls, bottom and cover comprise an indent or boss that increases cage rigidity. In certain embodiments, a wall comprises an indent extending from the junction of the bottom and the wall. A cage base often has no aperture. A cage base comprises in certain embodiments an indent on each of two sidewalls and a mount in connection with each indent in which a feeding tray may be or is nested (e.g., a food tray cradle). A cage base often comprises a flange, and optional lip, surrounding the top edge of the base capable of an interference fit with a corresponding structure in a cage cover.

In certain embodiments, one or more or all edges of an indent or boss are rounded edges. Rounded edges sometimes are defined by a radius of about 0.25 inches or greater, and the radius can be about 0.30 inches or greater or about 0.25 inches to about 0.50 inches. In certain embodiments, one or more wall to wall junctions or wall to bottom junctions are rounded junctions. The rounded junctions sometimes are defined by a radius of about 0.25 inches or greater, and the radius can be about 0.30 inches or greater or about 0.25 inches to about 0.50 inches.

In certain embodiments, one or more junctions between the bottom and two walls comprise two or more corners, and sometimes the one or more junctions comprise three or more corners or three corners. These features can improve impact resistance of relatively thin-walled cages. In some embodiments, corners of the cage are rounded corners, and the rounded corners sometimes are defined by a radius of about 0.25 inches or greater, a radius of about 0.30 inches or greater, or a radius of about 0.25 inches to about 0.50 inches.

Certain embodiments are directed to an animal containment cage comprising a wall or walls and a bottom, where the wall or walls and bottom are constructed from a polymer, the thickness of each wall is about 0.01 inches to about 0.08 inches, wall junction edges and corners are rounded and have a radius of about 0.25 inches or greater, and one or more of the walls and bottom comprise one or more bosses or indents. The radius sometimes is about 0.30 inches or greater. Other features described herein with regard to cage bases are applicable to such embodiments.

A cage base member generally does not comprise an air filter, and a cage base often comprises a continuously solid and imperforate bottom and sidewalls. While a cage generally does not comprises an air exhaust or air inlet aperture, in some embodiments a cage base may comprise one or more apertures in one or more sidewalls or bottom, often the rear sidewall, adapted to receive or connect to a structure that removes or supplies air, water, food or other material to the cage, such as an air supply component, air exhaust component, and/or water supply component. In the latter embodiments, one or more apertures in a sidewall sometimes are in connection with a seal (e.g., an elastic ring seal) integrated with the cage base or applied to it by a user. In some embodiments, the rear wall of a cage base includes one or more apertures adapted to receive or connect to an air supply component, air exhaust component, and/or central water supply component. In some embodiments a base unit may comprise a break-away member that can expose an aperture for receiving a component such as a sensing probe, water delivery structure or air delivery structure, for example. A break-away member, sometimes referred to as a "punch out" member, sometimes breaks away entirely and sometimes remains attached to the cage by a portion after being broken. In certain embodiments, a cage base may comprise a filter member and one or more optional exhaust ports.

A cage provided herein often is a single-use cage, and sometimes is in combination with a rack, an airflow unit, an airflow controller or a combination thereof. A cage described herein can comprise one or more animals. The animal sometimes is transgenic, immunodeficient, inbred, contains one or more xenografts and/or lacks one or more functional genes (knock-out animal). The animal often is a rodent, such as a rodent selected from the group consisting of mice, rats, hamsters, gerbils, guinea pigs, chinchillas and rabbits, for example. A contained mouse sometimes is a nude mouse or a severe combined immune deficiency (SCID) mouse.

Specific embodiments of cage bases and cage systems are illustrated in FIGS. 1, 2, 3, 4, 5, 6, 7A, 7B, 8, 9, 10 and 11. FIG. 1 is a top isometric view of an assembled cage embodiment showing a general overview from the upper font perspective. Cage base (101) is mated to a cage cover (102), the latter of which is in association with a water bottle (105) and includes an air inlet port (146) and an air exhaust port (145). Filter media may be positioned beneath a raised, bossed surface (119) comprising apertures (119A). An optional cage card holder (109) is bonded to cage base (101), often via ultrasonic welding or adhesive. Adhesive or welds can be applied to surfaces (108) of the card holder (109) to affix it to the base (101).

Figure 2:
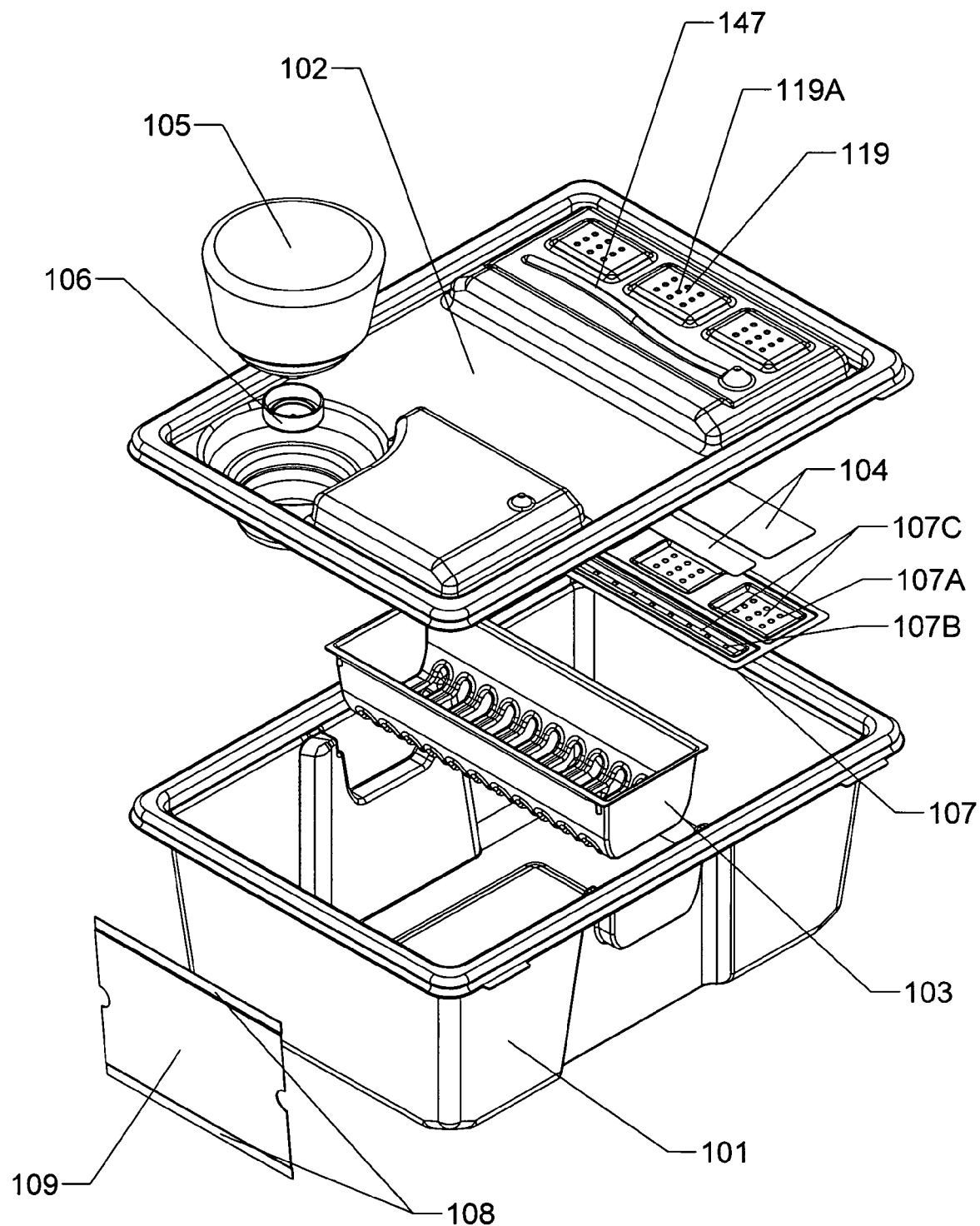
FIG. 2 shows an exploded view of the cage assembly in FIG. 1 from the upper rear perspective.

FIG. 2 is an exploded view of the cage assembly shown in FIG. 1, and provides further detail of a water bottle cap (106) and food trough (103). Filter media (104) may be removable and often is permanently affixed. In embodiments that comprise a filter shield (107), the shield often is attached to the bottom surface of cover (102). Filter media (104) may be affixed in the cage cover between the bottom side of bossed surface (119) of the cover and the top side of bossed surface (107A) of a filter shield (107). Filter media (104) also may be affixed in the cage cover between channel (147) and bossed surface (107B). The filter shield protects the filter paper from chewing by animal residents. In certain embodiments, filter shield (107) is permanently adhered around its perimeter to cover (102) with adhesive. An alternative to adhesive is ultrasonic welding or heat sealing of the filter shield to the bottom surface of the cover (102). The sealed border can serve as a barrier to air leakage, and in certain embodiments, all or substantially all airflow passes through the filter paper. The filter paper often allows air to pass through and filters particles, and in some embodiments the filter paper is replaced with a non-breathable medium to prevent air from leaving the cage in the region to which the medium is affixed. In the latter embodiments, air can be evacuated from an exhaust port (145) and not from array of apertures (119A).

Figure 3:
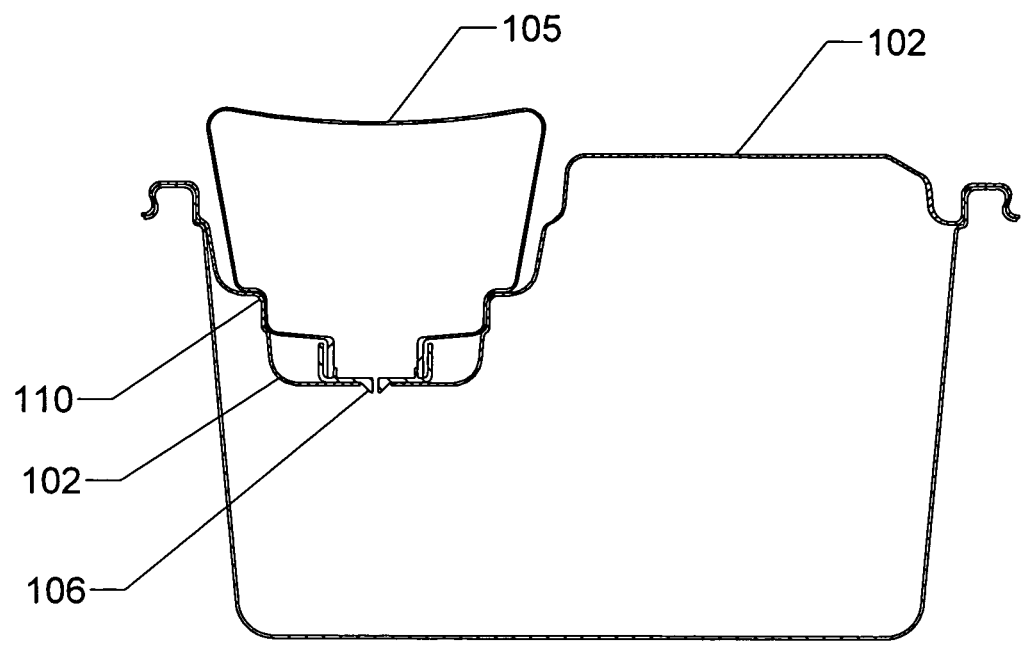
FIG. 3 and FIG. 4 are YZ plane cross-sections (coordinates are shown in FIG. 1).

FIG. 3 is a cross sectional view taken at the center of the water bottle in an embodiment. Radius (102) is sufficiently large to prevent chewing by an animal resident, and often is about 0.25 inches or greater, sometimes about 0.30 inches or greater, and sometimes is about 0.25 inches to about 0.50 inches. A small hole in the surface containing radius (102) allows passage of an optional nipple of screw cap (106) or allows access to a hole in a screw cap having a substantially flat surface. The hole is small enough to prevent animal residents (e.g., mice) from escaping when the water bottle is filled or replaced. Screw cap (106) may be alternatively substituted with a press-on cap or a bonded foil lid, thereby obviating mating threads in water bottle (105). Screw cap (106) has a substantially flat surface in some embodiments. The curved top surface of water bottle (105) provides strength and stability when rested upside down. Junction (110) between the water bottle and the top cover forms a seal (e.g., a tight fit seal) to prevent unwanted air from passing in or out of this region.

Figure 4:
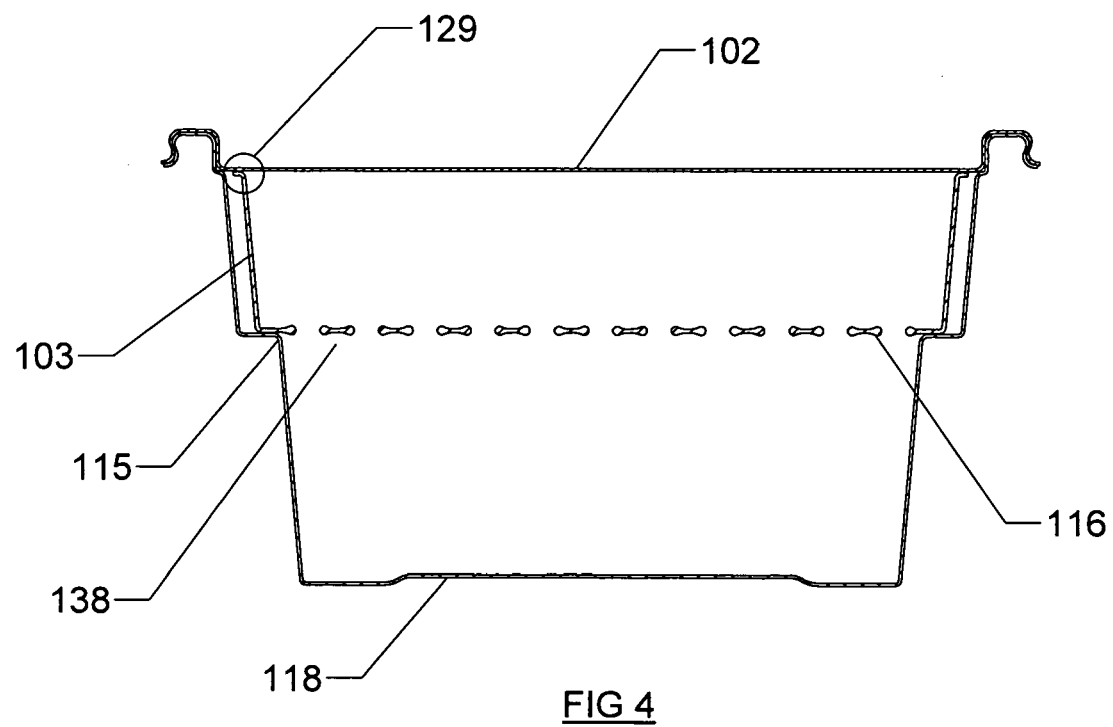

FIG. 4 is a cross sectional view taken through the food tray (103) of an embodiment. This view shows the food tray resting on tray indent (115). The top cover (102) prevents the food tray from being lifted in the upwards direction by animal residents (e.g., mice) while eating due to the proximity of the top of the food trough with the cover (129). Slots (138) allow animal residents to access food in the trough from below. Additional material (116) is located around the perimeter of the slots present rounded edges through which animal residents are less likely to chew than harder edges. Branding and logos may be affixed to the underside of raised area (118).

Figure 5:
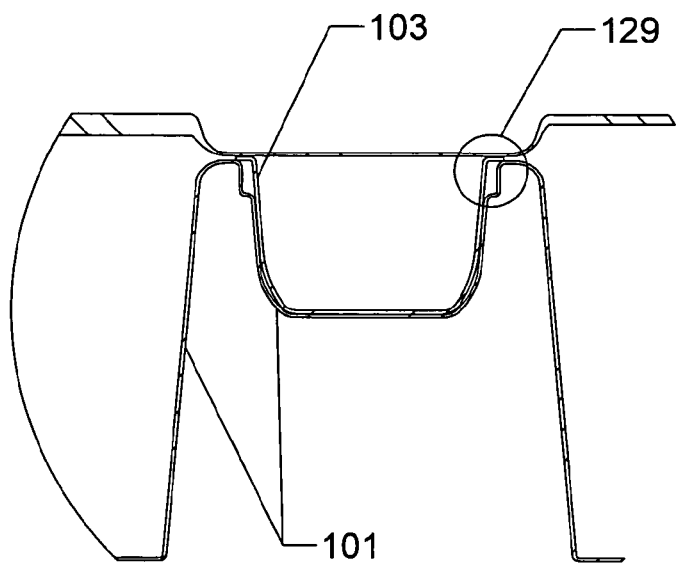
FIG. 5, FIG. 6, FIG. 7A, FIG. 7B and FIG. 8 are XZ plane cross-sections (coordinates shown in FIG. 1).
Figure 6:
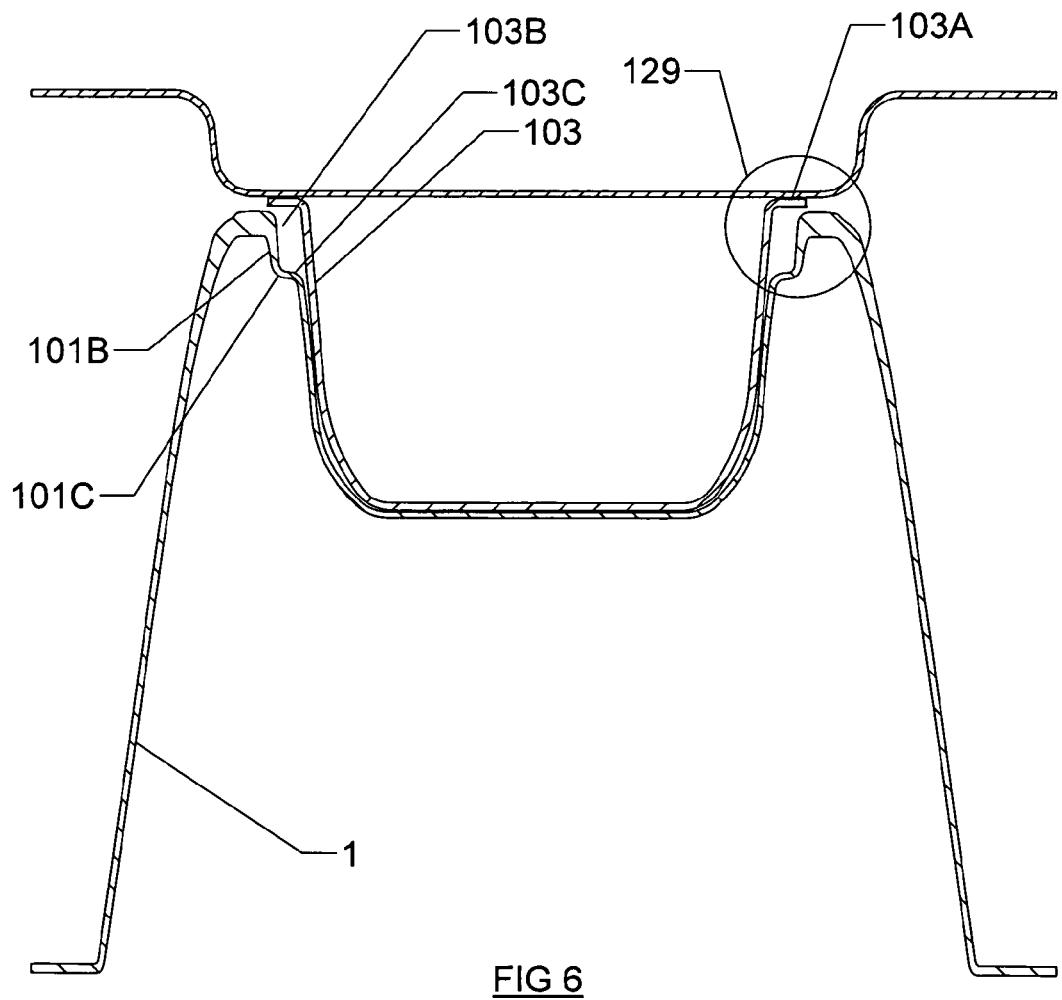

FIG. 5 is a cross sectional view taken through the end of the food tray of an embodiment. Area (129) shows the edge of food tray (103) is protected by the top cover so that animal residents cannot chew on the edge. Food tray (103) sometimes is constructed from metal to minimize effects of chewing or the user wishes to re-use this part. FIG. 6 is a cross sectional view taken through the end of the food tray in another embodiment. FIG. 6 shows an orientation of the trough engaged with the cage base. This view shows a configuration of the food trough resting on a mount formed within an indent in a cage base. A contact point between the cage cover, cage base and feeding trough (129) shows the edge of flange (103A) is protected by the top cover thereby protecting the flange from chewing by animal residents. Food tray (103) can be constructed of any suitable material for animal containment, such as a polymer (e.g., a substantially hard polymer) in single-use embodiments, or stainless steel if the user wishes to minimize chewing by animal residents or wishes to re-use this part. Surfaces (103B) and (103C) of the food trough increase rigidity of the structure and reduce troughs from adhering to one another one nested. In certain embodiments, apertures in the food trough are surrounded by thicker material than the material thickness of the trough sides and bottom, and the thicker material often forms ribs around the apertures. Such ribs can reduce any chewing damage to the food trough caused by an animal resident.

Figure 7A:
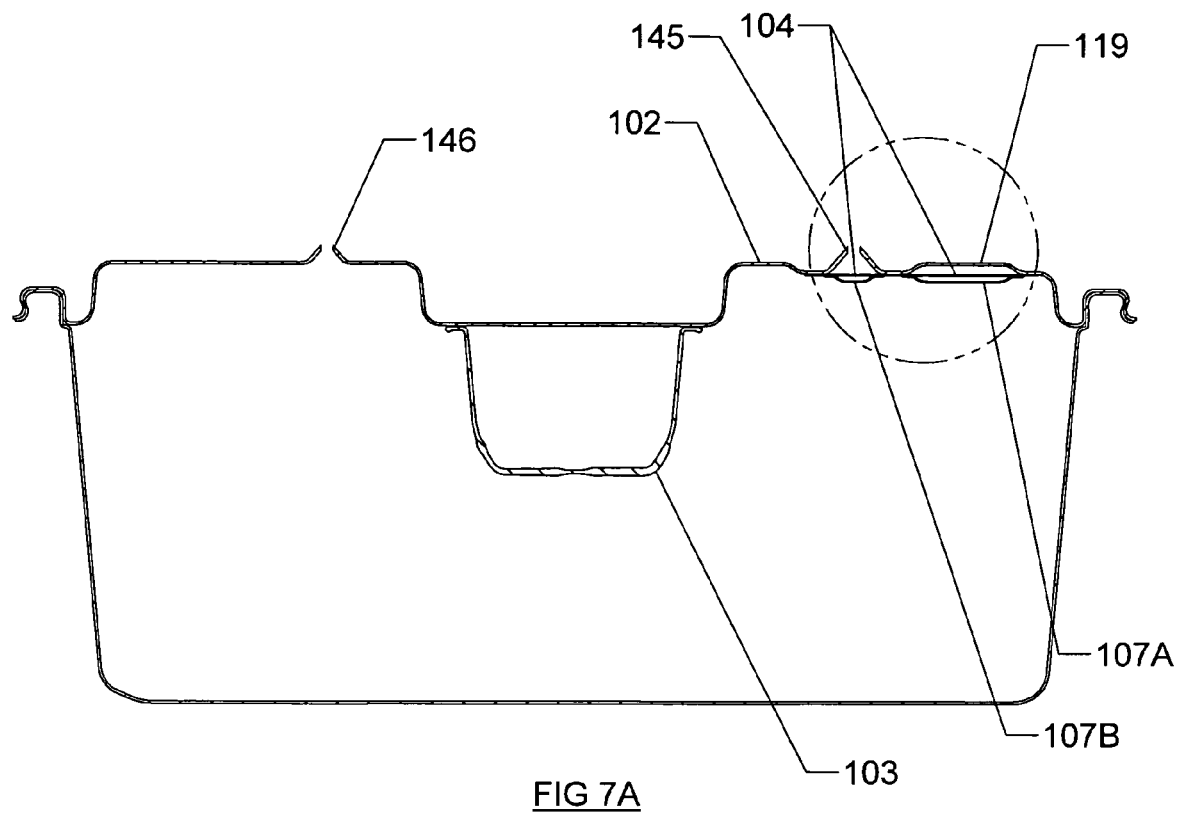
Figure 7B:
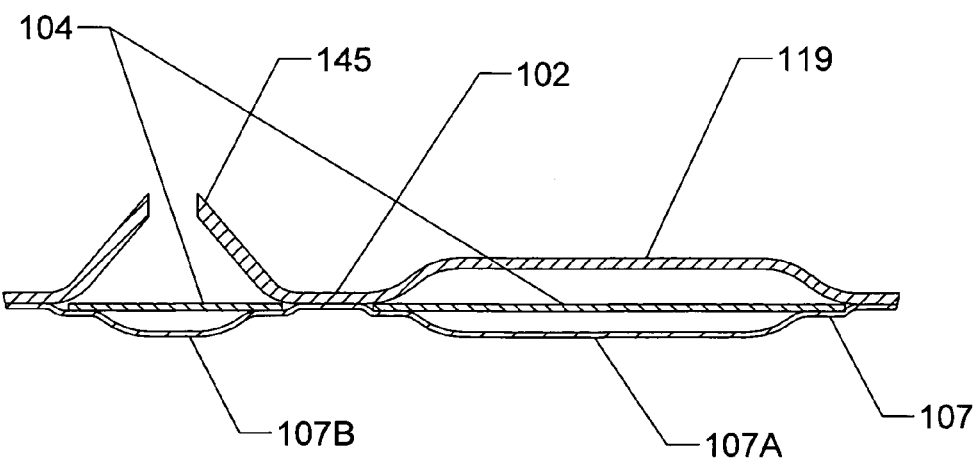

FIG. 7A is a cross sectional view taken through the middle of the cage. This view shows filter media (104) sandwiched between cover (102) and filter shield (107). An array of small holes (107C and 119A), sometimes having a diameter of about 0.125 inches, allow air to exit the cage. Holes (107C) also are sized to prevent animal residents from gnawing on the edges of the holes. Raised surface (119) allows air to diffuse before exiting or entering the filter, thereby facilitating airflow through the cage. Raised surface (107A) and raised surface (107B) prevent animal residents from accessing and gnawing on filter medium (104). Filter medium (104) is not allowed to droop due to ribs along the X axis placed between the arrays of holes (119A). Filter media also may be located directly below exhaust nozzle (145) and airflow channel (147). This geometry ensures air exiting the cage is filtered to prevent dust and debris from clogging downstream plumbing. The S-shaped flow channel (147) shown in FIG. 2 prevents filter media from deforming and adhering to the top surface of the channel, a feature which maintains airflow and decreases the possibility of airflow blockages by a deformed filter medium. Filter (104) generally is single use and is replaced each time the cover and cage is replaced. FIG. 7B is an expanded view of the encircled region of FIG. 7B, and shows raised surface (107A) and raised surface (107B) in the filter shield (107), raised surface (119) in the cover (102), filter media (104) and air exhaust port (145).

Figure 8:
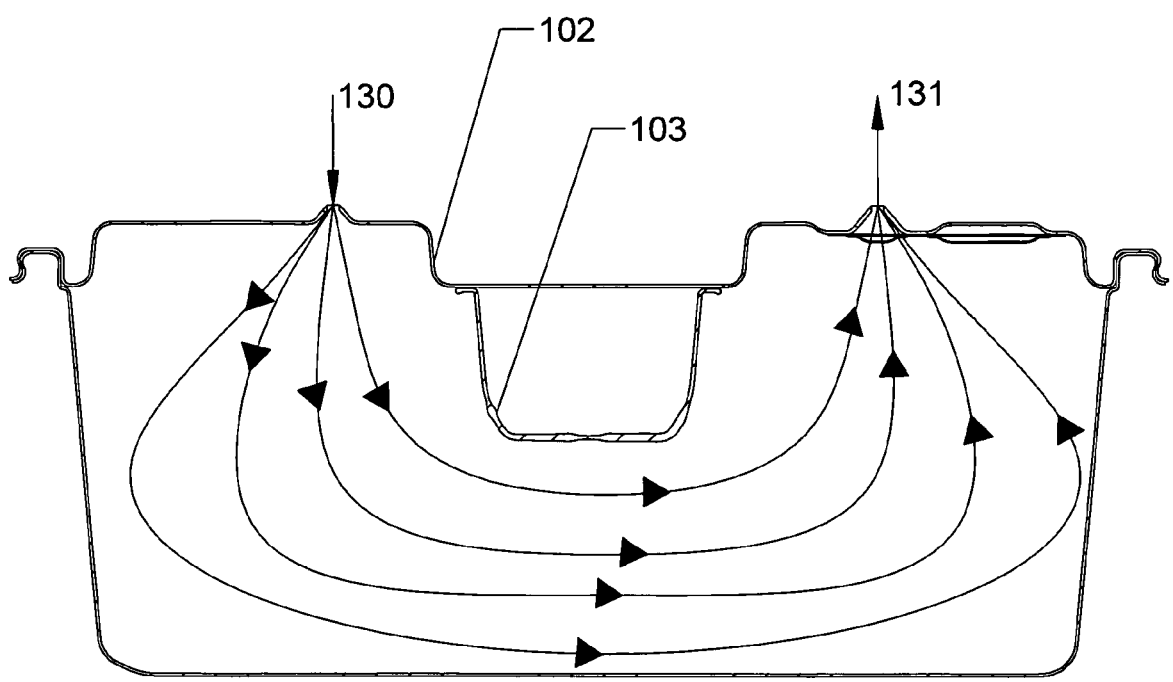

FIG. 8 is a cross sectional view taken through the middle of a food trough embodiment. Air enters the cage through aperture (130) and exits the cage through aperture (131). The figure shows airflow streamlines caused by food trough (103). Front to rear or rear to front airflow provides advantages of minimizing recirculation and efficiently purging cage air from the cage. Food trough (103) acts as a baffle to direct air into the bedding material where the air can efficiently remove contaminants from the cage.

Figure 9A:
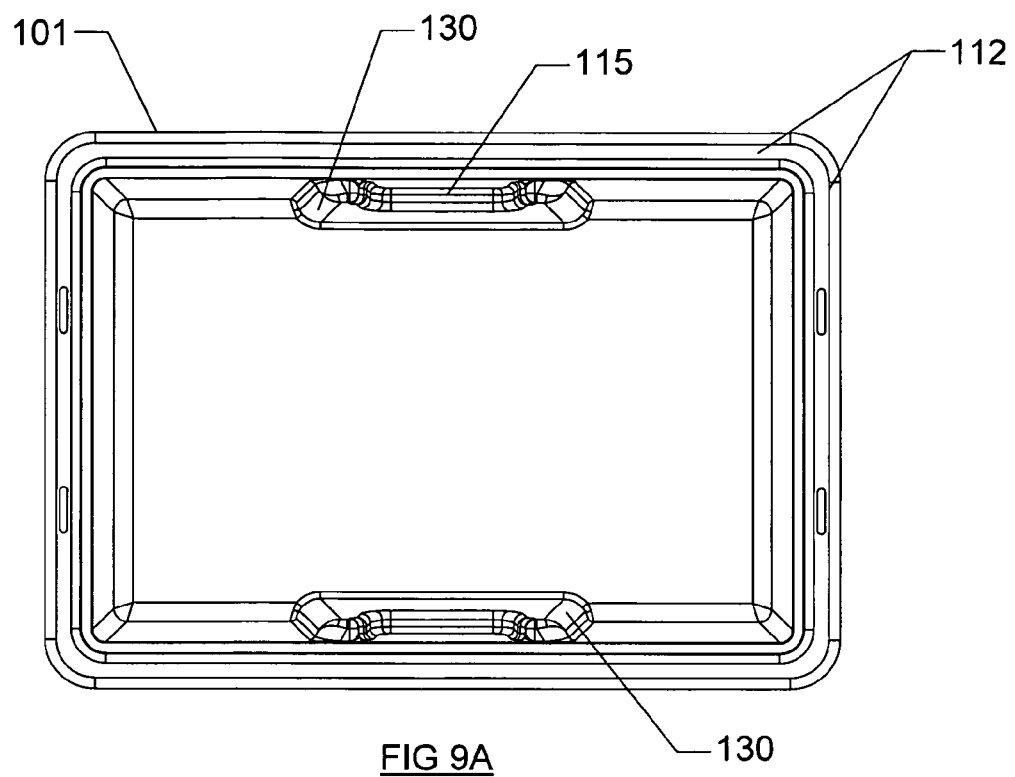
FIG. 9A and FIG. 9B show a top view of a cage base embodiment.
Figure 9B:
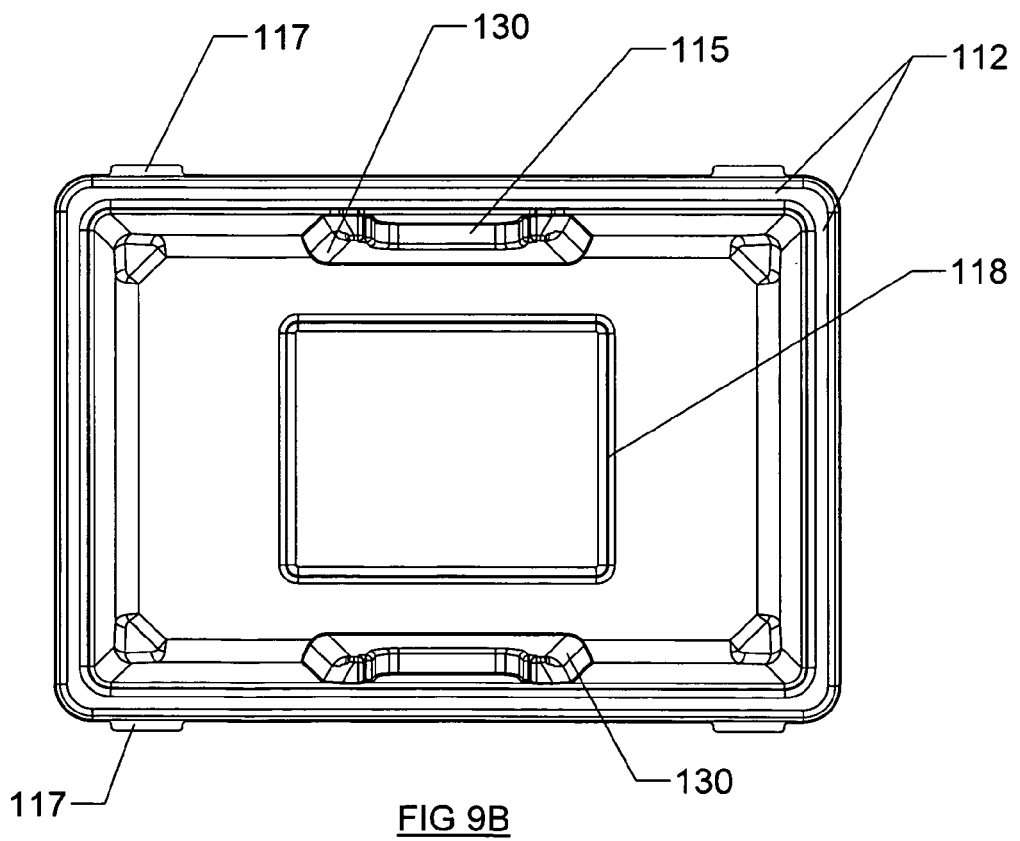

FIG. 9A and FIG. 9B show a top view of a cage base embodiment. This view shows food trough cradles or indents (115). Mating surface (112) is adapted to receive a top cover. Tabs (117) are useful for separating the cover (element 102 in FIG. 1) from the cage base (101). Radius (130) prevents gnawing on the cage, and often is about 0.25 inches or greater, sometimes about 0.30 inches or greater, and sometimes is about 0.25 inches to about 0.50 inches.

Figure 10A:
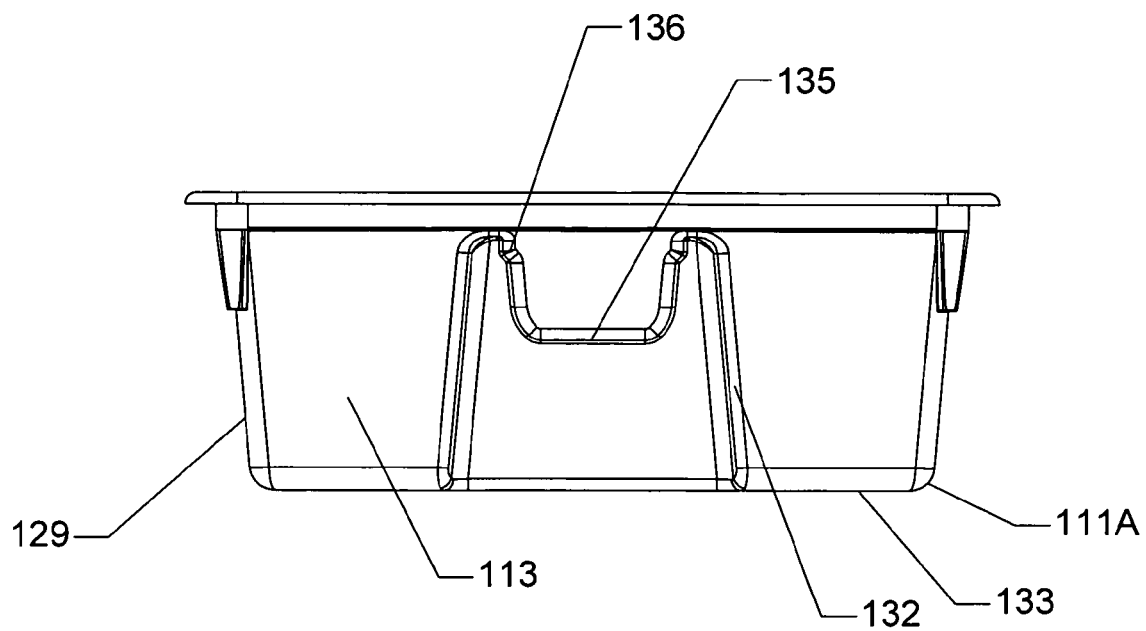
FIG. 10A and FIG. 10B show a side view of a cage base embodiment.
Figure 10B:
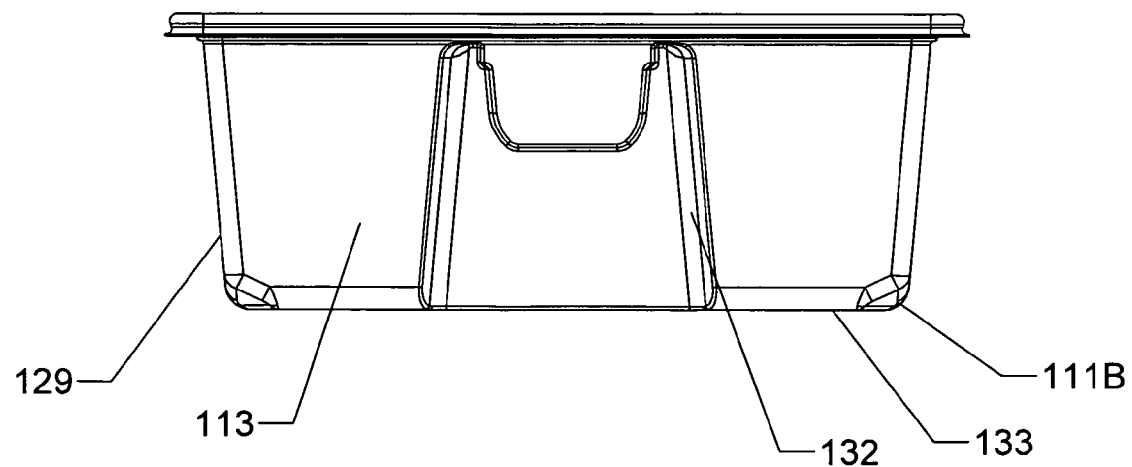

FIG. 10A and FIG. 10B show a side view of a cage base embodiment. Shown are front member (129) and side members (113). Radius (111) is located between the bottom (133) and the sides. Radius (111A) is a rounded corner effectively having one edge, and radius (111B) is effectively divided into three corners. Surface (135) receives a food tray and indent (136) aids in positioning the food tray and the food tray and prevents nested cages from significantly adhering as its short length is vertical.

Figure 11:
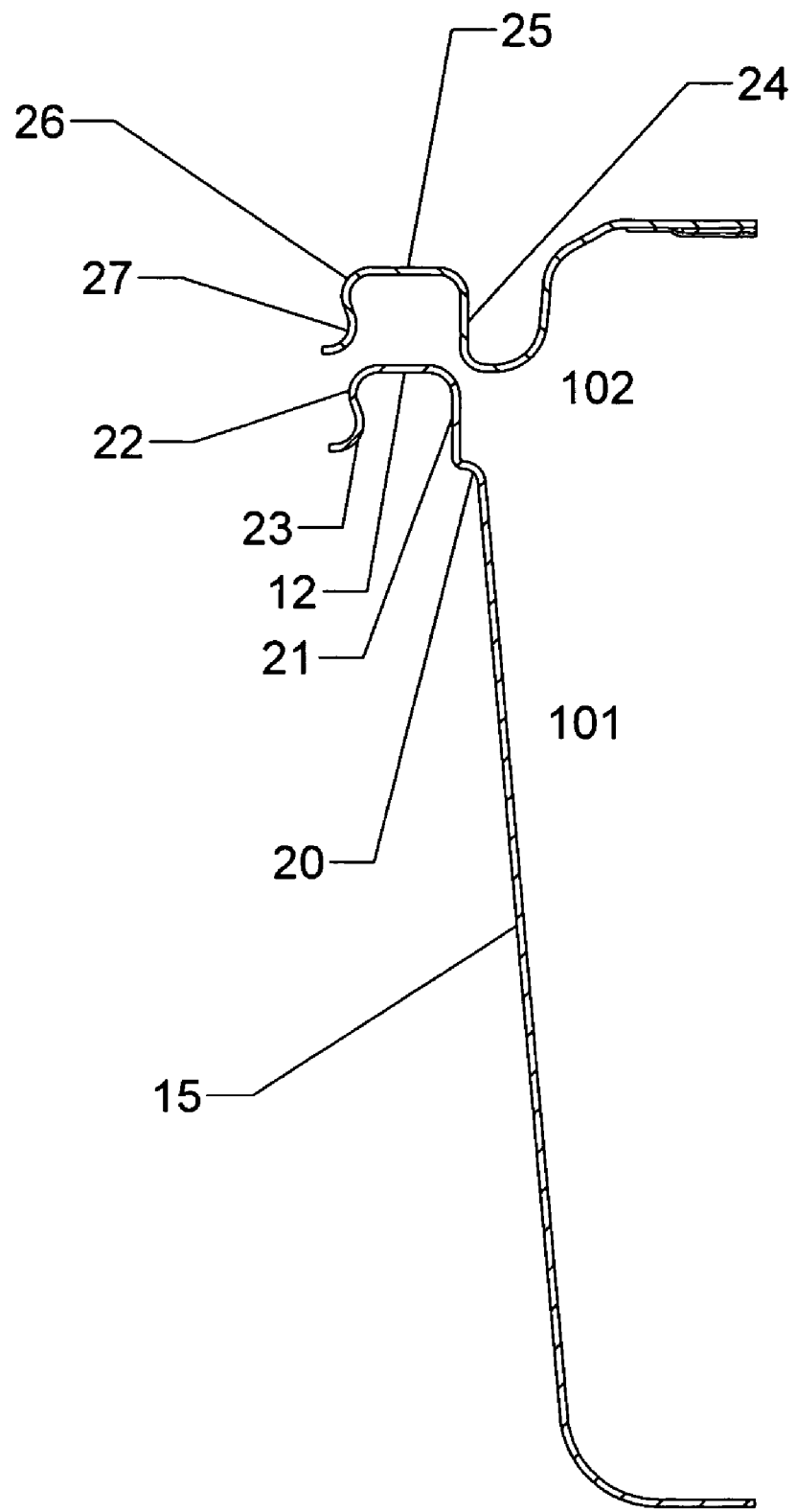
FIG. 11 is a section view showing an interference fit connection embodiment of a cage base and cage cover.

FIG. 11 is a section view showing a flange/lip portion of a cage base (101) positioned to mate with a corresponding portion of a cover member (102) by a snap interference fit. As the top cover is lowered onto the cage base portions of each deflects as cover lip member (27) is mated with cage lip member (22). When fully mated, cover lip member (27) snaps into its final position substantially adjacent to cage lip member (23) thereby forming a seal. Indent (20) can prevent cage bases from substantially adhering to one another when nested. Cage flange member (21) substantially mates with cover flange member (24) to provide a seal. In some embodiments, a cage base does not include member (23), members (23) and (12), members (23), (12) and (21), or members (23), (12), (21) and (20). In certain embodiments, a cage cover does not include member (27), members (27) and (26), or members (27), (26) and (25).

In certain embodiments, provided is an animal containment cage cover constructed from a polymer having a thickness of about 0.01 inches to about 0.08 inches. The thickness of the cover sometimes is about 0.01 inches to about 0.05 inches, and can be about 0.02 inches to about 0.06 inches or about 0.02 inches to about 0.03 inches. The cover often is semi-rigid and relatively flexible due to its relative thinness. A cover sometimes weighs about 175 grams or less or 150 grams or less, and often weighs about 125 grams or less or about 100 grams or less (e.g., about 75 grams). In certain embodiments, a cover comprises one or more filters, sometimes weighing about 5 grams (each or in total), and one or more optional filter shields, sometimes weighing about 25 grams or less. The cover sometimes is constructed from the same polymer as the cage base (e.g., a cover and base sometimes are constructed from PET), although the cover can be constructed from one polymer and cage base can be constructed from another polymer (e.g., a cage base may be constructed from a polystyrene and a cage cover may be constructed from low density polyethylene). The cover sometimes is in sealing connection with a cage base.

Also provided herein are animal containment cage covers that comprise an air inlet aperture and an air exit aperture. The air inlet sometimes is located substantially at one end of the cover and the air exit sometimes is located substantially at the other end. A cover sometimes comprises an array of air exit apertures. In some embodiments, a cover comprises an air supply connector comprising the air inlet aperture, and sometimes a cover comprises an air exhaust connector comprising the air exit aperture, or a combination thereof. These apertures sometimes are located on a bossed region of the cover, and two or more of these may be located on the same or different bossed region (e.g., the air inlet aperture(s) may be located one boss and the air exit aperture(s) may be located on another boss). One or more of such connectors can be convex with respect to the outer surface of the cover, and can be conical. For such embodiments pertaining to air inlet connectors, air can expand as it flows through air supply connector into the cage, which can reduce the temperature of the air and offset thermal load from an animal.

In certain embodiments, a cover comprises a channel in connection with an air exhaust connector and/or air inlet connector. The length of the channel often extends across the cage width (e.g., across the Y axis, FIG. 1), and sometimes extends part of the length of the cover, sometimes the entire length of the cover or sometimes substantially the entire length of the channel (e.g., terminates within about 2 to 3 inches independently from either edge of the cover). The channel length sometimes is non-linear, and sometimes it is sinusoidal. A channel can comprise apertures on the bottom side of the cover, and the apertures may be distributed across the length of the channel (e.g., evenly distributed or unevenly distributed), which can facilitate uniform air distribution within the cage. In certain embodiments, the channel in the cover is open along the bottom of its length, and sometimes the channel is formed by a channel in the cover and another channel in a filter shield joined to the underside of the cover. The channel in the filter shield in such embodiments often comprises apertures on the bottom side of the filter shield, which sometimes are distributed along the channel length. The channel in the filter shield can be of any geometry, and in certain embodiments, the channel length in the filter shield is linear. In some embodiments, the air inlet connector and channel connected to it is located substantially at one end of the cover and the air exhaust connector and channel connected to it is located substantially at the other end.

A cover comprises one or more filters (e.g., filter paper(s)) in some embodiments. A filter or combination of filters sometimes are adhered to or located in proximity to (e.g., located under) (a) a bossed surface of the cover, (b) an air aperture in the cover (c) an air inlet aperture, (d) an air exhaust aperture, (e) an array of air exhaust apertures, (f) an air inlet connector, (g) an air exhaust connector, (h) a filter shield surface, (h) a bossed surface of a filter shield, (i) a channel surface of a filter shield, (j) cover surface, (k) a channel surface of a cover, or combinations of the foregoing. A surface of the filter (e.g., the surface closest to a surface of a cover or shield member) sometimes is separated from the cover or shield surface member by about 0.05 inches to about one inch, sometimes about 0.1 inches to about 0.2 inches, and sometimes about 0.125 inches, which can facilitate airflow and/or reduce the possibility of filter damage caused by a contained animal. Thus, for embodiments in which the filter is under a boss of the cover, the surface of the filter closest to the bossed surface of the cover sometimes is separated from the bossed surface by about 0.05 inches to about one inch, sometimes about 0.1 inches to about 0.2 inches, and sometimes is separated by about 0.125 inches. In certain embodiments, the filter is located between the bossed surface of the cover and a filter shield in connection with the underside of the cover. The shield can be connected to the cover in any convenient manner, such as by an adhesive or a weld or welds, for example. The shield often comprises a bossed surface, which sometimes is located under, and optionally aligned with, the bossed surface of the cover, and the filter often is located between the bossed surface of the cover and the bossed surface of the shield. In the latter embodiments, the surface of the filter closest to the bossed surface of the shield is separated from the bossed surface of the shield by about 0.05 inches to about one inch (e.g., about 0.1 inches to about 0.2 inches or about 0.125 inches). The shield in some embodiments contains a channel, and sometimes contains a channel and a separate bossed surface having a larger surface area. An open channel of a shield often is located under an open channel of the cover, thereby forming a complete channel between the two members (e.g., FIG. 2), and a filter sometimes is located between the channel of the shield and the channel of the cover. In such embodiments, the channel and bossed region of the filter shield and cover often are separated by a barrier (e.g., adhesive or weld) to prevent or substantially reduce airflow bypass. In some embodiments, the channel and bossed surface may be located on separate shield parts affixed to the underside of the cover, and separate filters can be located within each shield piece. The shield often comprises one or more apertures, but may contain no apertures in certain embodiments. In certain embodiments, the bossed surface of a shield comprises apertures, sometimes an array of apertures often aligned with apertures in a bossed region of the cover. A channel in a shield sometimes comprises one or more apertures, and sometimes an array of apertures spaced across the length of the channel. Apertures in the cover and shield often are of a small enough diameter to substantially reduce or prevent gnawing by animal residents and allow for airflow. Apertures sometimes are of a maximum diameter of about 0.1 to about 0.2 inches and sometimes a diameter of about 0.125 inches. In some embodiments, the bossed surface of the shield or a channel in the shield comprises no apertures. In some embodiments, the cover comprises no filter, and sometimes a cover comprises a non-porous membrane that substantially blocks airflow.

Provided also are cages and other animal containment system components described herein in an elevated biosafety level environment, and uses of the such components and systems in elevated biosafety level environments. Elevated biosafety level environments include environments in which one or more risk components potentially harmful or harmful to personnel, such as pathogens, toxins or controlled substances, are utilized. Thus, provided is a containment system or components described herein in combination with an animal contacted with a risk component. Elevated biosafety level environments can include Biosafety Level 2, 3 or 4 environments. Biosafety Level 1 is suitable for work involving well-characterized agents not known to cause disease in healthy adult humans, and of minimal potential hazard to laboratory personnel and the environment. Biosafety Level 2 is similar to Level 1 and is suitable for work involving agents of moderate potential hazard to personnel and the environment. Biosafety Level 3 is applicable to clinical, diagnostic, teaching, research, or production facilities in which work is done with indigenous or exotic agents which may cause serious or potentially lethal disease as a result of exposure by the inhalation route. Biosafety Level 4 is required for work with dangerous and exotic agents which pose a high individual risk of aerosol-transmitted laboratory infections and life-threatening disease. In higher biosafety embodiments, one or more or all apertures of the cages often are in effective connection with one or more filters, and airflow components sometimes are in effective connection with one or more filters. Thus, one or more of the following containment components may be in effective connection with one or more filters (i.e., filtration occurs by direct or indirect connection): air exhaust aperture array, air exhaust connector, air supply connector, air supply aperture, air supply blower and air exhaust blower. In certain embodiments, one or more of these containment components are in effective connection with an airflow block (e.g., a non-porous membrane). For example, an array of exhaust apertures may be in connection with an airflow block, and an air inlet connector and air exhaust connector may be in effective connection with one or more filters.

In certain embodiments, provided are animal containment cage covers constructed from a polymer, comprising an air inlet aperture, an air exhaust aperture, a first filter in effective connection with the air inlet aperture (e.g., filters air entering the air inlet aperture) and a second filter in effective connection with the exhaust aperture (e.g., filters air exiting the exhaust aperture). In some embodiments, the first filter and the second filter and separate, and in other embodiments, the first filter and the second filter are coextensive or are regions of one filter. Each aperture sometimes is part of a connector. A connector often is convex and sometimes is conical, and in embodiments directed to air inlet connectors, air expands after it passes from the air inlet aperture through the connector. In some embodiments, the air exhaust aperture is part of an array of apertures. Such covers sometimes are in combination with a cage base having a wall or walls and a bottom, and sometimes in combination with other components, such as a rack, airflow unit, airflow controller, or combination thereof. Such cover embodiments can be utilized in higher biosafety level environments.

Certain embodiments are directed to an animal containment cage comprising a cover and a base having a wall or walls and a bottom, where the walls, bottom and cover are constructed from a polymer, and the cover and the base attach by an interference fit. In some embodiments, the interference fit is a snap interference fit or a friction interference fit. In certain embodiments, the base comprises a first flange, the cover comprises a second flange corresponding to the first flange and the interference fit results from deflection of the first flange and the second flange. The cover and base often sealingly attach and often reversibly attach. In certain embodiments, an edge of the cover is coextensive with an edge of the base (e.g., clamshell orientation), and alternatively, the cover and the base sometimes are separate.

Also provided are animal containment cage covers that comprise an integrated water supply receptacle. This receptacle in the cover sometimes comprises a water supply or is joined with a water supply. The cover receptacle sometimes is joined to a central watering system. The receptacle in the cover and water supply often fit with one another via an interference fit, where the interference fit sometimes is a friction fit and sometimes is a snap fit. The interference fit often provides an air-tight seal or substantially air-tight seal. The receptacle sometimes comprises a chamfer region and an aperture in the chamfer region, into which a water supply has a corresponding chamfer that mates with the chamfer of the receptacle. In certain embodiments, the receptacle and water supply are cylindrical or substantially cylindrical and the radius of the top portion of a water supply that inserts into the receptacle is larger than the bottom portion. The aperture often receives or reveals a water emitter connected to the water supply.

Provided also herein is an animal containment cage comprising a wall or walls, a bottom and a cover, where the walls, bottom and cover are constructed from a polymer, and the thickness of each wall is about 0.01 inches to about 0.08 inches. As described in embodiments above, the cover can be coextensive with a wall edge (e.g., clamshell), or the cover can be separate from the wall or walls and bottom of the cage. The thickness of the cover can be about 0.01 inches to about 0.08 inches, and the cover can be constructed from the same or a different polymer as the walls and bottom. The cover can comprise one or more air supply apertures, one or more air supply connectors, one or more air exhaust apertures, and/or one or more air exhaust connectors. The top surface of the one or more connectors often comprises an aperture. The connectors often are convex with respect to the outer surface of the cover, and can be protrusions that do not extend into the interior of the cage when the cover is attached. A sidewall of one or more connectors sometimes is conical.

Figure 12:
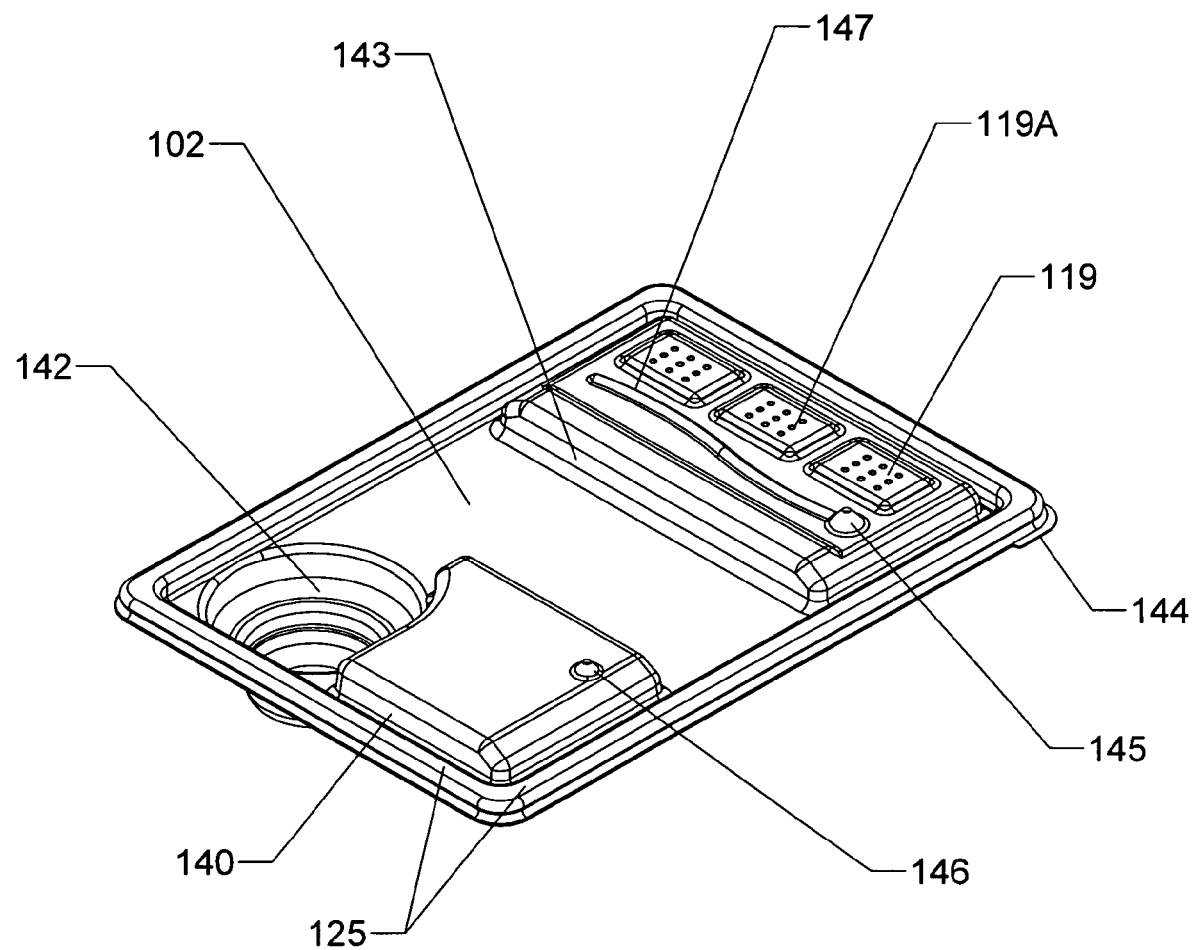
FIG. 12 shows a front isometric view of a cage cover embodiment.

Specific embodiments of cage covers are illustrated in FIGS. 12, 13, 14 and 15, in addition to depictions in previous Figures. FIG. 12 shows a front isometric view of a cage top embodiment. Receptacle (142) receives a water bottle. Boss (140) is raised above the mating surface that engages the cage base to achieve the minimum 5 inch ALAS requirement. Boss (140) also strengthens the cage top near the water bottle. Boss (143) is raised to achieve a cage height of about five inches. An array of exhaust holes (119A) in an raised embossed surface (119) allow sufficient airflow through the cage. Tab (144) can aid a user in separating lid (102) from a cage base (101). Tab (144) can be used in conjunction with tab (117) of the cage base to separate the parts by the user applying his or her thumb and index finger. The conical shape of the inlet conical receptacle (146) interfaces with a conical section in the rack shelf (e.g., element 220, e.g., FIG. 34) to form a seal. Conical receptacle (145) often serves as an exhaust port when mated with a conical exhaust connector.

Figure 13:
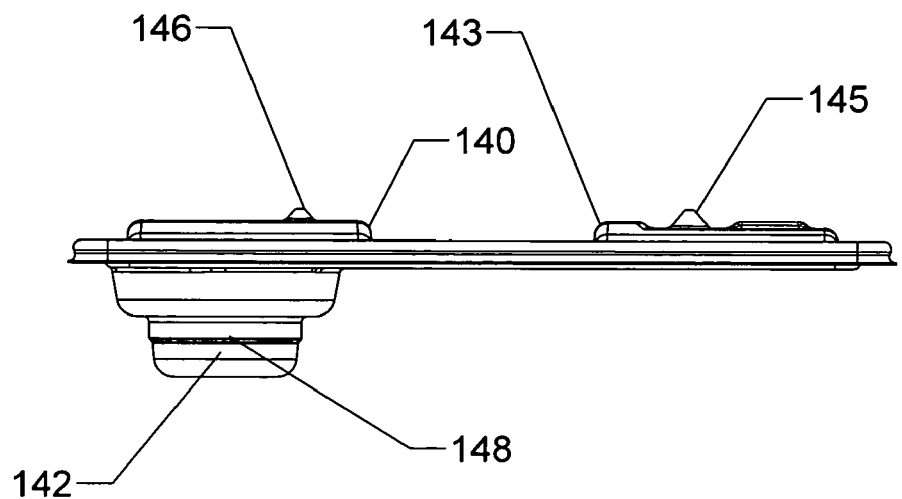
FIG. 13 shows a side view of a top cover embodiment.

FIG. 13 shows a side view of a top cover embodiment. Vertical shoulder (148) can form a seal with water bottle (105). The short vertical wall (148) prevents cage lids (102) from nesting too tightly and significantly adhering to one another.

Figure 14:
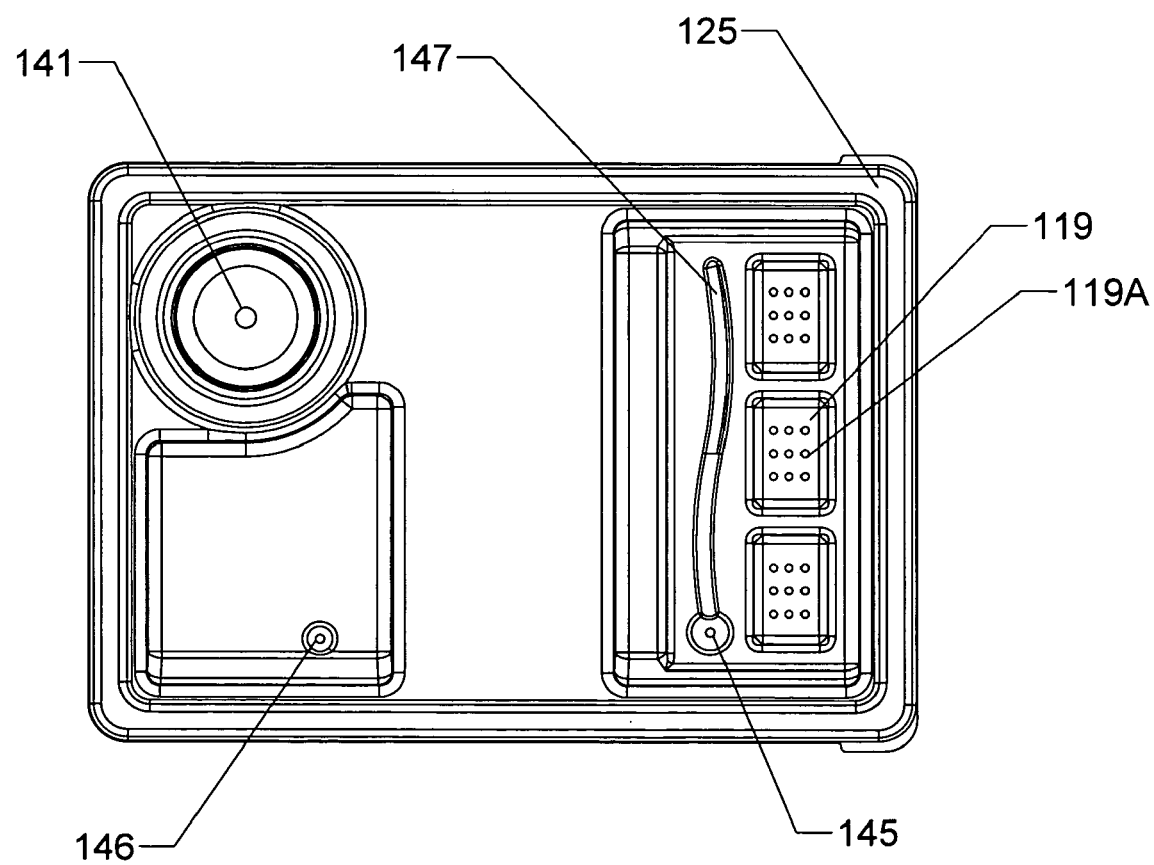
FIG. 14 shows a top view of a cover embodiment.

FIG. 14 shows a top view of a cover embodiment. Conical receptacles (145) and (146) can serve as alignment features to correct for a mis-inserted cage assembly. Depression of the array of holes (119) below the top surface of the boss separate affixed filter paper from the array of holes. This separation prevents animal residents from chewing on affixed filter paper. Water bottle cap (106) passes through aperture (141), the latter of which is small enough that an animal resident cannot escape if the water bottle is not present. Cones (145) and (146) can serve as alignment features to correct for a cage assembly mis-inserted into a rack. Raised surface (119) is embossed and includes an array of holes (119A). The raised surface stands the filter paper off the array of holes, which allows air to diffuse prior to exiting the cage. Water bottle cap (e.g., element 106 in FIG. 2) may pass through aperture (141).

Figure 15:
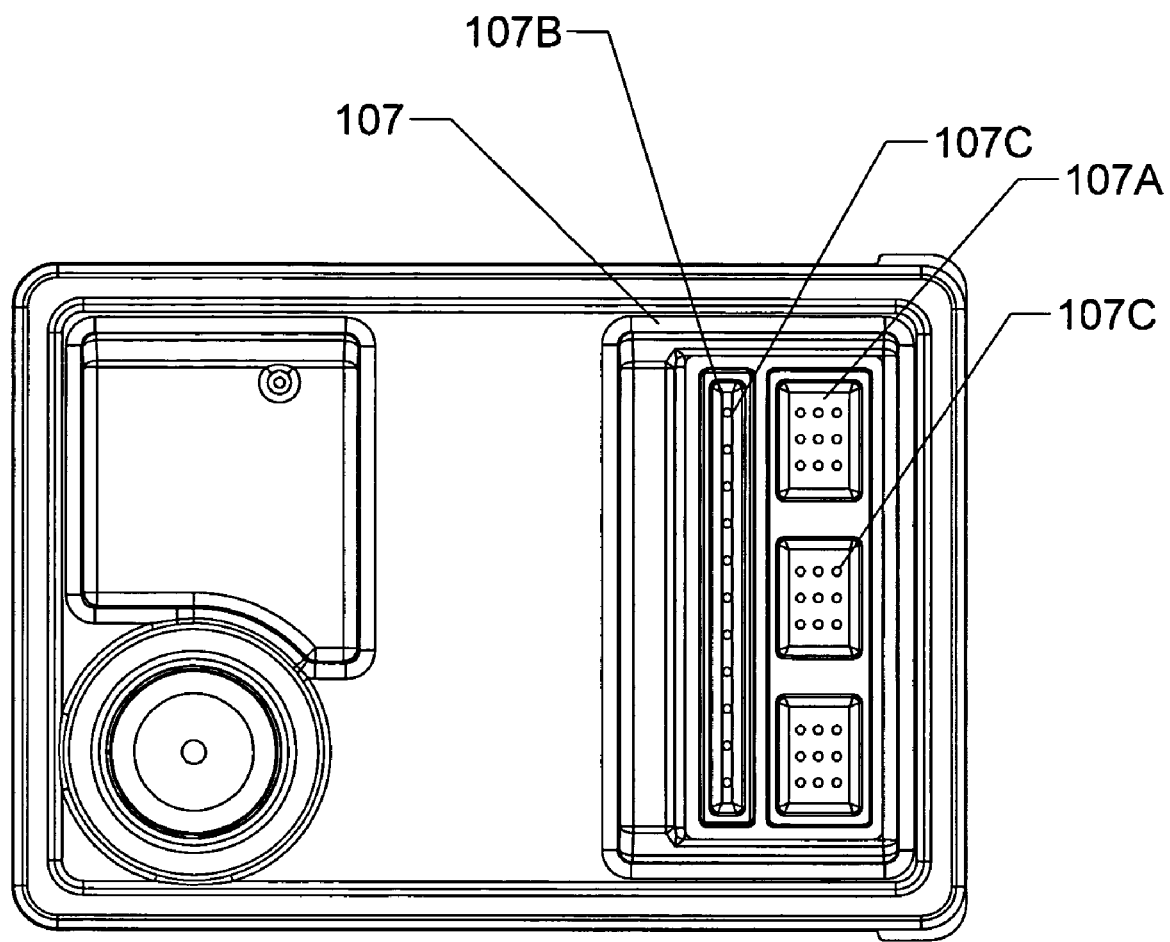
FIG. 15 is a bottom view of the top cover and an affixed filter shield.

FIG. 15 is a bottom view of the top cover and an affixed filter shield. Holes (107C) are distributed across the Y-axis of raised surface (107B). As a result of this distribution, air is uniformly drawn into the flow channel before it exits exhaust cone (145), and improves airflow on the side of the cage opposite the intake cone (146) and exhaust cone (145). The array of holes (107C) in raised portion (107A) of filter shield (107) are aligned with the holes in the top cover (119A). All holes in the filter shield are sized (e.g., less than or equal to about 0.125") to allow airflow and prevent chewing by eliminating or substantially reducing access of contained animals to the filter paper.

In certain embodiments, provided are animal containment cage food trays comprising walls, a bottom and apertures, where the walls and bottom are constructed from a polymer. The trays sometimes are injection molded, and apertures sometimes are surrounded by a rib thicker than the walls and bottom. A tray sometimes comprises a flange coextensive with the top edge of two or more walls, and sometimes comprises one or more tabs sharing an edge with a sidewall. Such tabs can fill gaps that would be present when the food tray joins with cradles in a cage but for the tabs. In certain embodiments, one or more sidewalls contain one or more bevels. Any suitable polymer can be utilized to construct a food tray (e.g., polymers described herein for cage bases and covers), and in certain embodiments, a tray is constructed from a substantially hard polymer such as polystyrene (e.g., high density polystyrene). The thickness of the tray walls and bottom often is about 0.03 inches to about 0.05 inches. In certain embodiments, one or more junctions at one or more walls and the bottom of the feeding tray are rounded junctions. The rounded junctions sometimes are defined by a radius of about 0.25 inches or greater, and the radius can be about 0.30 inches or greater or about 0.25 inches to about 0.50 inches. A feeding tray sometimes is in combination with a cage, and often is positioned by one or more mounts in one or more walls of the cage. The feeding tray can direct air entering the cage from the cover towards the cage bottom in some embodiments, and can function as a baffle that directs air entering the cage from the cover towards the cage bottom. In such embodiments, air flows into the cage from one location of the cover, flows under the feeding tray and exhausts through another location of the cover.

Figure 16:
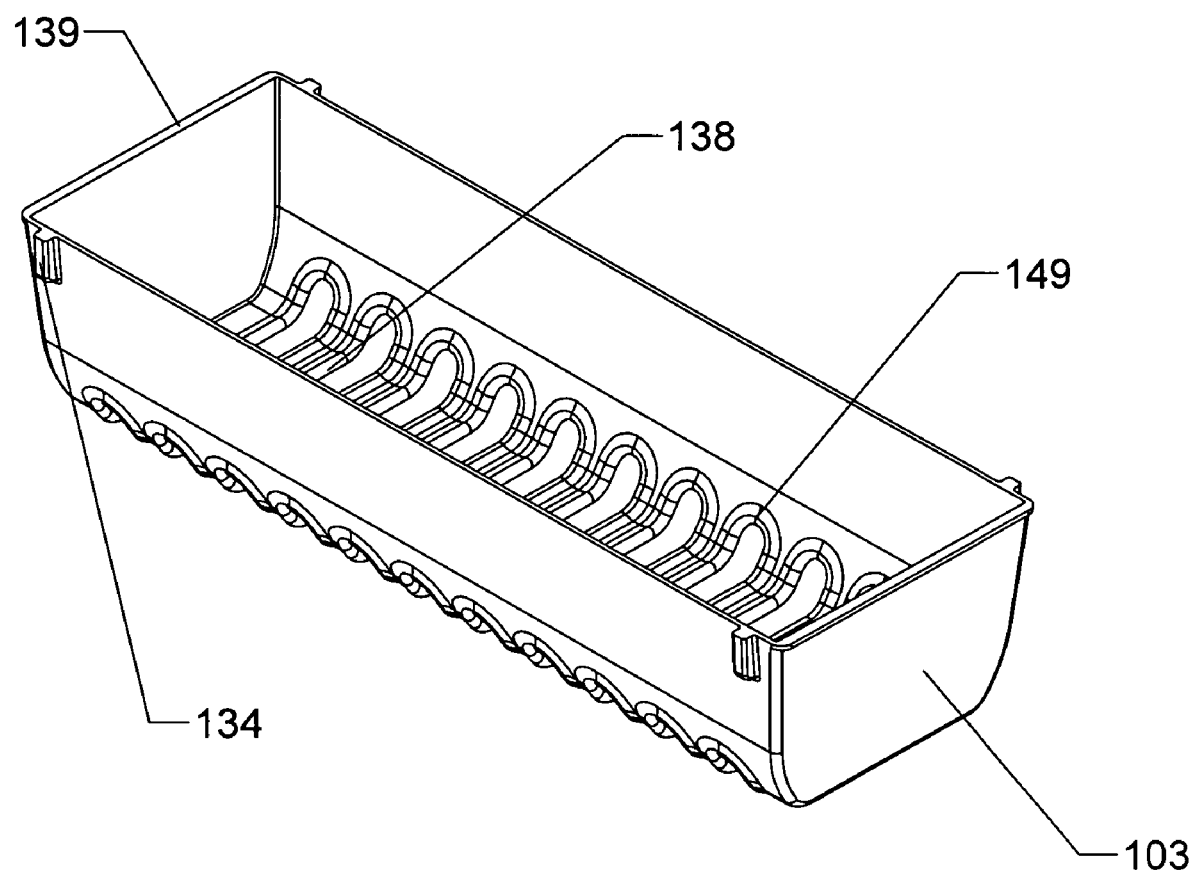
FIG. 16, FIG. 17A and FIG. 17B show food tray embodiments.
Figure 17A:
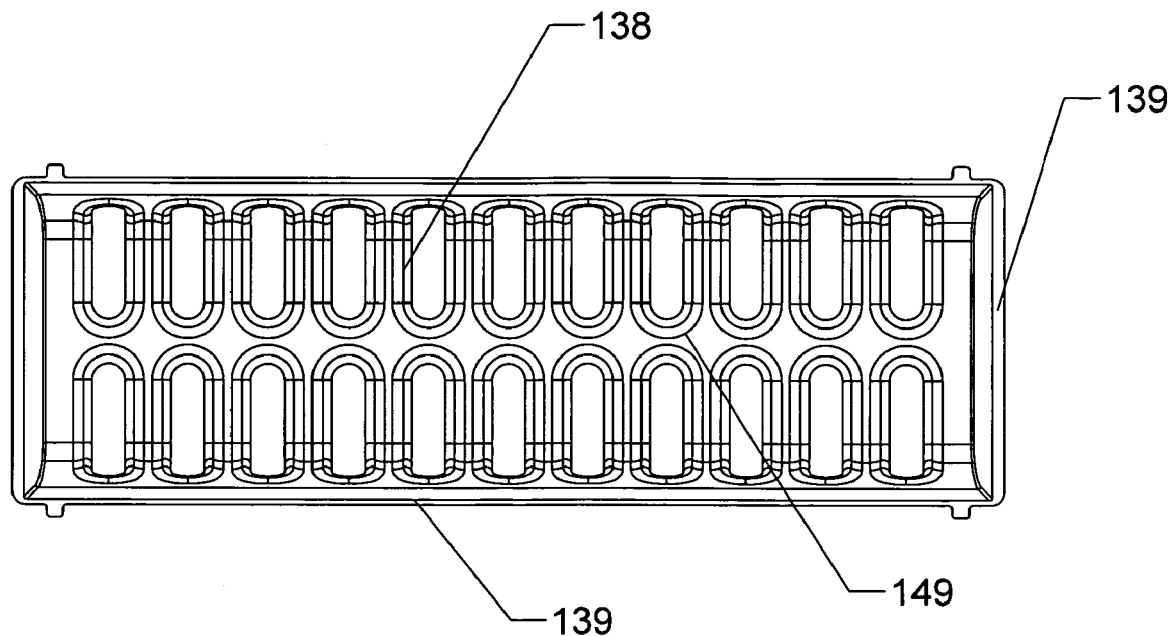
Figure 17B:
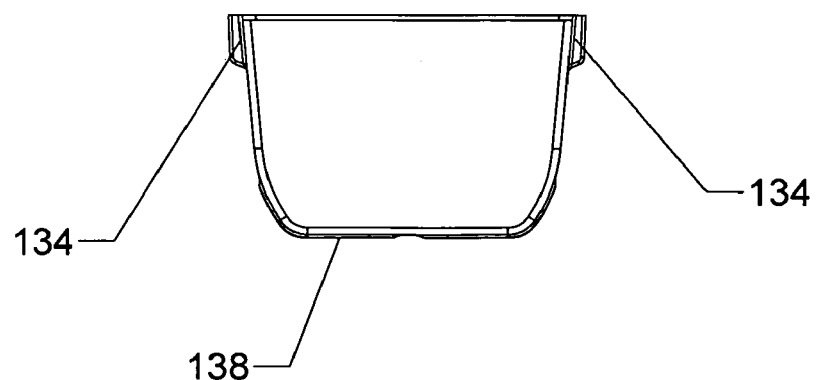

FIG. 16, FIG. 17A and FIG. 17B show specific food tray embodiments. FIG. 16 is an isometric view of a food trough embodiment. The figure illustrates perforate slots in the food trough that allow access to food. The entire perimeter of slots (138) have an increased thickness or rib to slow or prevent chewing on the food tray. Rib (149) also slows or prevents chewing on the food tray. Tabs (139) allow the food tray to rest in the indent of cage base (101). These tabs prevent the food tray from rocking in the cradle of the cage base (101). Strengthening ribs (134) support the tabs. FIG. 17A is a top view of the food trough embodiment. FIG. 17B is a side view of a food trough embodiment. Horizontal surface (138) allows for the food trough to rest on a cage indent. Rib (149) of increased thickness slows or prevents chewing on the edge near the top cover (102). Ribs (134) increase stiffness of the food tray.

In certain embodiments, a cover or cage comprises a water supply or is joined with a water supply. A water supply provides a hydrating liquid suitable for containing animals, which often is water. The cover or cage sometimes is joined to a central watering system. The water supply sometimes connects to the cage cover by an interference fit, which can be a friction fit or snap fit. The water supply generally comprises an aperture, and water often is retained at the aperture by surface tension. The aperture may be located in a cap in connection with the water supply. The cap can comprise a removable barrier over the aperture, and the cap sometimes comprises a substantially planar surface that generally does not comprise a raised member. The cap sometimes is reversibly attached to the water supply. The water supply sometimes is a water bottle that may be mounted in a receptacle in the cover. A cover or cage sometimes comprises an integrated water supply receptacle, and the receptacle may comprise a chamfer region and an aperture in the chamfer region. A water supply inserted into the receptacle may comprise a chamfer that mates with a corresponding chamfer of the holder. The receptacle and water supply can be cylindrical or substantially cylindrical and the radius of the top portion of a water supply that inserts into the receptacle is larger than the bottom portion. The receptacle may comprise an aperture that receives or reveals a water emitter connected to the water supply.

Figure 18A:
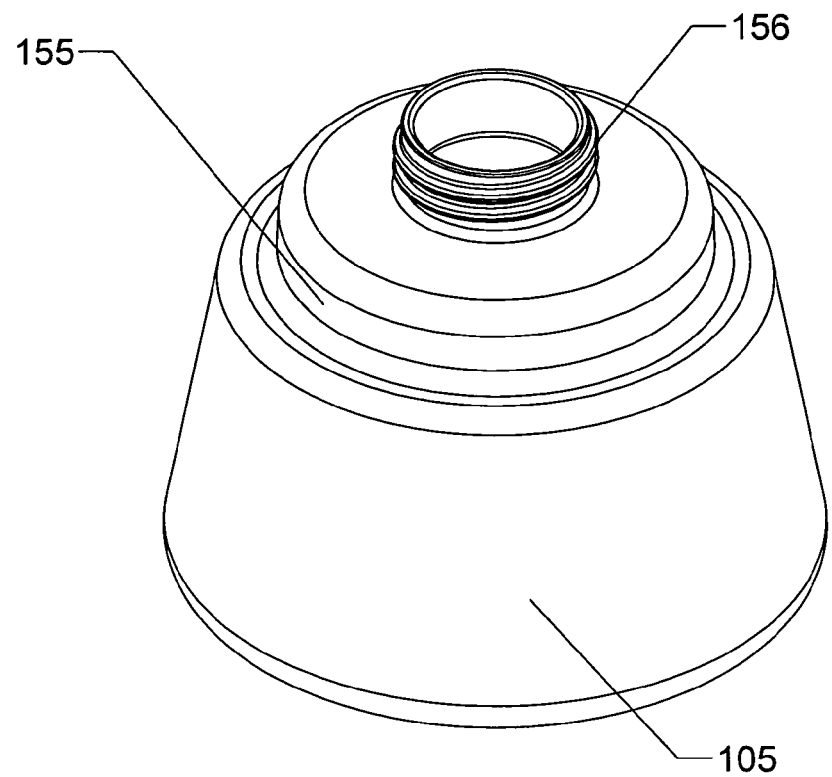
FIG. 18A and FIG. 18B show water bottle embodiments.
Figure 18B:
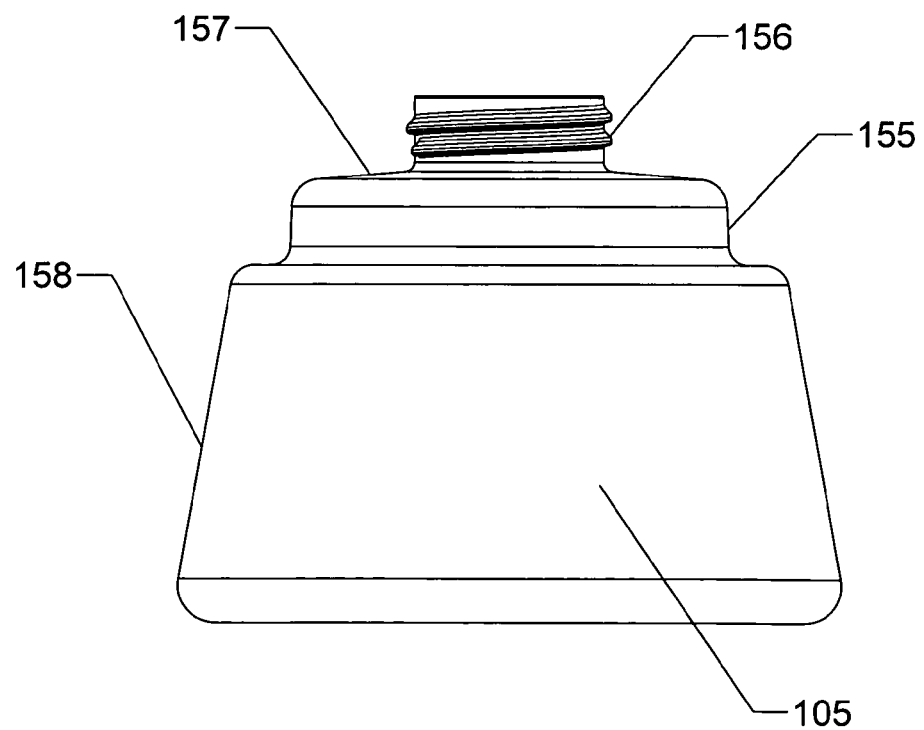

FIG. 18A and FIG. 18B show water bottle embodiments. FIG. 18A is an isometric view of a water bottle embodiment. Tapered shoulder (155) seals with the vertical surface of the top cover to form a seal. Tapered wall (105) allows for increased water capacity. FIG. 18B is a front view of the water bottle embodiment. Surface (157) is slightly tapered confers added strength to the neck region of the bottle. Tapered wall (158) allows for increased water capacity.

Nested Cage Components

A cage component can be inserted into another like cage component and several components can be stacked, which is referred to herein as "nesting." Nesting cage components significantly reduces the volume of multiple cage components as compared to the same number of un-nested members, which is advantageous for shipping, storage before housing an animal, and storage after housing an animal, for example. Any convenient number of like components can be nested, including, but not limited to, 10 or more, 20 or more, 30 or more, 40 or more, 50 or more, 60 or more, 70 or more, 80 or more, 90 or more or 100 or more like components. The degree or efficiency of nesting sometimes can be expressed in terms of a percentage, which is the height or volume of the nested component within another like component containing it, relative to the overall height or volume of the nested component. Thus, the term "80% nested" indicates 80% of the volume or height of a nested cage member, for example, is contained within the member in which it is inserted. When stacked, cage bases provided herein often are 75% or more nested, sometimes 80% or more or 85% or more nested, and sometimes about 90% to about 95% nested. Cage covers (described in greater detail hereafter) often are 75% or more nested, and sometimes are about 80% to about 85% nested when they include an integrated water reservoir/reservoir holder and/or feeder, and sometimes are about 90% or more nested when they do not include such structures. Such nesting calculations often are performed when no other components are in the cage base or cover (e.g., no bedding material at the bottom of the cage base).

A cage component sometimes comprises a nesting separation member that facilitates separation of nested cage components or substantially reduces or prevents compression of nested cage components. Compression or over-nesting of components can lead to nested components adhering to one another and interfere with freely separating nested units from one another. In certain embodiments, the nesting separation member is a curved member or indent member located at or near a flange member (e.g., see FIG. 11), for example. In some embodiments, a cage component sometimes comprises an indent or boss that butts (e.g., interferes with) a corresponding indent or boss of an adjacent nested cage base. Edges and/or corners of such bosses or indents sometimes are defined by a radius of 0.03 inches or less. Such an indent or boss can facilitate separation of the nested cage components from one another, and can prevent or substantially reduce compression and sticking of the nested units to one another.

Thus, in certain embodiments provided are nested sets of animal containment cage bases comprising cage bases having a bottom and a wall or walls, where the cage bases are about 75% nested or more. The wall, a subset of the walls or all walls often taper inwards towards the bottom. The cage bases sometimes are about 80% nested or more and can be 85% nested or more or about 90% to about 95% nested. Also provided are nested sets of animal containment cage covers comprising covers that are about 70% nested or more. The animal containment cage covers sometimes are about 80% nested or more, and can be 85% nested or more or about 90% to about 95% nested. The covers sometimes comprise one or more air inlet apertures and/or air exhaust apertures, one or more air exhaust connectors and/or one or more air supply connectors. Provided also is a nested set of animal containment cage food trays comprising sidewalls and a bottom constructed from a polymer and apertures, where the food trays are 70% nested or more. The animal containment cage food trays sometimes are about 80% nested or more, and can be 85% nested or more or about 90% to about 95% nested. Each component of the nested components often is constructed from a polymer and often is about 0.01 inches to about 0.08 inches thick. Examples of polymers and thicknesses are described above. In some embodiments, cage bases with bedding material are nested before or after use. Nesting cage bases with soiled bedding material may substantially reduce emission of substances in the soiled bedding.

Sensing Detection and Monitoring Devices

A detector of one or more animal emissions or cage conditions sometimes is in association with a cage. Any detector can be utilized that detects an animal emission (e.g., ammonia) or a cage condition (e.g., humidity, temperature, airflow). In some embodiments, the detector comprises a sensing probe, where the probe sometimes traverses or pierces through a cover member, sometimes passes through an aperture in a cover member (the aperture sometimes is defined by a break-away member), and/or sometimes is sealingly associated with the top surface of a cover. In some embodiments, the probe contacts the top surface of the cover at a porous zone in the cover allowing the probe to contact cage conditions (e.g., gases and fluids). In certain embodiments, a sensing probe is linked to a monitor device that detects one or more conditions or emissions, sometimes continuously.

In some embodiments, the detector comprises one or more chemical compounds capable of changing a property when contacted with a particular condition or emission. For example, the detector sometimes comprises one or more chemical compounds that change color when a particular level of ammonia accumulates in a cage. In such examples, the chemical components sometimes are contained within or on another material. Such detectors sometimes are associated with a transparent or semi-transparent member of a cage, and the detector is associated or mated to a cage member by any convenient technique (e.g., the detector and cage member sometimes are connected by an adhesive or a detector is placed in a holder member mounted to the cage member). A detector often is mounted on the surface of a cage component, such as an inner surface of a base sidewall member or the bottom surface of cover member, and a color change, for example, can be detected visually through the thickness of a transparent member of a cage. Such detectors can be utilized to detect conditions other than a minimum ammonia level, such as temperature and/or humidity, for example.

In some embodiments, a detector that senses cage changes is utilized. Any detector suitable for detecting cage change frequency can be utilized, such as a microswitch, for example. Such a detector often is coupled to electronics and a computer for following the number of cage changes over a period of time, determining the frequency of cage changes, assigning a time stamp for cage changes and determining change intervals, for example. Other detectors also may be utilized, such as motion detectors that sense the activity or non-activity of animals in a cage, for example. Detectors sometimes are connected to or are in association with a rack unit, described hereafter.

In some embodiments, a detector that senses airflow and/or air pressure is utilized for monitoring and optionally adjusting supply air to cages. Known sensors can be utilized in such embodiments. Depending upon how often cages are cleaned or exchanged, airflow volume sometimes will require adjustment. Over time a HEPA filter and/or pre-filter can clog with contaminates resulting in higher impedance to airflow. The system can be adapted to adjust in such circumstances to maintain equal airflow until a threshold is met and the user must service the filters. Such airflow, air monitoring and control devices are described in greater detail hereafter.

Reusable Cages

Reusable cages often include similar designs and components as disposable cages described herein. Reusable cage components often are constructed from a polymer suitable for injection molding, can withstand autoclaving and have good impact strength. Non-limiting examples of such materials are polycarbonate and polysulfone. While the thickness of each cage component may vary throughout, the thickness often is uniform within a component. The thickness of a reusable cage component sometimes is between about 0.060 inches to about 0.125 inches.

A reusable cage assembly may include one or more components for reversibly joining two or more components together. Such a component sometimes is a gasket for joining a cage base to a cage cover. Such a gasket often surrounds an outer surface of a base unit cover and sometimes surrounds an inner surface of a cage base. The gasket often is adhered to one of these cage members (e.g., base or cover) and sometimes is reversibly attachable. A gasket sometimes contains a ridge (one or more), angled or vertical with respect to the gasket surface, which often surrounds the outside of the gasket, and that can deform or deflect when the gasket, cage base and cage cover are mated. The gasket can allow the cage cover and cage base to engage in an interference fit or snap fit. A gasket is constructed from any suitable material for containing animals and for forming a seal between a cage base and cover. The material from which the gasket is constructed may be elastic or may be non-elastic, and sometimes is a material such as rubber, plastic or silicon.

Another component reversibly joins a filter to a cage cover, and often is a filter cover or support that reversibly mates with a corresponding structure in the cage cover. The component sometimes is a cover that sandwiches the filter between it and a corresponding structure on a cage member. The component also may be a A reusable cage often will not contain a metal connector that connects ventilation tubing, especially not in the base, or that connects a cage cover to a base. A reusable cage may include an optional aperture (e.g., one or two apertures) through which an air supply or air exhaust tube from a rack unit may be inserted.

Figure 19:
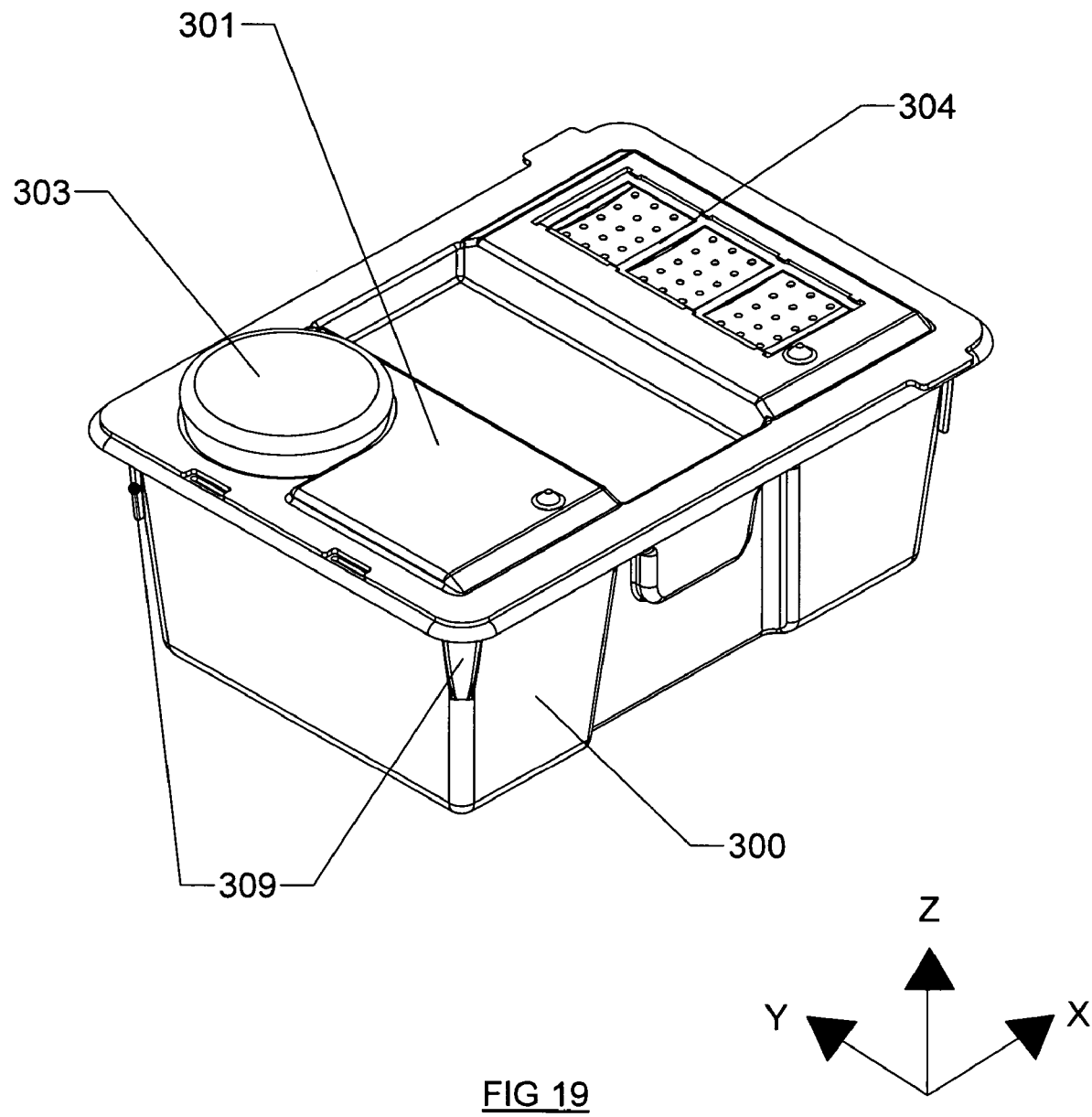
FIG. 19 shows a top isometric view of an assembled reusable cage embodiment. Shown is a general overview of an assembled cage embodiment from the upper front perspective. The reusable cage assembly is of a similar design as disposable cage parts and assemblies shown in FIG. 1 to FIG. 18, and therefore water bottles and food troughs are interchangeable between single-use and reusable cages.
Figure 20:
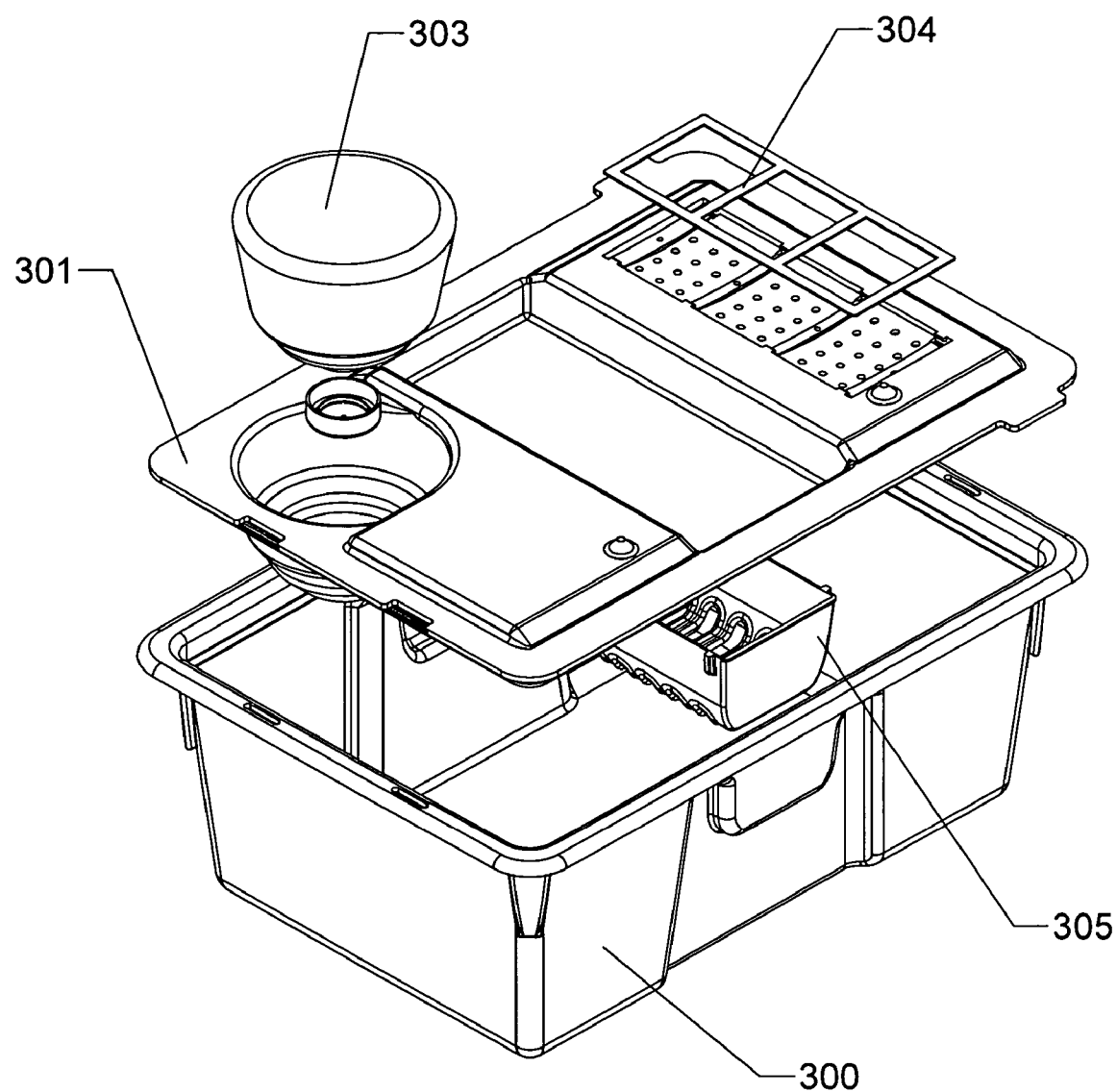
FIG. 20 shows an exploded view of the cage assembly embodiment from the upper rear perspective.
Figure 21:
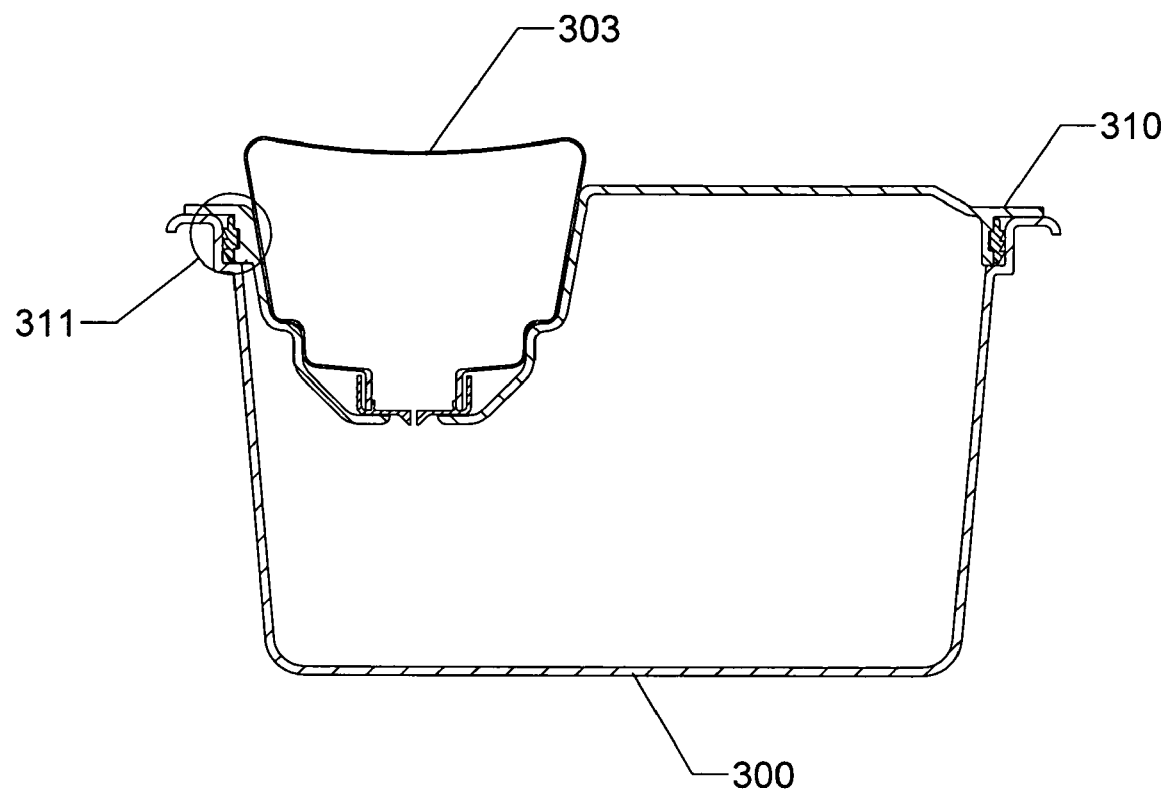
FIG. 21 is a cross sectional view taken at the center of the water bottle in a reusable cage embodiment.
Figure 22:
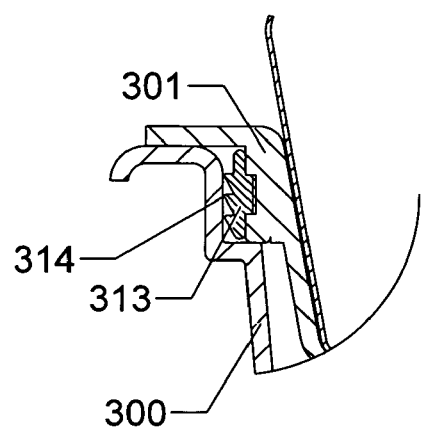
FIG. 22 is a close-up view of seal (311).
Figure 23:
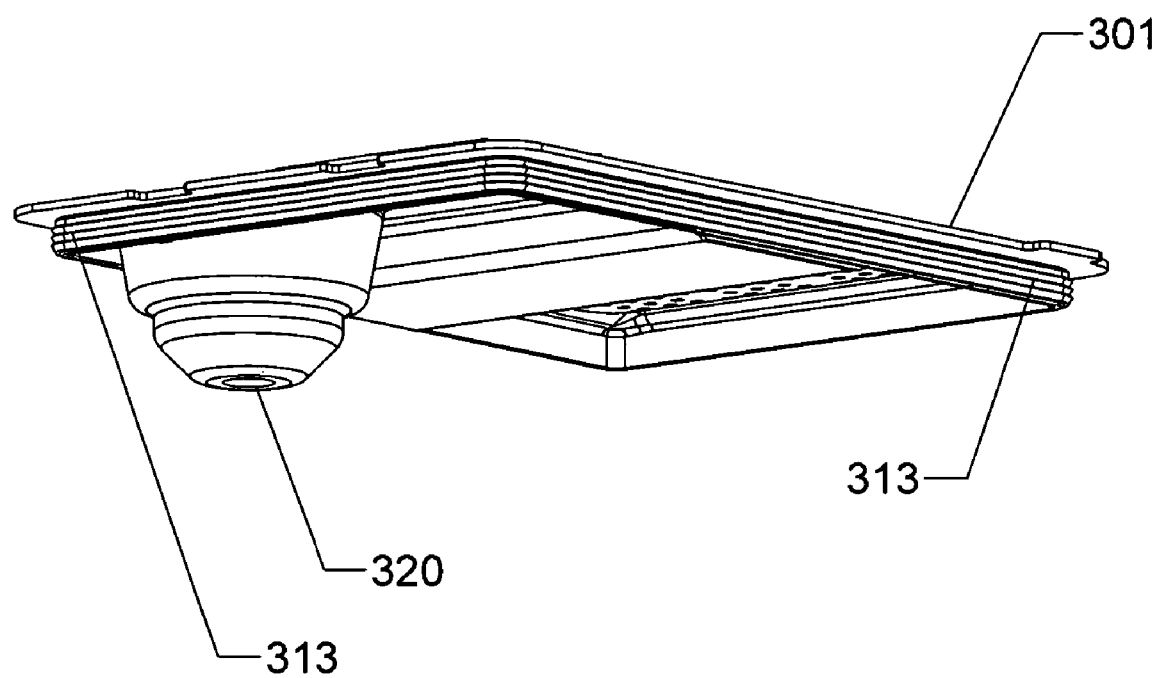
FIG. 23 is a bottom isometric view showing gasket (313) surrounding the perimeter of cage lid (301).

Examples of reusable cage embodiments are illustrated in FIG. 19, FIG. 20, FIG. 21, FIG. 22, FIG. 23, FIG. 24 and FIG. 25. FIG. 19 shows a top isometric view of an assembled reusable cage embodiment. Shown is a general overview of an assembled cage embodiment from the upper front perspective. The reusable cage assembly is of a similar design as disposable cage parts and assemblies shown in FIG. 1 to FIG. 18, and therefore water bottles and food troughs are interchangeable between single-use and reusable cages. FIG. 20 shows an exploded view of the cage assembly embodiment from the upper rear perspective. Shown are individual parts that comprise the cage assembly. Food trough (305) may be of the same geometry as for disposable food trough embodiments described herein, and the reusable version often is constructed from metal or thick plastic. Water bottle (303) may be of the same geometry as for disposable water bottle embodiments described herein. Filter assembly (304) snaps into the dished area in lid (301) and secures the paper below it to the lid. FIG. 21 is a cross sectional view taken at the center of the water bottle in a reusable cage embodiment. The water bottle is seated in the cage lid in a manner similar to or the same as in disposable embodiments described herein. Sealing mechanism (311) is effected by elements (301) and (300) and flange (310) supports. FIG. 22 is a close-up view of seal (311). Ridges (314) surround the entire perimeter of the lid (301) and contact the cage base member (300) to form a seal. Gasket (313) is a flexible material (e.g., soft rubber) that often is permanently attached to lid (301). Ridges (314) interfere with member (300) slightly so that the flexible material compresses and deforms to provide a seal. The flexible material may be coated with a metal cloth to reduce the sliding friction experienced when removing the top cover. FIG. 23 is a bottom isometric view showing gasket (313) surrounding the perimeter of cage lid (301).

Figure 24:
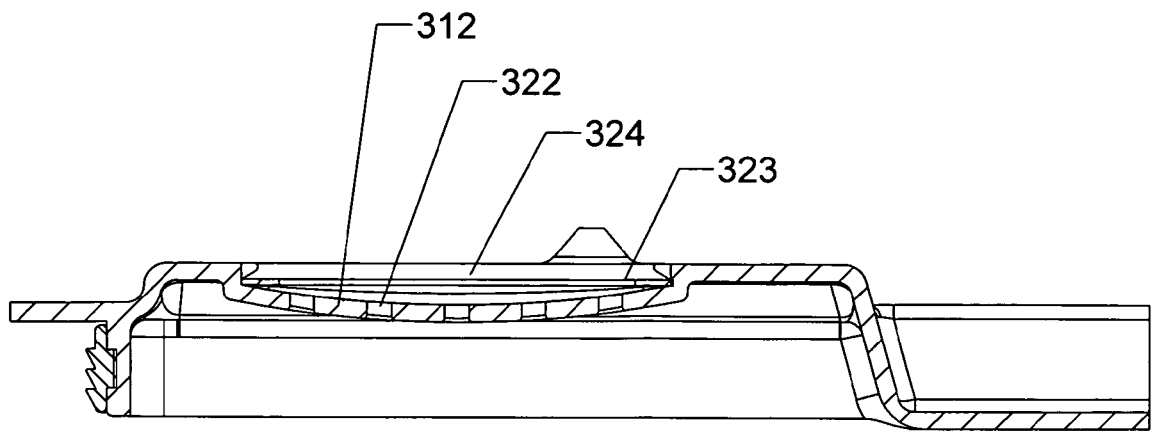
FIG. 24 and FIG. 25 illustrate a removable filter assembly that can be installed in reusable cage covers.
Figure 25:
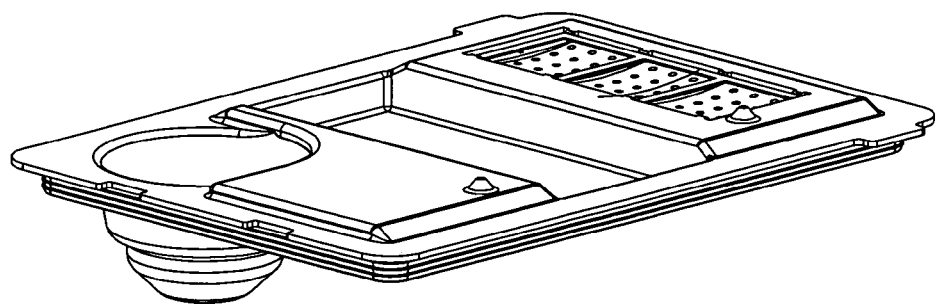

FIG. 24 shows a filter component that can be removeably attached to a cage cover. The cage cover in an embodiment includes a depressed surface (321) comprising an array of apertures (322). The flat filter component (323) is depicted in a cross sectional view and is installed at the top of the cover. The filter component comprises a flexible and elastic pane (324) (e.g., often constructed from a plastic or metal material) to which the filter medium (e.g., filter paper) is adhered, often to the underside of the pane. The user deforms the filter assembly into a partial cylindrical shape, often by applying squeezing pressure to the assembly, and then installs the assembly in the cover. When coupled with the cage cover, a portion of the filter assembly is lodged under a lip or overhang in the cover. FIG. 25 shows another view of the deflected filter assembly installed in the cover and illustrates the filter assembly conforms to the shape of the cover. The filter frame may contain other structures, such as arch structures, which can act as springs that apply constant and uniform pressure thereby conforming the filter assembly into the top cover depression. The assembly results in the filter paper tightly conforming to the top cover.

Rack Units

Rack units sometimes are referred to herein as "cage mounting platforms" or "cage mounting systems." The racks sometimes are modular and can be assembled from reversibly connected rack modules. A rack module is of any configuration that allows for reversible stacking in a vertical or horizontal configuration. A rack module sometimes comprises a bottom member, two sidewall members a top member, and sometimes a back member and front member (e.g., a skin), where the sidewall members often are parallel or substantially parallel and the top and bottom members often are parallel or substantially parallel. In some embodiments, rack modules are connected by two connection members, one on each side of the module, where the connection member is a post that inserts into an aperture in a rack module. In some embodiments a rack module comprises four horizontal posts vertically extended from each corner of a rectangular bottom member, and connected to a rectangular top member. A rack module is constructed from any material of sufficient resilience to allow for repeated assembly and disassembly of rack units. Examples of materials used to construct a rack unit module include metal alloys (e.g., sheet metal) or polymers and the like and combinations of the foregoing. A rack module often comprises airflow components, often located internally, such as plenums, cage supply tubes, and exhaust ports, which are described hereafter.

A connection member for linking one rack module to another sometimes is integrated with one of the rack unit modules and sometimes is separate from the module and/or other modules in the rack unit. In some embodiments, a connection member is engaged with a corresponding connection member in a first rack module and a second rack module, where the first and second rack modules are connected reversibly. In certain embodiments, a first rack module comprises a first connection member and a second rack module comprises a second connection member complementary to the first connection member, where the first and second connection members may be engaged with one another to form a reversible connection between the first and second rack modules. A connection member in a rack module can be configured in any manner that limits the movement of a cage module with respect to another connected cage module and allows for convenient disconnection and reconnection of the modules. In some embodiments, connection members are engaged and/or disengaged without a tool (i.e., rack modules can be assembled and/or disassembled by hand). In certain embodiments, a connection member comprises a groove or flange on one or more surfaces of a rack module adapted to receive, sometimes slideably receive, a corresponding flange or groove on or in another rack module.

In some embodiments, a connection member includes a post that inserts slideably into an aperture and corresponding component in a rack module. The corresponding component often is of a geometry substantially identical to the post except that it has a larger cross-sectional area than the cross-sectional area of the post which allows the post to slide within it. One or more exterior surfaces of each shelf module sometimes comprises one or more mounts and/or connectors configured to detachably connect and orient another rack module. In some embodiments, a rack module comprises one or more mounts and/or connectors configured to receive one or more detachable shelf members, and in certain embodiments, a rack module comprises one or more shelf members. The post sometimes comprises one or more guides for alignment in a corresponding member of a rack module (e.g., a lead-in or tab member, sometimes extending at an angle with respect to the length of the post), sometimes comprises one or more support members (e.g., a stud member) that decrease lateral movement when the post is inserted in a corresponding member of a rack module, and sometimes includes one or more joggles that facilitate entry of the post into the corresponding member (examples of such members are described in specific embodiments hereafter). A rack module sometimes comprises a side support that minimizes or substantially prevents lateral movement when modules are joined. The post and corresponding component sometimes have a rectangular, square, rhomboid, circular or ovoid cross section and are of sufficient length to support two rack units in a vertical orientation. In some embodiments, the corresponding component comprises one or more projections that limit the distance the post slides through it. The post and/or corresponding member in the rack module often include holes through which connectors may be inserted to fix the position of the post within the corresponding member. Any connectors may be utilized, such as screws, pins and/or bolts, and sometimes a connector is depressible and integrated with the post.

A rack module sometimes is connected to another component other than another rack module. In some embodiments, a rack module is mounted onto a tram member, sometimes via a connector, where the tram is configured for transportation of a rack module or plurality of rack modules (i.e., a rack unit). A rack module sometimes comprises one or more mounts on one or more exterior surfaces which can be utilized to reversibly attach another component of an animal containment system, such as one, two or more airflow assemblies, for example (described hereafter).

One or more cages can be stored on or in a rack module, and any convenient configuration for storing a cage can be utilized. A cage sometimes is placed on a surface of a rack module and stored for a period of time. A cage often resides on a shelf connected to the rack. A rack module sometimes comprises one or more mount members useful for storing one or more cages in or on the rack module. A corresponding mount member sometimes is located on one or more outer surfaces of a cage and is adapted to connect with a mount member located on a rack module. In certain embodiments, a mount member is a groove or flange on one or more surfaces of a rack module and is adapted to receive, sometimes slideably receive, a corresponding flange or groove on or in a cage. There is sufficient distance between the top of a mounted cage and the lower surface of a rack module located above the cage to permit airflow out of the cage in such embodiments.

A rack module may comprise one or more carriages suitable for contacting a cage with another component. In an embodiment, a carriage sometimes associates a component with one cage or multiple cages. A carriage can be utilized to contact a cage with any component, such as an air supply connector, an air exhaust connector, a central water supply connector and a detector or sensor, for example. A carriage often is connected to a shelf in such embodiments. Any suitable carriage can be utilized, such as a carriage comprising a piston or lever, for example, and can be constructed from any suitable material, such as a metal alloy and/or a polymer, for example. The carriage engages a component with a cage member (e.g., a cage base or cage cover) in any suitable manner, sometimes by a linear, arc, vertical or horizontal motion, or combination thereof. The carriage often includes a holder that retains a component that is engaged with a cage member. The carriage sometimes is operated by hand and sometimes is operated remotely by mechanical operation and/or computer-controlled operation, for example. In some embodiments, a carriage is useful in part for orienting the position of a cage in a rack unit, as the carriage often can only engage the member it holds with a cage when the cage is properly oriented on a rack unit. In some embodiments, a carriage applies mechanical pressure to the cage and thereby holds it in alignment. In certain embodiments, a carriage comprises a mechanism that holds its position away from the cage, which can be disengaged for engaging a component of the carriage with a cage component.

In some embodiments, the carriage comprises a lever connected near to an end or at one end of a rack or shelf unit via a hinge and a holder adapted to receive one or more components reversibly associated with a cage. Such a lever often includes a spring that applies downward pressure to the lever when a component to which it is connected is associated with the cage. In certain embodiments, a rack unit comprises one or more carriages connected to an air supply or air exhaust connector (e.g., one, two or more air connectors or nozzles) and reversibly contact the connector(s) with a cage. In some embodiments, the air supply connector and optional air exhaust connector is conical and the cage cover member comprises a conical void adapted to sealingly and reversibly connect with each conical connector. In some embodiments, a carriage comprises one or more projections (e.g., pins) that can be slideably positioned through one or more corresponding structures of the cage adapted to receive the projection(s) (e.g., one or more apertures in a flange member), which are useful for orienting a cage in a rack unit.

Air supply and exhaust conduits sometimes are located within walls of a rack module, and no exterior plumbing is required in some embodiments. An air conduit system sometimes comprises a conduit of comparatively large volume connected to the blower, sometimes arranged in a vertical orientation in a rack module, which is connected to one or more comparatively smaller volume conduits that supply/exhaust air for a group of cages in a manifold of conduits often arranged horizontally. A vertical air conduit sometimes is referred to as a "tube" herein. Air tubes and conduits are of any shape and are constructed from any material suitable for providing air to or exhausting air from animals. In some embodiments, the manifold is constructed from rigid tubing connected to flexible tubing that supplies or exhausts air from each cage. Such flexible tubing sometimes is connected at one end to a clamp or metering nozzle in association with a manifold conduit and at the other end to a nozzle that can be engaged with a cage. An air metering nozzle often is located between air supply conduit and an air supply nozzle that engages the cage. Each end of a flexible tube may be reversibly coupled to a nozzle or a clamp, sometimes by a twist lock or quick release coupling, and sometimes is integrated with the end of these components. A nozzle (i.e., outlet member) is constructed from any material and is of any shape convenient for delivering air to an animal. In some embodiments, the outlet member is a hollow cylinder structure, having tapered or un-tapered walls, or an acicular or needle structure.

A nozzle is engaged with a cage in any convenient manner that provides/exhausts air to contained animals. In some embodiments, the nozzle is a connector that mates with a corresponding structure in the cage assembly, often forming an air-tight, reversible seal. The nozzle is of any geometry suitable for delivering/exhausting air to/from an animal cage assembly, and sometimes is conical. In conical connector embodiments, the smaller horizontal surface area sometimes is located below the larger horizontal surface area when the nozzle is oriented for air passing vertically through it, and the conical connector often includes a void, sometimes a cylindrical or conical void, defined by apertures in the top and bottom surface of the connector. In some embodiments, one or two nozzles passes through a cage cover member, sometimes through a portion of the cover thickness or trough the entire cover thickness. A nozzle may extend through the exterior and interior surfaces of a cover member, sometimes pierces through a cover member having no aperture or other structure for receiving the nozzle, and sometimes extends through an aperture formed by a break-away portion of the cover member. Where a nozzle pierces through a cover member, it can pierce through a flexible region in the cover member, and material in the cover may form an air-tight or semi air-tight seal with the outer surface of the nozzle. A nozzle and other members of the airflow system often are not connected to a sidewall member of a cage (e.g., not connected to a sidewall member of a cage base). Air often enters a cage through a cover member, often via a nozzle from an airflow system, and often exhausts through an exhaust nozzle to an airflow system and/or exhaust aperture(s) juxtaposed with a filter in the cover member. Air often does not exhaust through a cage base.

The conduit system in a rack sometimes includes no adjustable valves. A metering nozzle, often having a fixed aperture, can regulate airflow and air pressure in certain rack embodiments. A conduit system may comprise one or more valves in certain embodiments. Any valve useful for constricting airflow can be utilized. One or more valves sometimes are located at a junction between a main supply/exhaust conduit, manifold and/or flexible tube, sometimes are located at the end of a flexible tube connected that is connected to a cage, and sometimes are located within the length of a main supply/exhaust or manifold (e.g., at a region not at a terminus of the conduit). In certain embodiments, the interior cross-sectional surface area of a conduit (e.g., the cross-sectional circular surface area of a tube) is smaller, and in some embodiments, is substantially smaller, than the interior cross-sectional surface area of the a larger conduit to which it is connected. Such a configuration is useful for providing substantially equal airflow and air pressure to each cage without control valves in the system to regulate airflow and pressure to each cage. For example, the interior diameter of a connector between a manifold conduit and a flexible conduit linked to a cage (e.g., a clamp system described herein) sometimes is about 0.05 inches and the interior diameter of the manifold conduit sometimes is about 0.25 inches or larger. The limiting aperture often is in a metering nozzle and sometimes is in a clamp assembly that couples cage-connected conduit to a manifold conduit (e.g., the interior cross sectional diameter of air fitting (72) in FIG. 23A).

In specific rack unit embodiments a rack unit module comprises front, back and two side panels and contains within the panels an air supply manifold and tubing connecting the cage bases to the air supply manifold. Such rack units sometimes comprise an air exhaust manifold and tubing connecting the cage bases to the air exhaust manifold. The remaining space within the panels sometimes is referred to herein as a "plenum." Air can be scavenged directly from cages through tubing connecting each cage to an exhaust manifold, when present, within the panels. Air also can be scavenged from cages by applying negative air pressure within the plenum (e.g., by connecting a tube from an HVAC system to the plenum) and air leaving a cage via its filter is exhausted into the plenum through adjacent ports in the panel in contact with each cage. The latter method can be utilized in addition to or instead of exhausting air through exhaust manifolds. Where the rack unit includes an air supply and air exhaust manifold, and each manifold is engaged with each cage via connection tubing and air separate supply and exhaust nozzles, positive air pressure and negative air pressure can be controlled to provide only positive air pressure, only negative air pressure, or a combination thereof. A cage may comprise an air filter medium or non-porous medium juxtaposed with apertures in the cover or another member (e.g., aperture array) in such embodiments.

In some embodiments, a rack unit module is connected to another rack unit module by a flexible tube connected to an air supply conduit and/or air exhaust conduit and one or more separate inserts that slideably engage a corresponding receptacle(s) in the other rack module. In the latter embodiments, a rack module may comprise one or more guides for connecting the modules to one another. In such embodiments, air supply and/or air exhaust plumbing is coupled/decoupled at the same time rack units are engaged to/disengaged from one another.

Certain related embodiments are directed to a clamp for connecting one air conduit to another air conduit having at least one hole along its length. The clamp comprises a body containing three voids and a slot, where the first void has a circular cross section extending with the slot from the top of the body to the bottom of the body; the slot is extensive with the length of the circular void; the second void extends vertically from a point along the length of the first void to a side of the body; the third void extends perpendicular to the first void from the opposite side of the body the second void emerges and through the slot; and the circumference of the circular void is greater than the outer circumference of the conduit containing the hole. All of the voids often have a circular cross section, although other cross section shapes may be utilized. The clamp sometimes is provided with a screw that can be threadably engaged with the third void. Application of the screw in the third void can reduce the circumference of the first void so that the clamp tightens around the conduit to form an air tight seal.

Thus, some embodiments are directed to modular rack components. Provided in certain embodiments is an animal containment rack comprising two or more rack modules, where each rack module comprises shelves, a tube, an air supply or exhaust connector at one end of the tube (e.g., blower connection) and conduits connected to the tube that deliver air from a blower at each of the shelves. Also provided are animal containment racks comprising two or more rack modules, where each rack module comprises air metering nozzles, a tube, an air supply or exhaust connection at one end of the tube (e.g., air blower connection) and conduits connected to the tube that deliver air from a blower to each of the metering nozzles. The rack modules sometimes are joined by a sleeve (e.g., flexible tube) that receives a tube from one rack module and a tube from another rack module, and sometimes a rack module is connected or disconnected to another rack module without a tool. Each rack module often comprises a guide that orients the rack module with a corresponding guide of another rack module during assembly of the animal containment rack. A modular rack can comprises a tram.

In certain embodiments, provided are animal containment racks comprising a tube, an air supply or exhaust connection at one end of the tube (e.g., air blower connection) and conduits connected to the tube that deliver air from the blower to metering nozzles, where air pressure (e.g., measured at the metering nozzles) is about 0.3 inches of water or greater. Such racks sometimes are modular, and in some embodiments are not modular. Air pressure (e.g., measured at the metering nozzles) sometimes is about 0.4 inches of water or greater, about 0.5 inches of water or greater, about 0.6 inches of water or greater, about 0.7 inches of water or greater, about 0.8 inches of water or greater, about 0.9 inches of water or greater or about 1.0 inches of water or greater. In some embodiments, the air pressure is about 1 inches of water to about 3 inches of water, and can be about 2 inches of water. The pressure of air supplied at each metering nozzle often is not regulated by an adjustable valve and often is regulated by the metering nozzle. The orifice diameter of the metering nozzle often is about 0.25 inches or less, and sometimes is about 0.06 inches to about 0.08 inches.

In certain embodiments, a rack comprises an airflow or air pressure sensor. The sensor sometimes is in connection with one or more of a tube, a conduit and/or a metering nozzle. A rack in some embodiments comprises one or more shelves each in proximity to a metering nozzle.

Also provided in some embodiments are animal containment racks comprising shelves, a tube, an air supply or exhaust connection at one end of the tube (e.g., air blower connection) and conduits connected to the tube that deliver air from a blower at each of the shelves, where each of the shelves comprises a carriage and an air supply connector joined to the carriage that can mate with a corresponding connector of an animal containment cage; and the air supply connector is effectively joined to one of the conduits (e.g., by flexible tubing). In some embodiments, an air exhaust connector is joined to the carriage that can mate with a corresponding connector on an animal containment cage. The carriage, when operated, can mate the connector with a corresponding connector of an animal containment cage or can un-mate the connector with the corresponding connector of the animal containment cage. The carriage is a lever in some embodiments, and the air supply/exhaust connector of the carriage is of any geometry that can mate with a corresponding connector of the cage (e.g., conical projection or conical void).

A rack sometimes further comprises one or more animal containment cages on the shelves, and one or more of the animal containment cages may comprise one or more animals. A rack can comprise an air blower connected to a vertical tube of a rack in certain embodiments, and the air blower sometimes comprises two or more fans oriented in series. In some embodiments, the air blower is an air supply blower, and in some embodiments, an air exhaust blower is joined to a rack.

In some embodiments, provided are animal containment racks comprising shelves, a tube, an air supply blower connected at one end of the tube, conduits connected to the tube that deliver air from the blower at each of the shelves and an airflow or air pressure sensor, where a controller adjusts air delivered by the air supply blower based upon a set point and a signal from the sensor. In such embodiments, the sensor sometimes is in connection with a tube, a conduit, an air metering nozzle, a cage or combination of the foregoing. The air supply blower sometimes comprises two or more fans oriented in series and the controller adjusts the speed of one or more of the fans. The rack sometimes comprises an air exhaust blower, and the air exhaust blower can comprise two or more fans oriented in series and the controller adjusts the speed of one or more of the fans. The controller sometimes is linked by wire to the blower(s) and sometimes it is remote.

Figure 32:
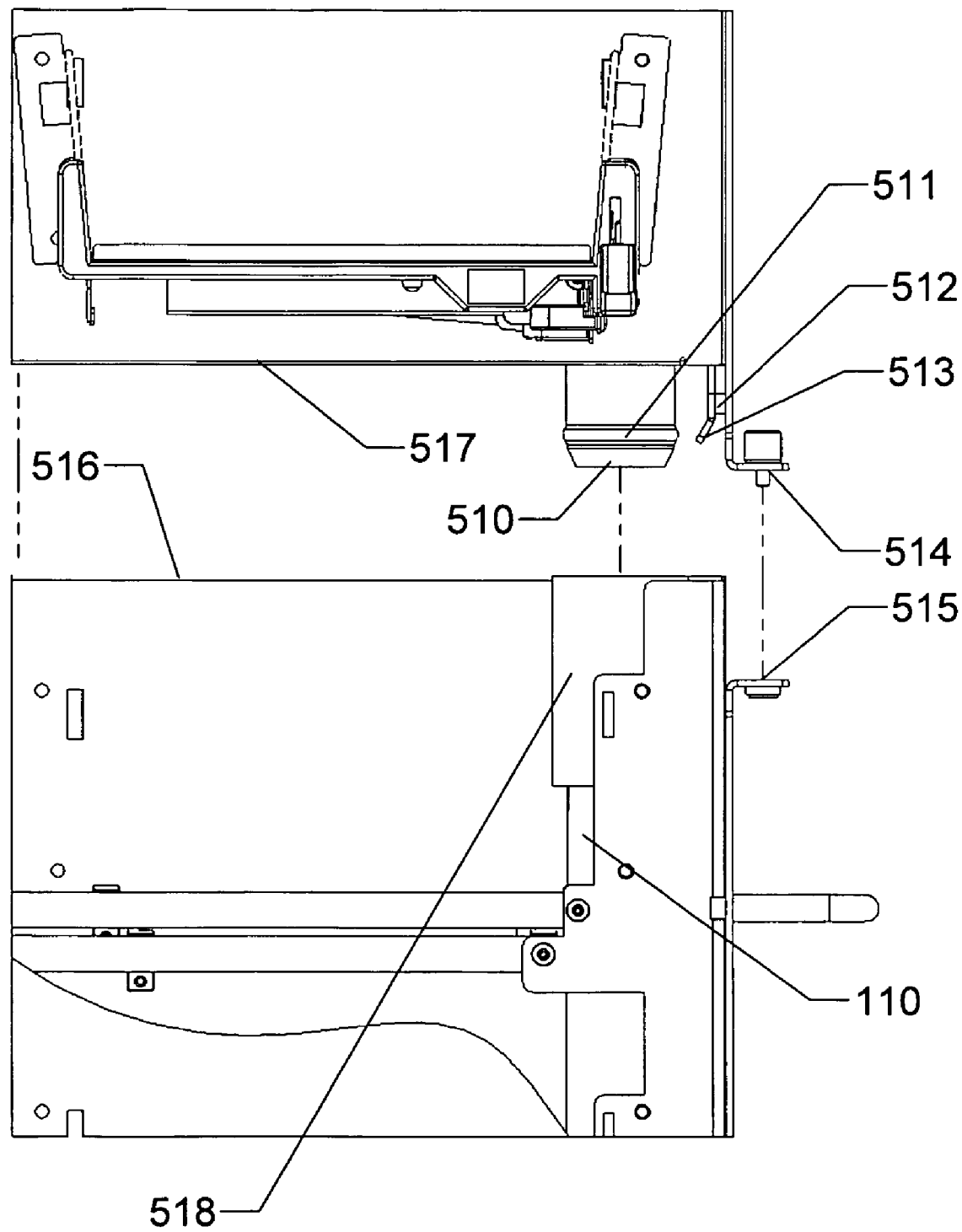
FIG. 32 is a front view showing two rack modules positioned for connection.
Figure 33:
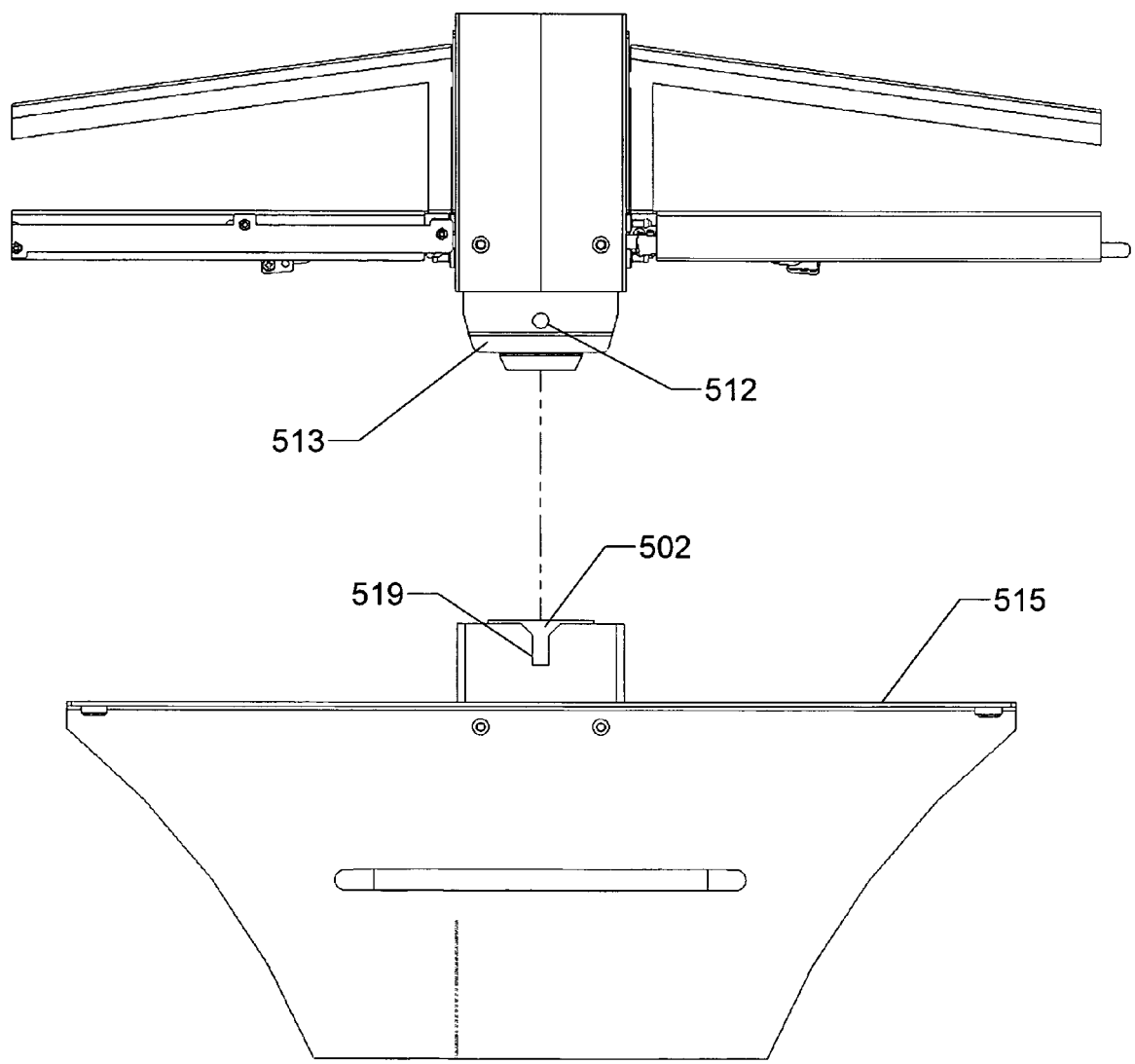
FIG. 33 is a right side exploded view of a rack module.

Specific rack unit embodiments are shown in FIGS. 26, 27, 28, 29A, 29B, 30, 31, 32, 33, 34A, 34B, 35A and 35B. FIG. 32 is a bottom isometric view of a rack module. Support (80) is the shelf assembly that hooks onto wall (70), which includes conical air supply and air exhaust connectors attached to a carriage that pivots up and down. Section (71) is a cut-away view of the internal plumbing (e.g., FIG. 33 provides a view of the plumbing in greater detail). (80) shows the conical air insert member. (81) is a block with an airflow passage that directs the airflow in a 90 degree bend.

Figure 26:
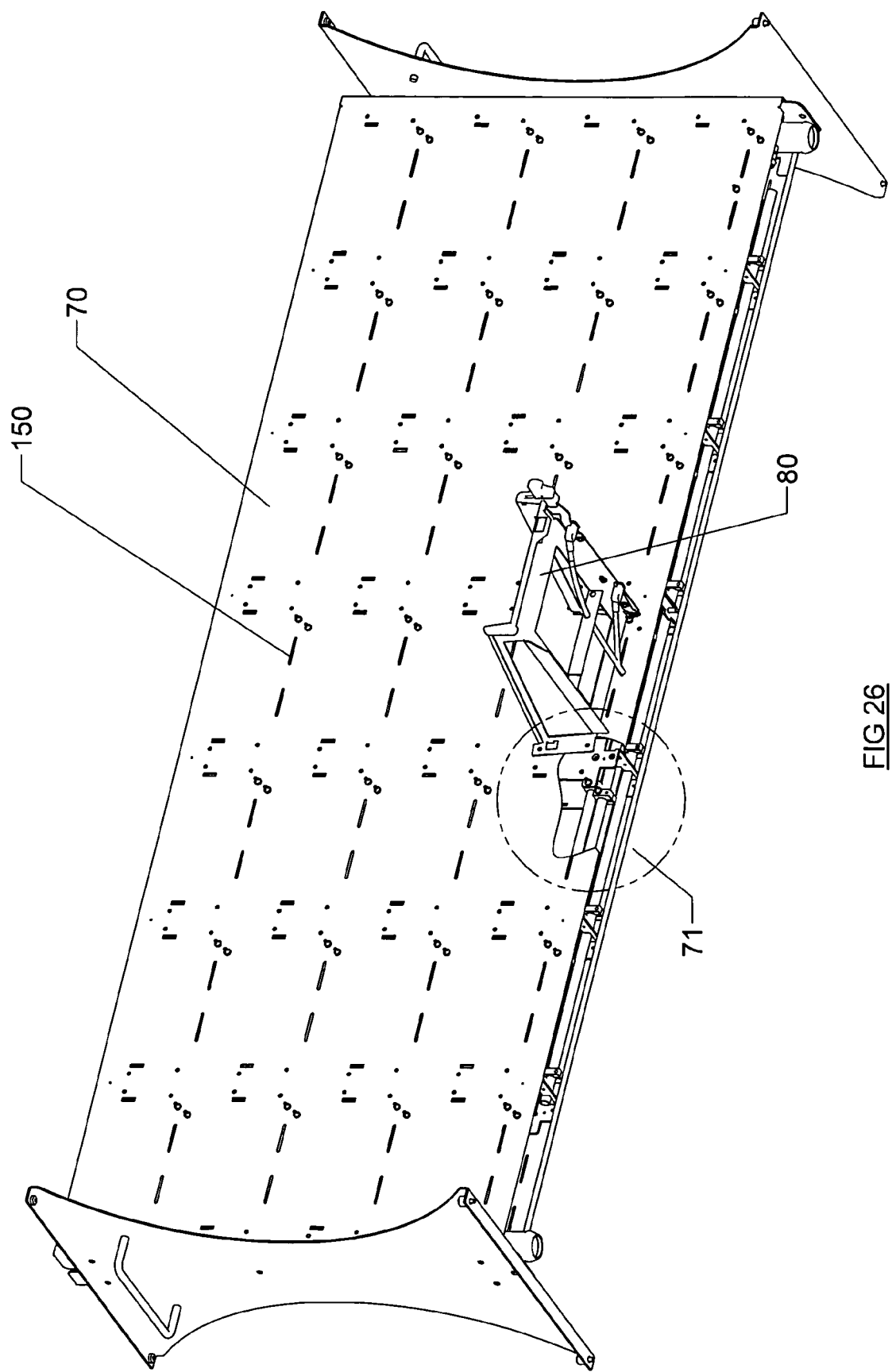
FIG. 26 is a bottom isometric view of a rack module.
Figure 27:
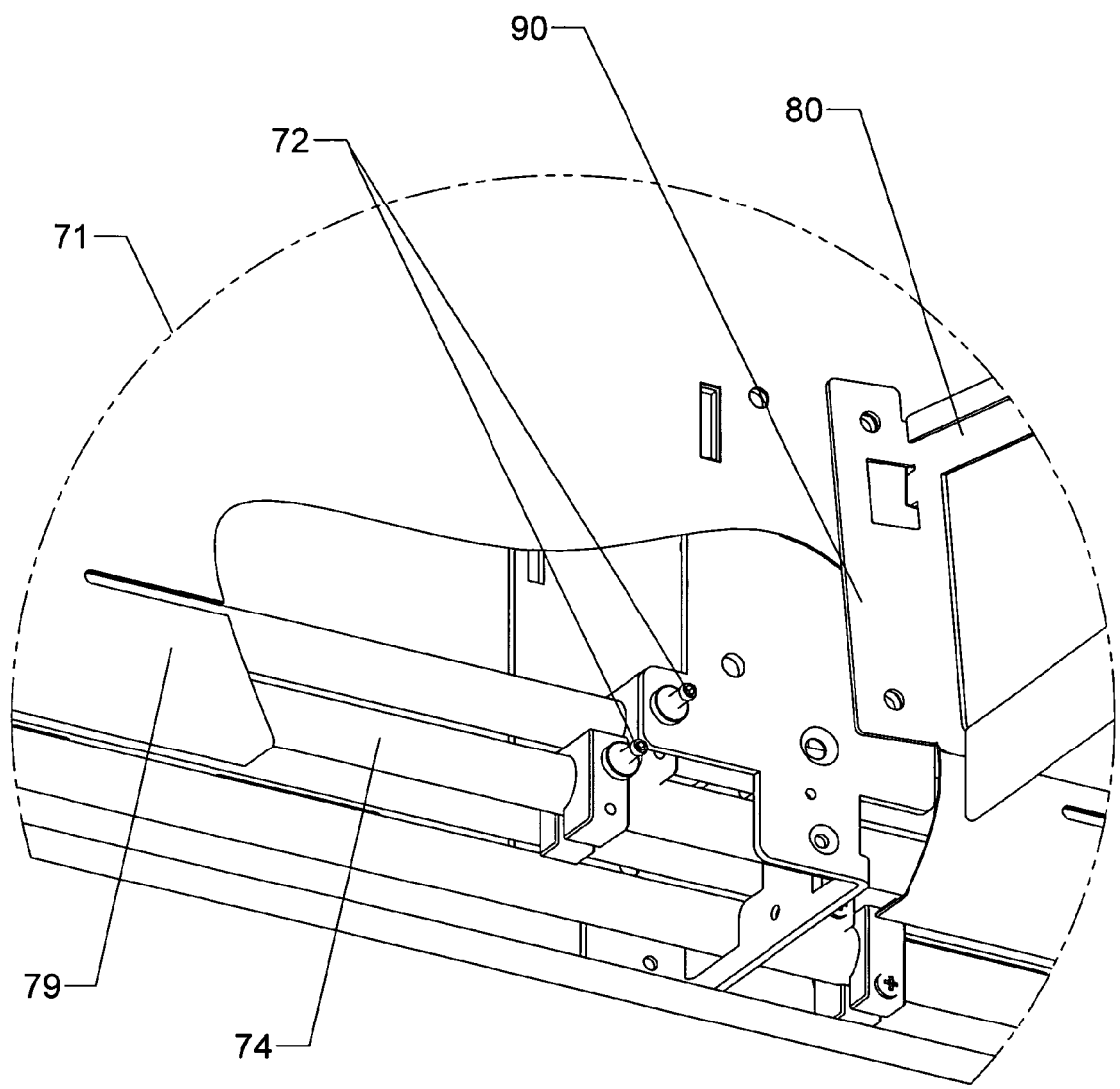
FIG. 27 is a cut-away bottom isometric view of a rack module.

FIG. 26 is a cut-away bottom isometric view of a rack module and FIG. 27 is an expanded view of region (71). Exhaust tube manifold (74) pulls air from each cage. Supply tube manifold (75) delivers air into each cage, which rests on a shelf assembly (80). Manifold (74) and manifold (75) is constructed of any material suitable for delivering air to animals, such as stainless steel tubing, and other metals or plastic could be used. Clamp (73) is constructed from a suitable material (e.g., a plastic such as nylon) for clamping onto manifold (74) or manifold (75) to divert airflow to or from each cage. Clamp (73) also serves a mechanical fastener for the manifold tubes. A skin (79) conceals the internal tubing and creates a plenum for the other exhaust air. Internal rib (90) supports the shelves. Air fitting (72) threads into clamp (73). Air passes through this fitting on the way to or from each cage via flexible tubing.

Figure 28:
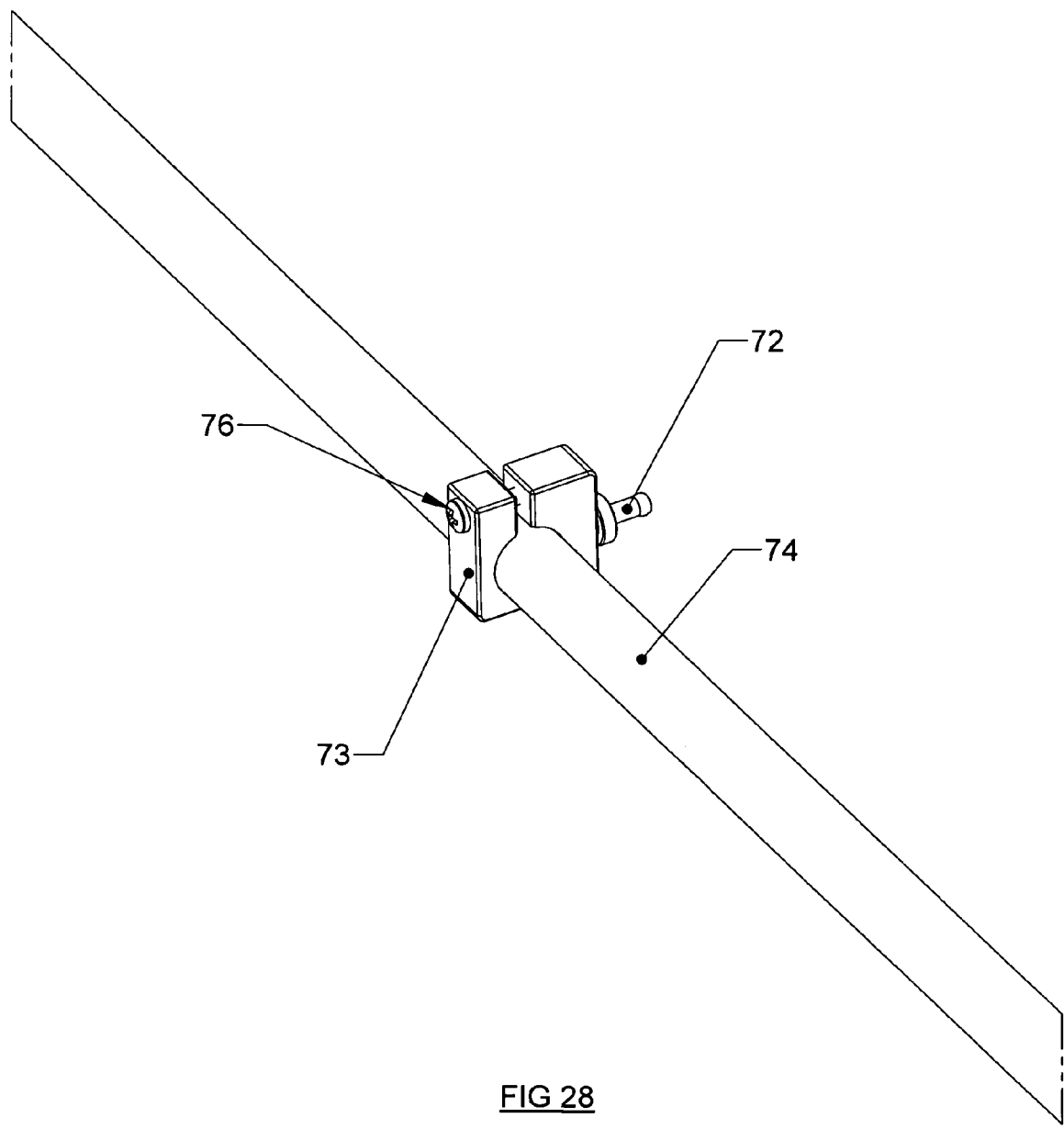
FIG. 28 is an isometric view of the clamp assembly. Self-tapping screw (76) is used to tighten the clamp (73) onto manifold (74). Air fitting (72) is of any convenient geometry for receiving tubing, such as flexible tubing, that is connected to an air supply or air exhaust connector.

FIG. 28 is an isometric view of the clamp assembly. Self-tapping screw (76) is used to tighten the clamp (73) onto manifold (74). Air fitting (72), also referred to herein as a "metering nozzle," is of any convenient geometry for receiving tubing, such as flexible tubing, that is connected to an air supply or air exhaust connector to deliver or exhaust air, respectively, to or from a cage.

Figure 29A:
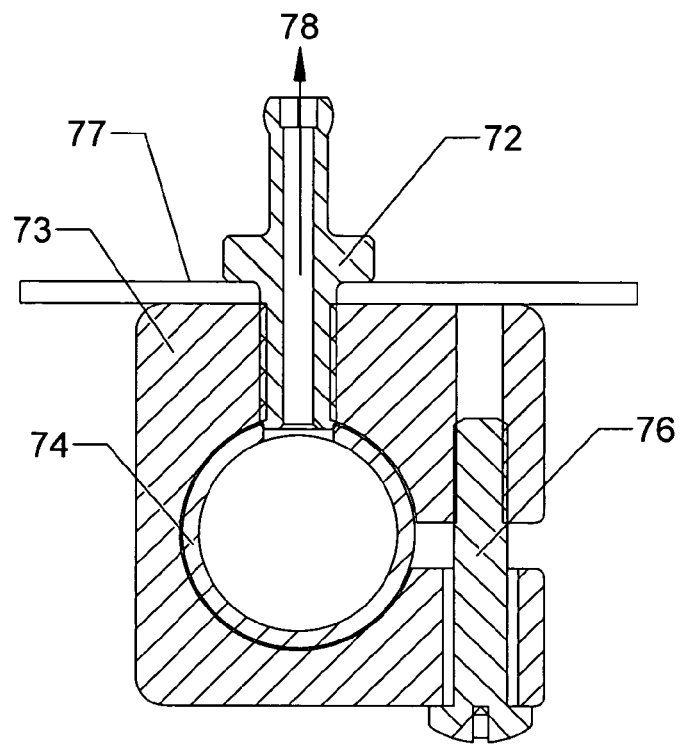
FIG. 29A is a cross-sectional view and FIG. 29B is a top view of the clamp assembly.
Figure 29B:
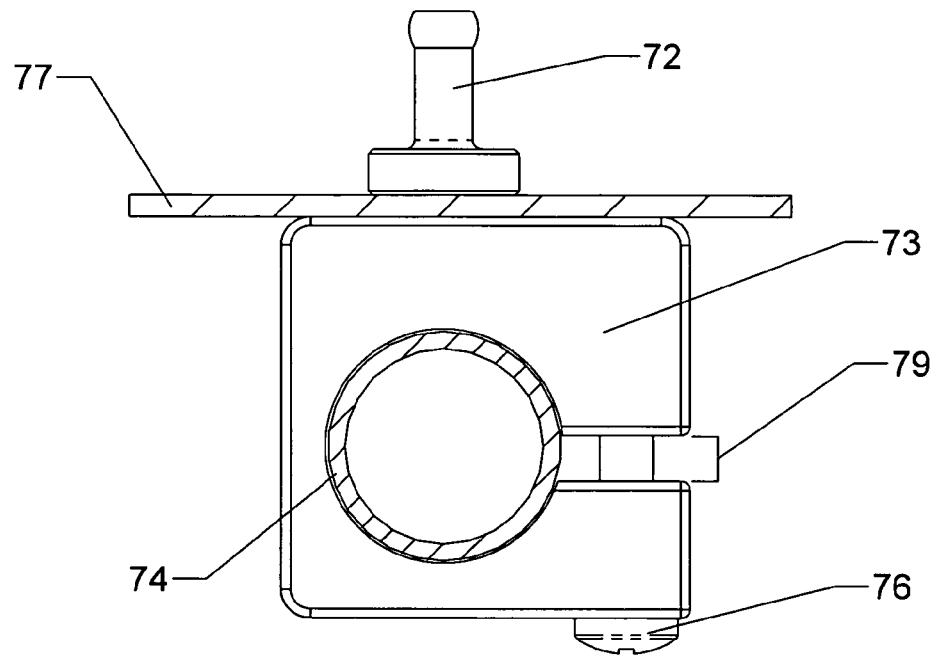

FIG. 29A is a cross-sectional view and FIG. 29B is a top view of the clamp assembly. A hole is drilled or punched in manifold (74) that allows air (78) to flow in or out of clamp (73). Skin or rib (77) secures the tube manifold clamp assembly. Air gap (79) allows the clamp to stretch and shrink over the manifold (74).

Figure 30:
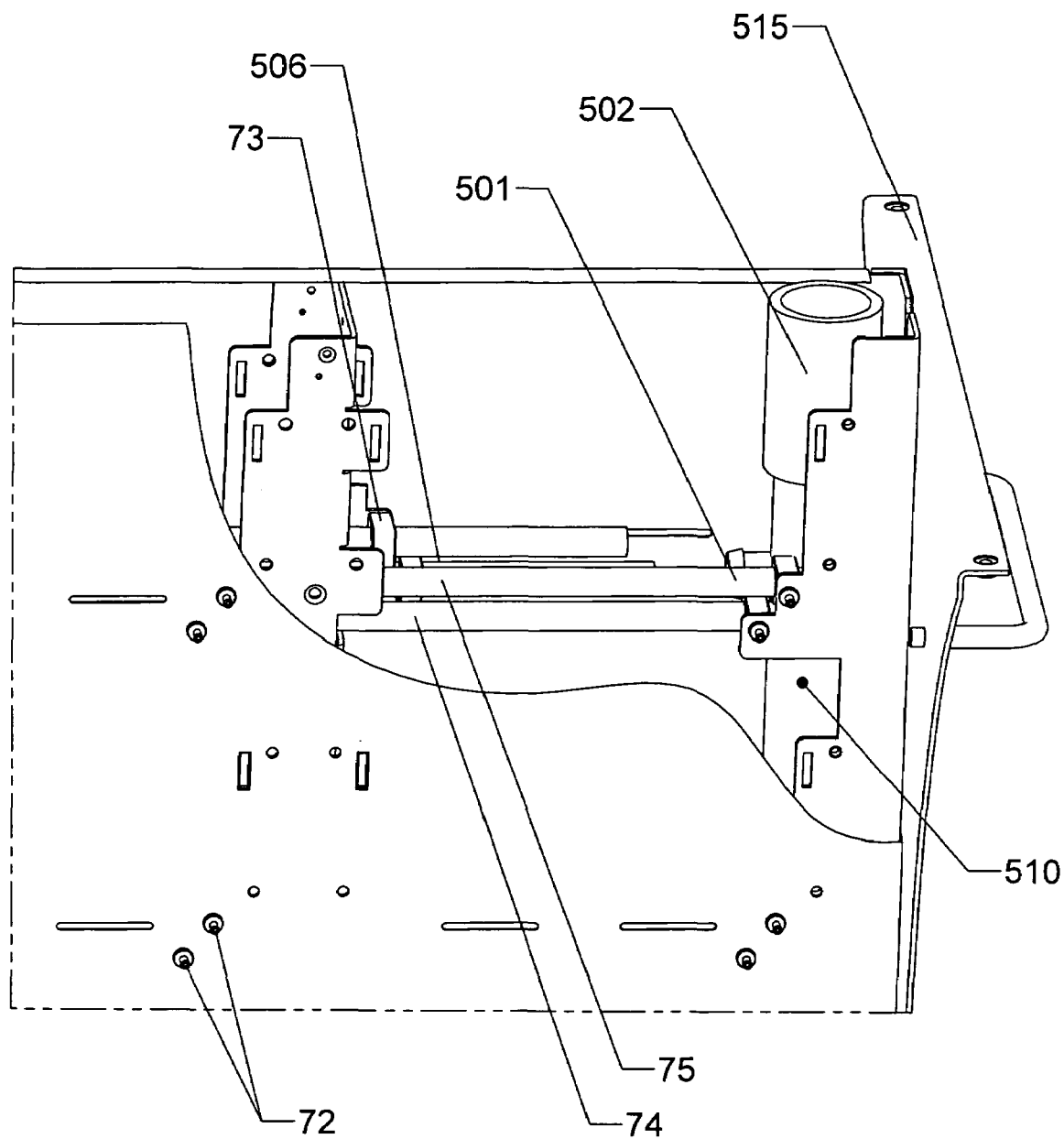
FIG. 30 is a top isometric cut-away view of the upper right portion of a rack module.

FIG. 30 is a top isometric cut-away view of the upper right portion of a rack module. A flexible hose (e.g., rubber hose) connects air fitting (501) to tube (506) but is not shown. Flexible hose connector (502) couples multiple rack modules together. Manifold (74) and manifold (75) are shown.

Figure 31:
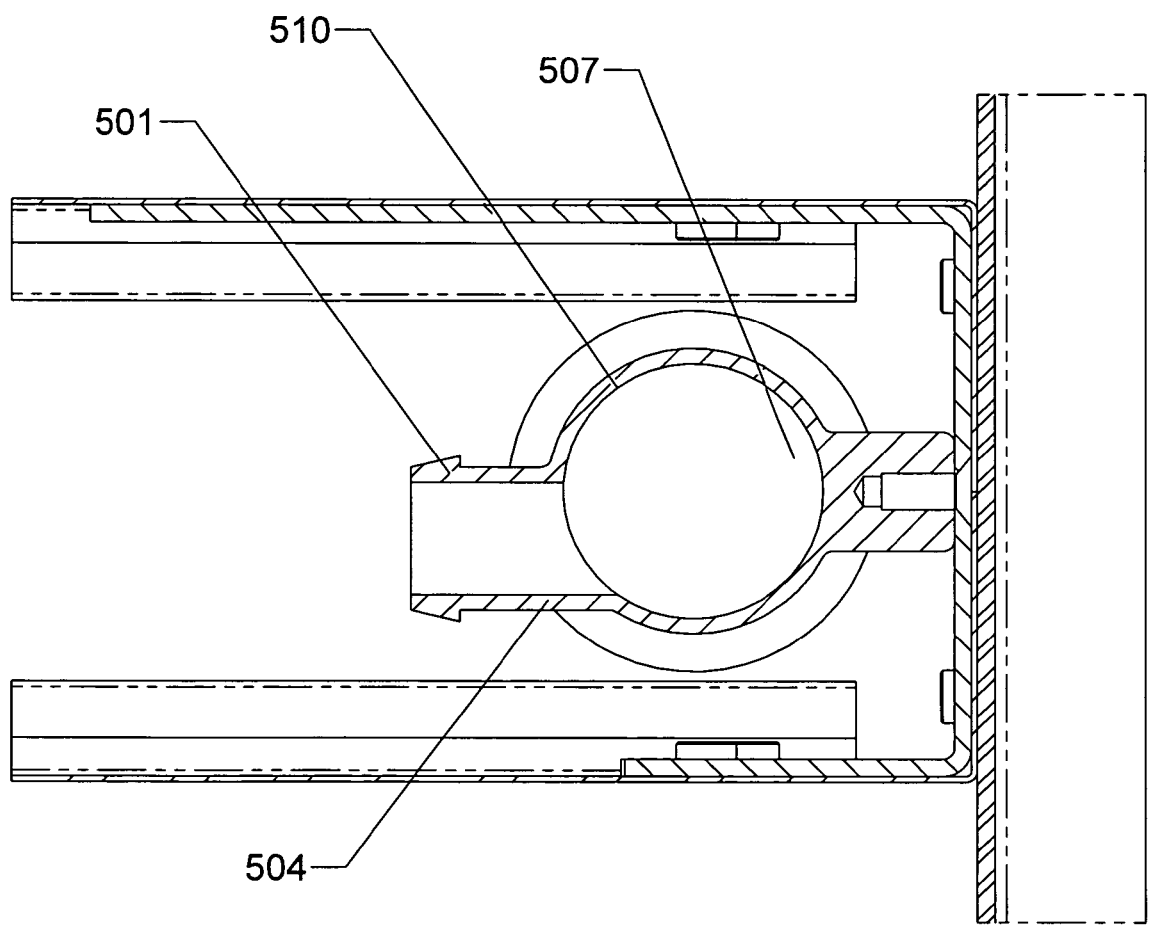
FIG. 31 is a cross sectional view of a clamp (100) in FIG. 30.

FIG. 31 is a cross sectional view of connector (502) in FIG. 30. Vertical tube (510) often is a rigid tube such as a stainless steel tube. Annular barb (501) ensures a flexible connection hose does not slip or leak. Air passage (504) flows air from the vertical direction to the horizontal direction. Four passages (504) sometimes are incorporated in each module to flow air to four rows of cages. Mounting boss (507) can be utilized to attach the connector to the side of the module, and no air flows in this region.

FIG. 32 is a front view showing two rack modules positioned for connection. Vertical tube (510) is a rigid tube running vertically from the bottom to top of each module. Tube (518), which often is flexible (but may be substantially inflexible in certain embodiments), can slide over the taper at the bottom of tube (510) for coupling. A raised annular rib (511) ensures a tight fit between rigid tube (510) and tube (518) to avoid air leakage. The modules are mated when mating surfaces (514) and (515) are contacted and surfaces (517) and (516) are contacted. Alignment tab (513) facilitates mating of the modules even if connection members are not initially in perfect alignment. Pin (512) directs alignment, as shown in FIG. 33. The coupling mechanism shown eliminates the requirement for external hoses and clamps and reduces time required for any disassembly and assembly for cleaning. FIG. 33 is a right side exploded view of a rack module. Pin (512) guides each module onto the same centerline. Slot (519) is adapted to slideably receive the pin (112). Annular rib (511) can force tube (518) to stretch, thereby providing for an interference fit seal.

Figure 34A:
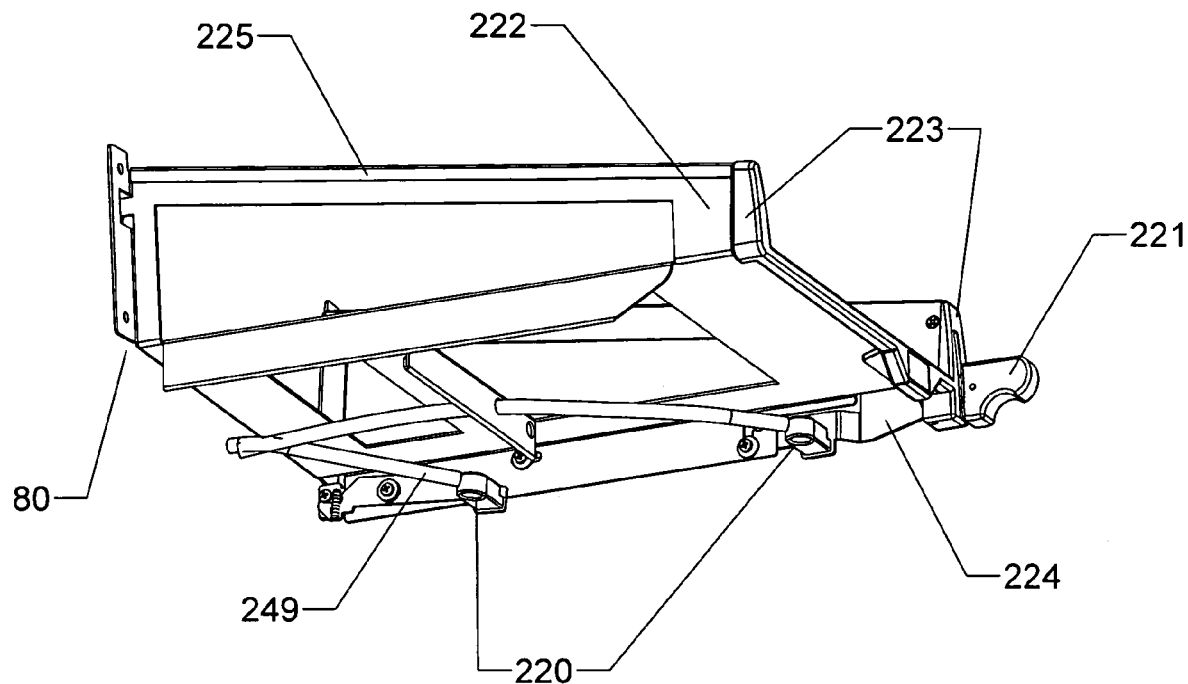
FIG. 34A is a bottom isometric of a shelf assembly (80) embodiment.
Figure 34B:
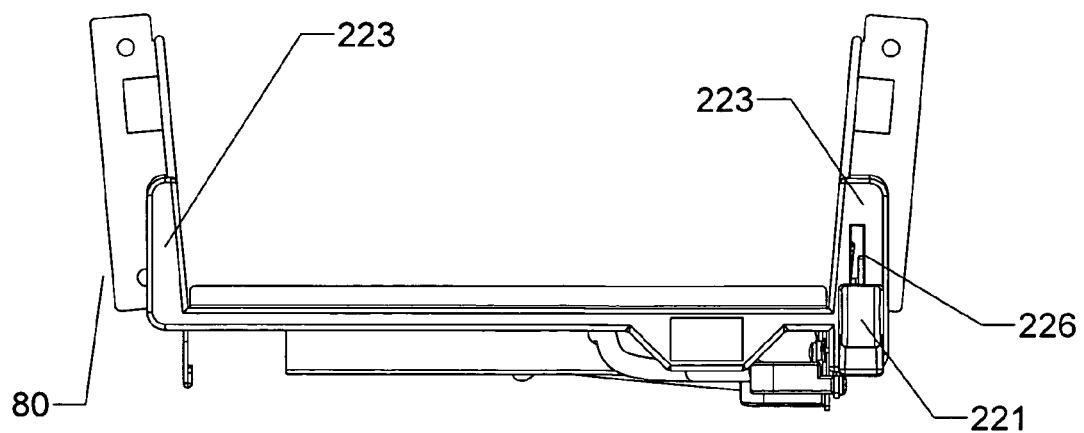
FIG. 34B is a front view of the shelf assembly (80) embodiment.

FIG. 34A is a bottom isometric view of a shelf assembly (80) embodiment. The shelf supports each cage and also supplies airflow to the cage below. Nozzle (220) near handle (221) of shelf (222) supplies air into the cage when lever (224) is in the down position. Lever (224) also actuates lever (249) to engage or disengage rear nozzle (220). The rear nozzle often is utilized to exhaust air from a cage. The separation of the nozzles provides front to rear airflow or rear to front airflow. Nozzles (220) are directly connected with conical receptacles (145) and (146) in a cage lid, and the tapered cone shapes facilitate a substantially air-tight seal. Springs attached to both levers provide a soft down force on nozzles (220) to prevent leaks when coupled to the cages. Ergonomic handle (221) is engaged by a user to actuate the lever mechanism. Edge (225) shows an embodiment in which sheet metal when hemmed or folded over onto itself can reduce edge sharpness. FIG. 34B is a front view of the shelf assembly embodiment. Plastic bezel (223) reduces edge and corner sharpness on the front of the shelf. A reduction in edge sharpness is advantageous when a user is wiping shelves with a towel for example. Vertical slot (226) guides lever (224) in upward and downward directions. Plastic bushing (223) provides free movement of the metal lever.

Figure 35A:
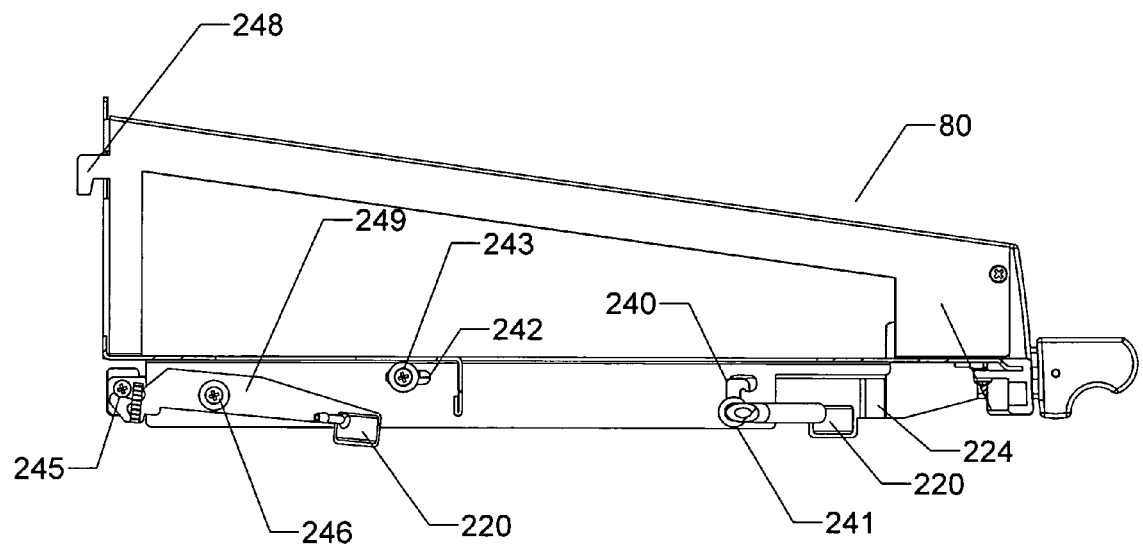
FIG. 35A is a side view of the shelf assembly (80) embodiment and illustrates lever containment.
Figure 35B:
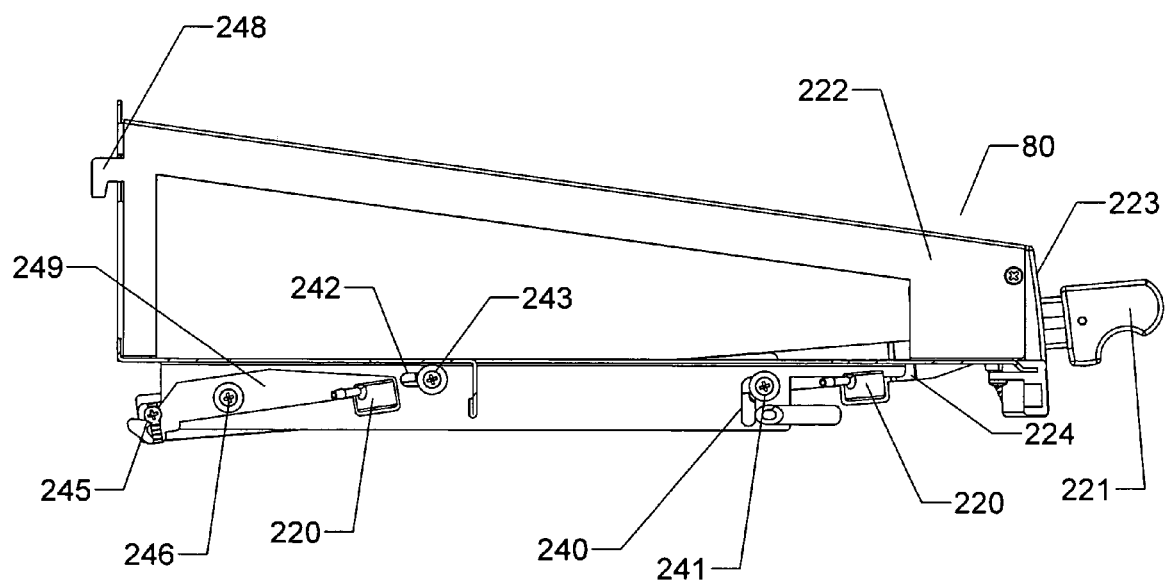
FIG. 35B shows handle (221) in the up position.

FIG. 35A is a side view of the shelf assembly (80) embodiment and illustrates lever containment. Lever (224) pivots about pin (243) in slot (242). Lever (224) can be locked into the up position when (241) rests in the depression of slot (240). When pin (240) is positioned upward, pin (245) is positioned downward. This motion causes lever (249) to rotate about pin (246). FIG. 35B shows the shelf assembly embodiment in FIG. 35A with handle (221) in the up position. The resulting lever position raises nozzle (220) out of a cage so a user may remove the cage. Hook (248) on the shelf assembly supports the shelf on the rack module.

Airflow Units

An animal containment cage and/or rack is ventilated in certain embodiments. The cage and/or rack sometimes is ventilated by a positive pressure only, a negative pressure only or a combination of a positive pressure and negative pressure. In certain embodiments, the pressure is 0.3 inches of water or greater, and the pressure can be about 0.4 inches of water or greater, about 0.5 inches of water or greater, about 0.6 inches of water or greater, about 0.7 inches of water or greater, about 0.8 inches of water or greater, about 0.9 inches of water or greater or about 1.0 inches of water or greater. In some embodiments, the pressure is up to 5 inches of water. Thus, an animal containment system sometimes operates in a positive pressure mode, meaning the pressure in the cage is higher than the outside environment. An advantage of this mode is no or negligible outside contamination can leak into the cage and harm an animal resident. If a disease breakout occurs, a negative pressure mode may be desirable and can be employed. Pressure in each cage is lower than the outside environment pressure in a negative pressure mode. Negative cage pressure reduces the possibility a disease spreads outside the cage. A containment system often includes one supply blower that generates positive pressure and sometimes includes one exhaust blower that generates negative pressure. The speed of each blower is adjustable to allow for a selection of full positive pressure, full negative pressure, or any differential pressure between.

An airflow unit generally comprises a blower and sometimes comprises a conduit, a filter, a heater, air cooler, humidifier, de-humidifier, deodorizer and/or one or more control devices. Any blower suitable for providing air to animals is utilized. A conduit system delivers air from a blower member to one or more cages in an animal containment system.

An airflow unit sometimes comprises an airflow sensing system and sometimes comprises a control system. An airflow sensing system comprises one or more sensing members that detect one or more parameters that vary in an animal containment system (often referred to as "containment parameters") and a reporting member that generates a signal for the parameters. Examples of containment parameters include but are not limited to temperature, air pressure and/or humidity, and any probe for monitoring such parameters can be utilized. A sensing member is located in any convenient location for sensing a containment parameter, such as an airflow detector located in a main supply/exhaust conduit. In some embodiments, the sensing member is in contact with a cover member of a cage, sometimes at the surface of a cover member and sometimes extending through the cover member into the interior of the cage. In airflow units comprising a control system, the system comprises one or more control members that modulate the output of one or more members of the airflow system (e.g., blower, humidifier, de-humidifier, heater, air cooler). The control member sometimes is operated manually, and sometimes, a control member is in communication with a sensing member and automatically modulates the output of a member of the airflow system. Suitable control methodology can be utilized, such as PID or PIC controllers and use of blower speed control circuits, and examples of airflow control systems are described in U.S. Pat. Nos. 6,357,393 and 6,408,794. In an embodiment, the control member registers a signal from the sensing member, and if a deviance from a set value for the parameter is detected, the controller communicates a signal to another member of the airflow unit to increase or decrease its output. For example, where the sensing member is an air pressure sensor, and an air pressure greater than a value set for the controller is sensed, the controller sends a signal to the blower to decrease its output.

Airflow units sometimes are connected to exhaust ports located in a rack unit module. Slots strategically placed near the rear of each cage can scavenge air exhausted from the cages when present. Exhausted air sometimes contacts a filter in the airflow system, such as a carbon filter (e.g., charcoal filter) in an exhaust manifold or in a separate filter unit through which exhaust air passes.

An airflow unit sometimes is configured to reversibly attach to a rack unit. The airflow unit can attach in any orientation to the rack unit, and in some embodiments, it is reversibly mounted to a top surface of a rack unit. An airflow unit sometimes comprises a connector member that mates with a connector member on an exterior surface of a rack unit. Any connector member(s) allowing for convenient assembly and disassembly of an airflow unit and a rack module can be utilized, including but not limited to connectors described herein for rack modules. An air supply blower or air exhaust blower sometimes is connected to a tube (e.g., vertical tube), and an air exhaust blower sometimes is connected to a plenum.

In certain embodiments, a blower assembly is in connection with a rack module adapted to receive cages for housing animals, where the blower includes two fans in series. Orienting fans in series offers advantages of decreased noise levels and decreased vibration compared to non-series units that deliver the same or similar air pressure. Such blower assemblies may be used for providing positive pressure for air supply applications or negative pressure for air exhaust applications. In some embodiments, a blower assembly utilized for providing negative pressure includes a chamber that includes an aperture, sometimes an adjustable aperture. In the latter embodiments, the blower assembly can be connected to an HVAC system, the latter of which oven provides variable negative pressure, and render the negative pressure applied to the animal containment system constant. A constant pressure may be achieved as excess negative pressure exerted by an HVAC system causes air outside of the animal containment system to flow into the chamber, often referred to as a mixing chamber, rather than pulling air from the animal containment system.

In certain embodiments, animal containment system blowers comprise two or more fans in series, where the blower delivers an air pressure of three inches of water or more. The blower sometimes comprises three of more fans in series, and can comprise a fan speed controller in connection with each fan, where the fan speed controller can be linked to one or more air pressure or airflow sensors.

Figure 36:
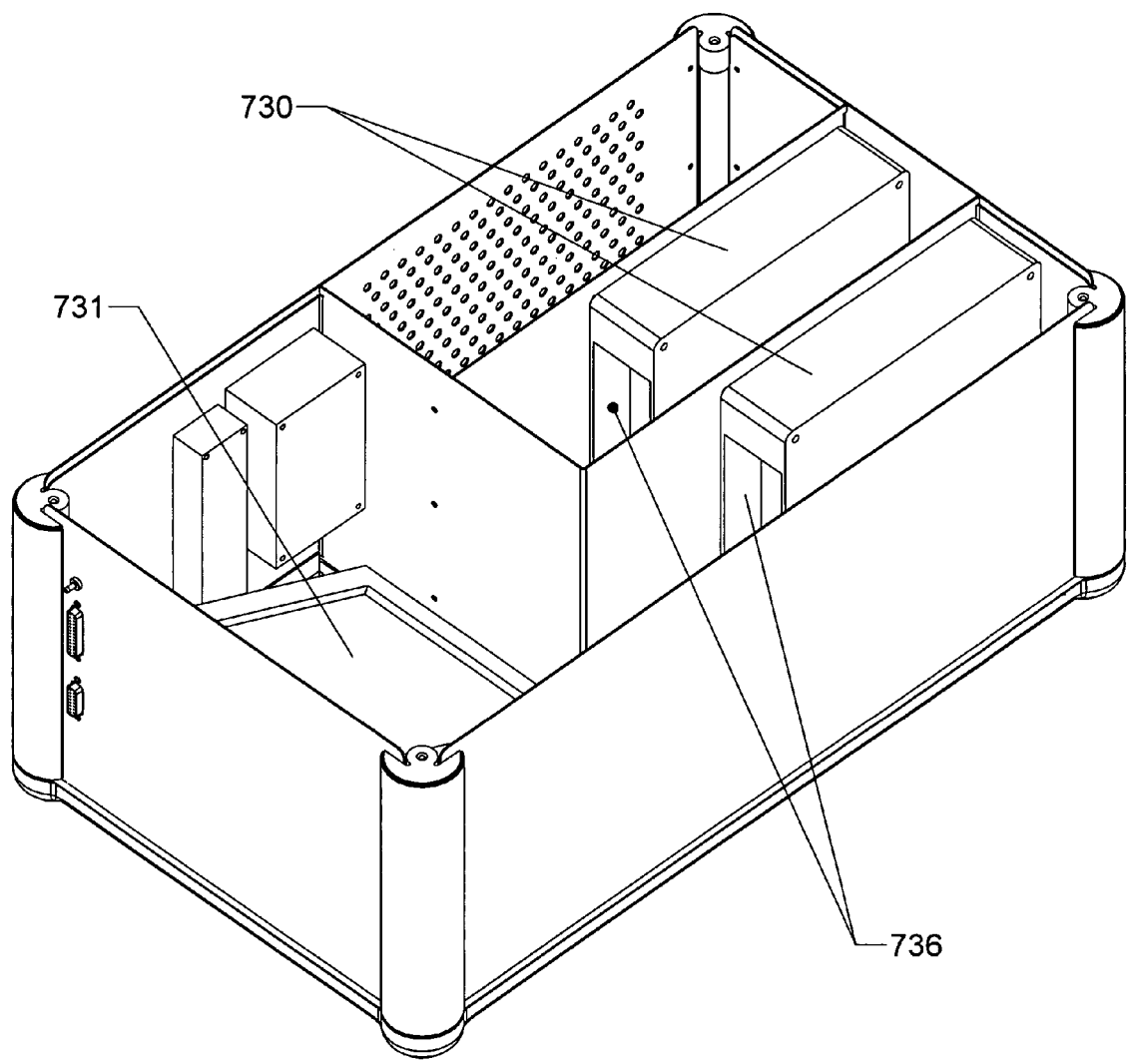
FIG. 36 is an isometric view of an supply air blower enclosure.

Specific airflow unit and animal containment cage airflow embodiments are shown in FIGS. 36, 37, 38 and 39. FIG. 36 is an isometric view of an supply air blower enclosure. Blowers (730) are mounted in the assembly in series. In this arrangement, air leaving exhaust port (736) of one blower is the intake air for the second blower. An advantage of this in-series configuration is the system pressure is additive for each blower.

Figure 37:
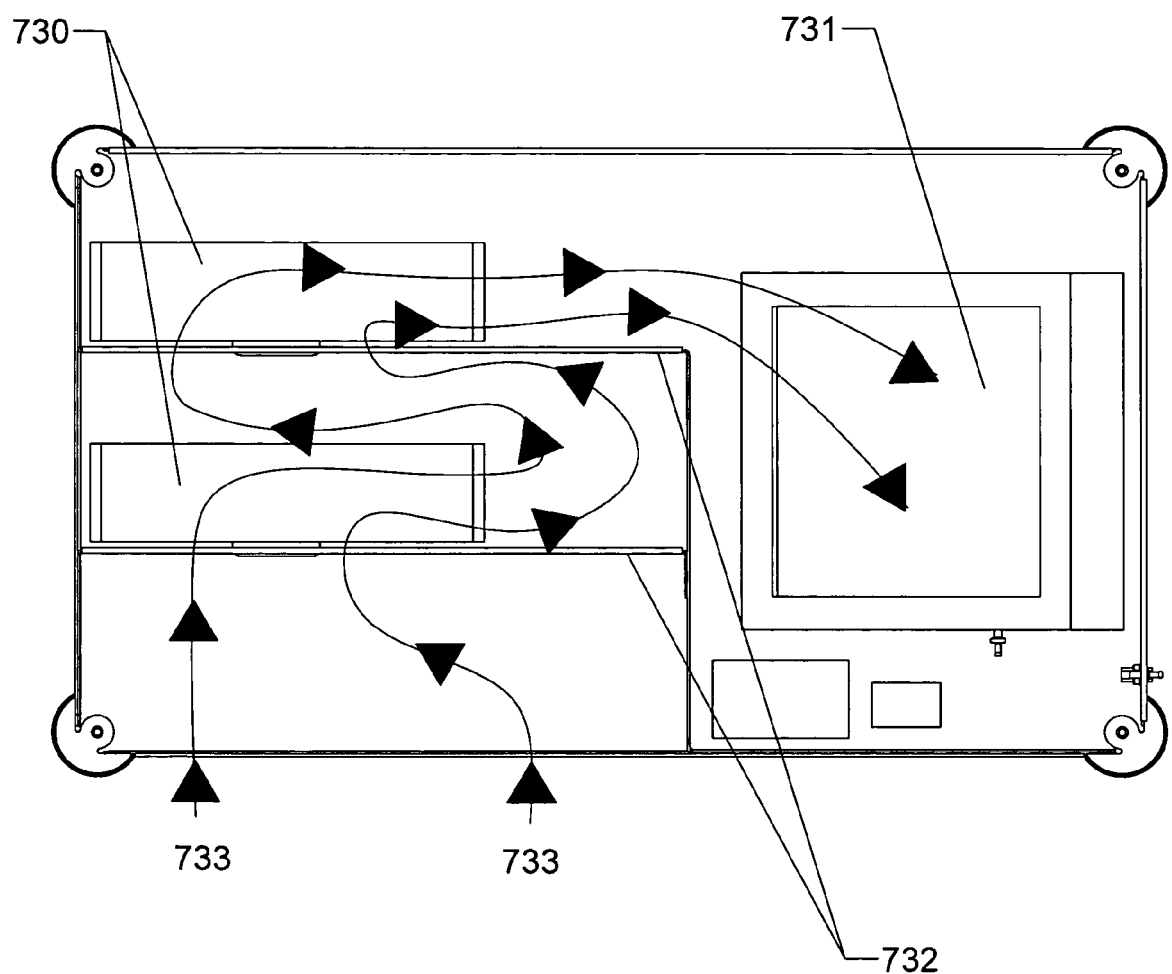
FIG. 37 is a top view of a supply blower showing airflow path.

FIG. 37 is a top view of a supply blower embodiment and shows airflow path. Air (733) enters through the side of the blower assembly. The air flows past a 90 degree bend due to the shape of the blower housing, and brackets (732) direct airflow into the intake of the next blower in series. Air then flows past another 90 degree bend through the second blower and is directed into filter assembly (731).

Figure 38:
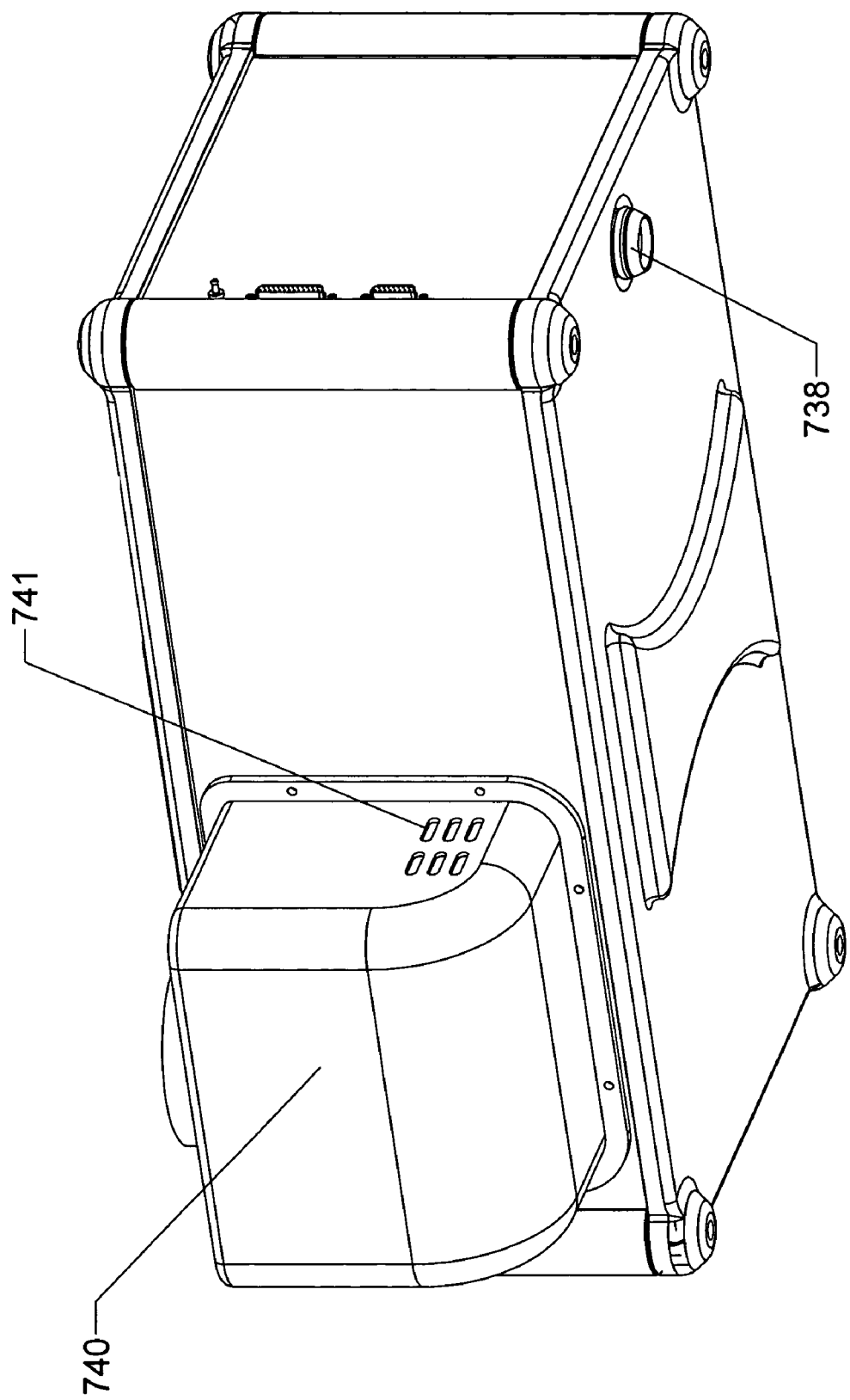
FIG. 38 is a bottom isometric view of an exhaust blower.

FIG. 38 is a bottom isometric view of an exhaust blower embodiment. The supply and exhaust blowers are identical except the blowers are mounted on the flip side of bracket (732) for the exhaust blower. Air flows through a connector (738) which couples onto a rack module in the same fashion the module connects to another module. Mixing box (740) is attached to the exhaust of the blower assembly. This is an optional assembly that allows the user to couple the exhaust air to a HVAC system. Rather than connecting the HVAC directly to the blower enclosure it is connected to the mixing box. Slots (741), which can be of any geometry suitable for airflow, allow excess airflow caused by the HVAC system to flow through the mixing box rather than alter the flow generated by the exhaust blower. The flow in an HVAC system generally is variable and generally is far higher than flow provided by an exhaust blower provided herein. Mixing box (740) renders HVAC airflow constant or substantially constant as excess negative pressure provided by the HVAC pulls air through slots (741) instead of through the exhaust blower unit. The flow generated by the exhaust blower mixes in the box and enters the HVAC system. This method prevents odors from entering the room, and offers control of the rack airflow. Mixing box (740) may include a sliding cover that can be positioned to partially cover slots (741) so that the mixing box may be adapted to different HVAC systems. Airflow streamers also may be positioned near slots (741) to indicated in which direction air is flowing (e.g., as the intended flow direction is inward, streamers can be utilized for any troubleshooting). The flow in both blowers in some embodiments is under constant control via a microprocessor that regulates flow.

Figure 39:
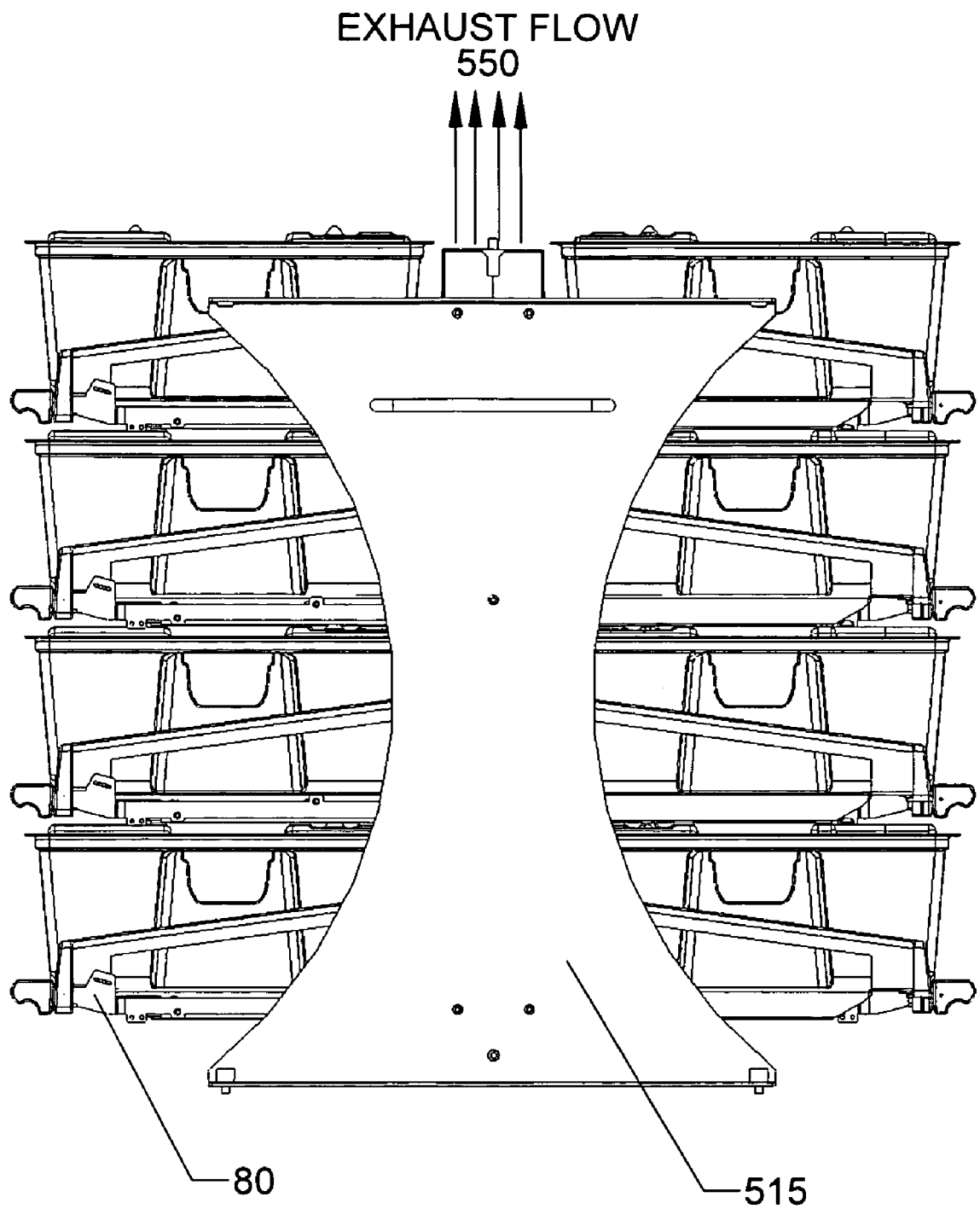
FIG. 39 is a side view of a module assembly depicting exhaust airflow.

FIG. 39 is a side view of a module assembly. Exhaust flow (550) can be attached to an HVAC system and/or an exhaust blower. In embodiments where a rack system is utilized in positive pressure mode some airflow can exit cages via an exhaust array covered by a filter. A large portion of this flow can be scavenged by the rack module plenum. Slots (550) in FIG. 26 exhaust air from cage exhaust arrays into the plenum. A fitting on the top of the rack couples this flow to an HVAC system. This connection is optional and not required when operating at neutral or negative pressures.

An airflow system sometimes comprises a controller or is linked to a controller. For example, in certain embodiments blower assemblies can comprise two or more fans, a fan motor driving each fan, a fan speed controller in connection with each fan motor, and one or more external air pressure sensors in connection with the fan speed controller. The assembly often comprises a user interface featuring readouts of certain features of the blower (e.g., speed of each fan (rpm)) and user control of blower components (e.g., speed of each fan). Air pressure sensors are located in any convenient portion of an animal containment system for measuring air pressure, such as in an air supply conduit, air exhaust conduit or cage, for example. One or more signals corresponding to air pressure are forwarded to the fan speed controller in a period of time (e.g., one signal per 100 milliseconds) and the controller increases or decreases the speed of one or more fan motors and thereby adjusts the air pressure to a set level. The fan speed controller may reduce or increase the speed of one or more fans, or all fans, and may cut off power to one or more fans for a period of time to adjust air pressure generated by the assembly. The blower assembly often includes one or more fan speed sensors that communicate one or more fan speed signals to the fan speed controller in a period of time (e.g., one signal per 100 milliseconds). A controller also may be utilized to control airflow from two or more blower assemblies, and thereby control such airflow parameters such as airflow rate, differential pressure and air exchange rate. In the latter embodiments, the controller may control (a) air output from one or more air supply blower assemblies and (b) air exhaust one or more air exhaust blower assemblies. The use may use the controller to utilize an air supply blower or air exhaust blower exclusively, or balance the output of an air supply blower and air exhaust blower. The controller may be connected to the blowers via one or more cables or one or more wireless transceivers, for example.

Figure 40:
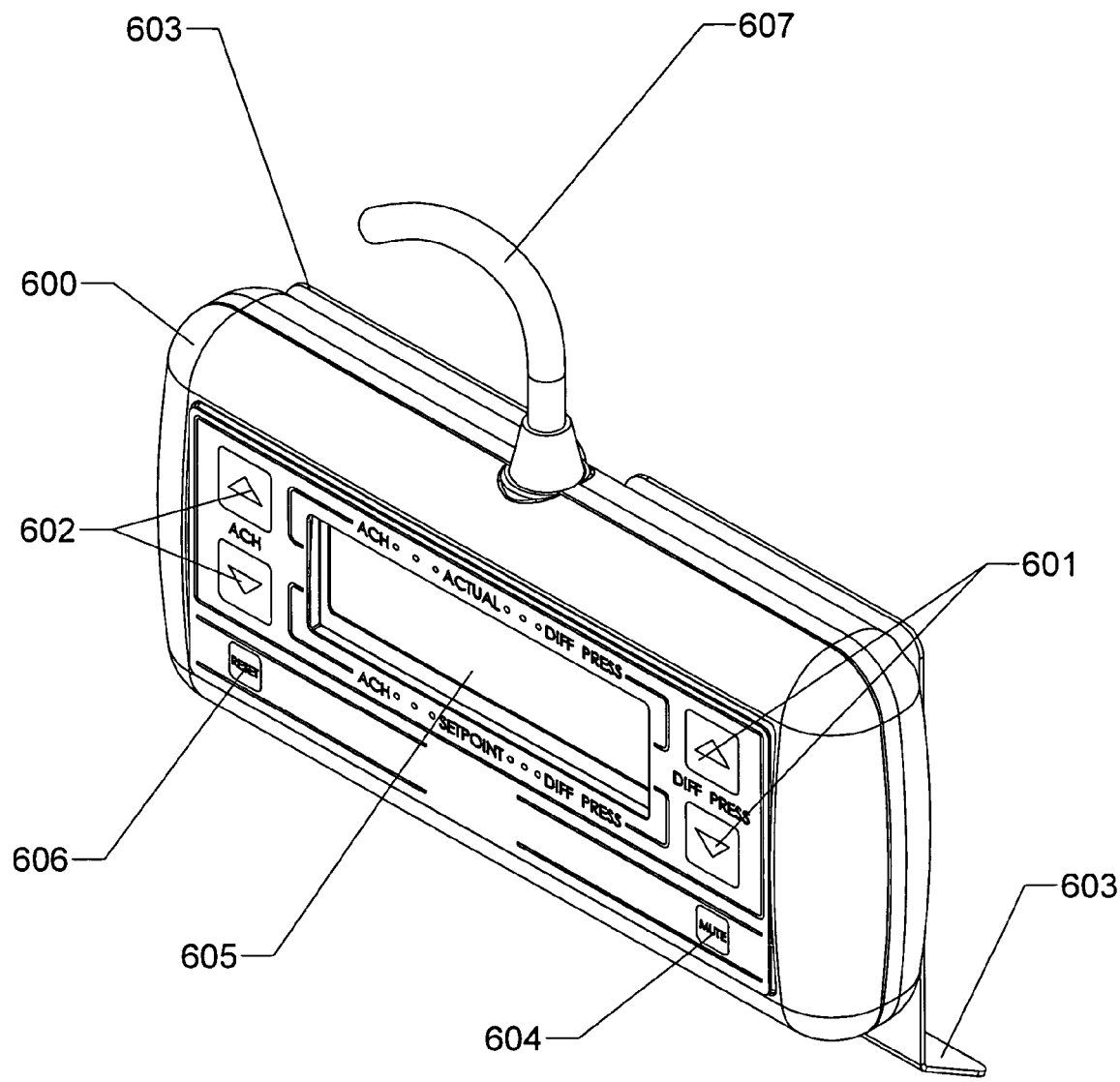
FIG. 40 and FIG. 41 show a controller embodiment.
Figure 41:
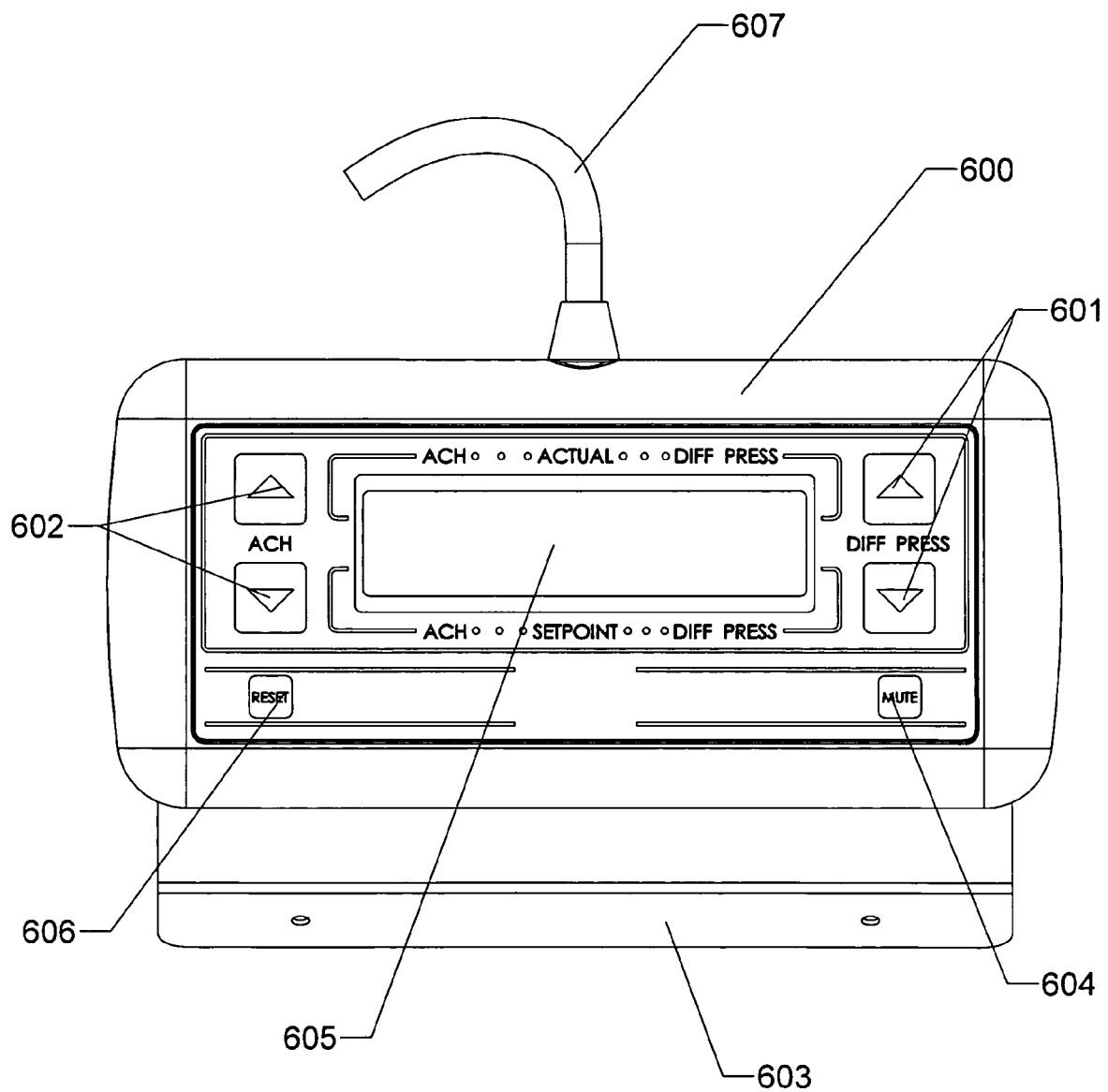
Figure 42A:
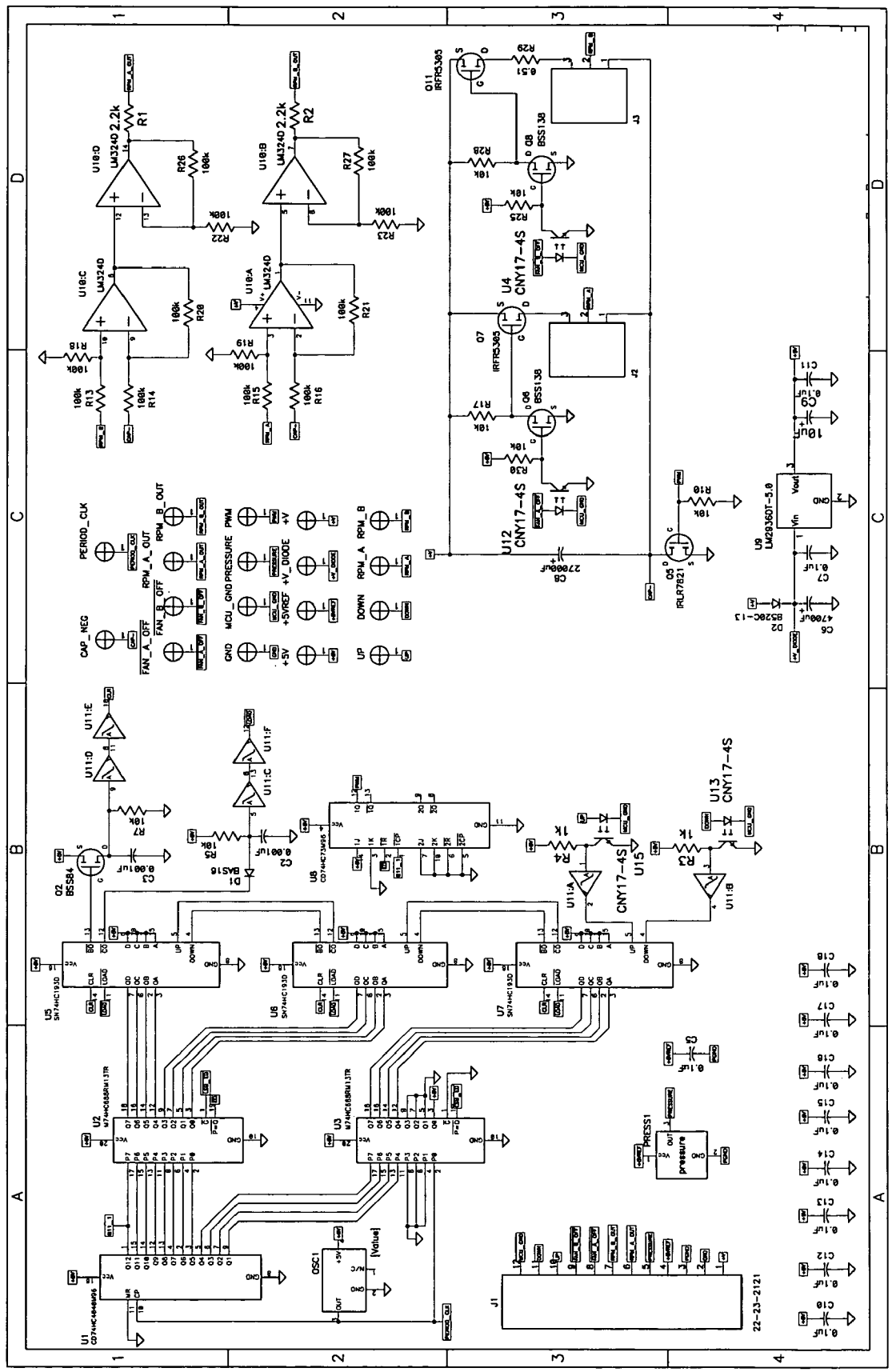
FIG. 42A and FIG. 42B show wiring diagram embodiments for a blower control module embodiments.
Figure 42B:
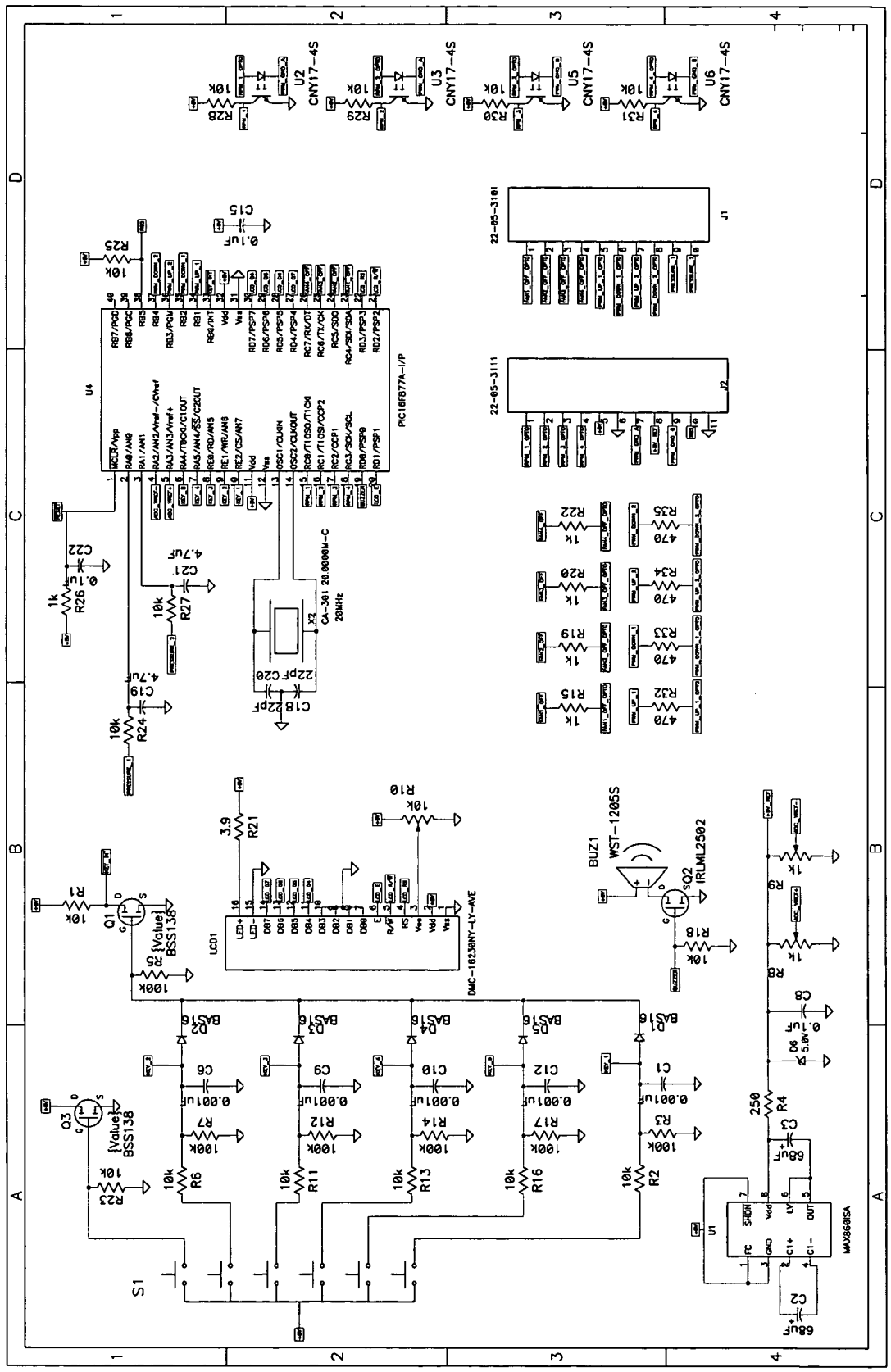
Figure 43A:
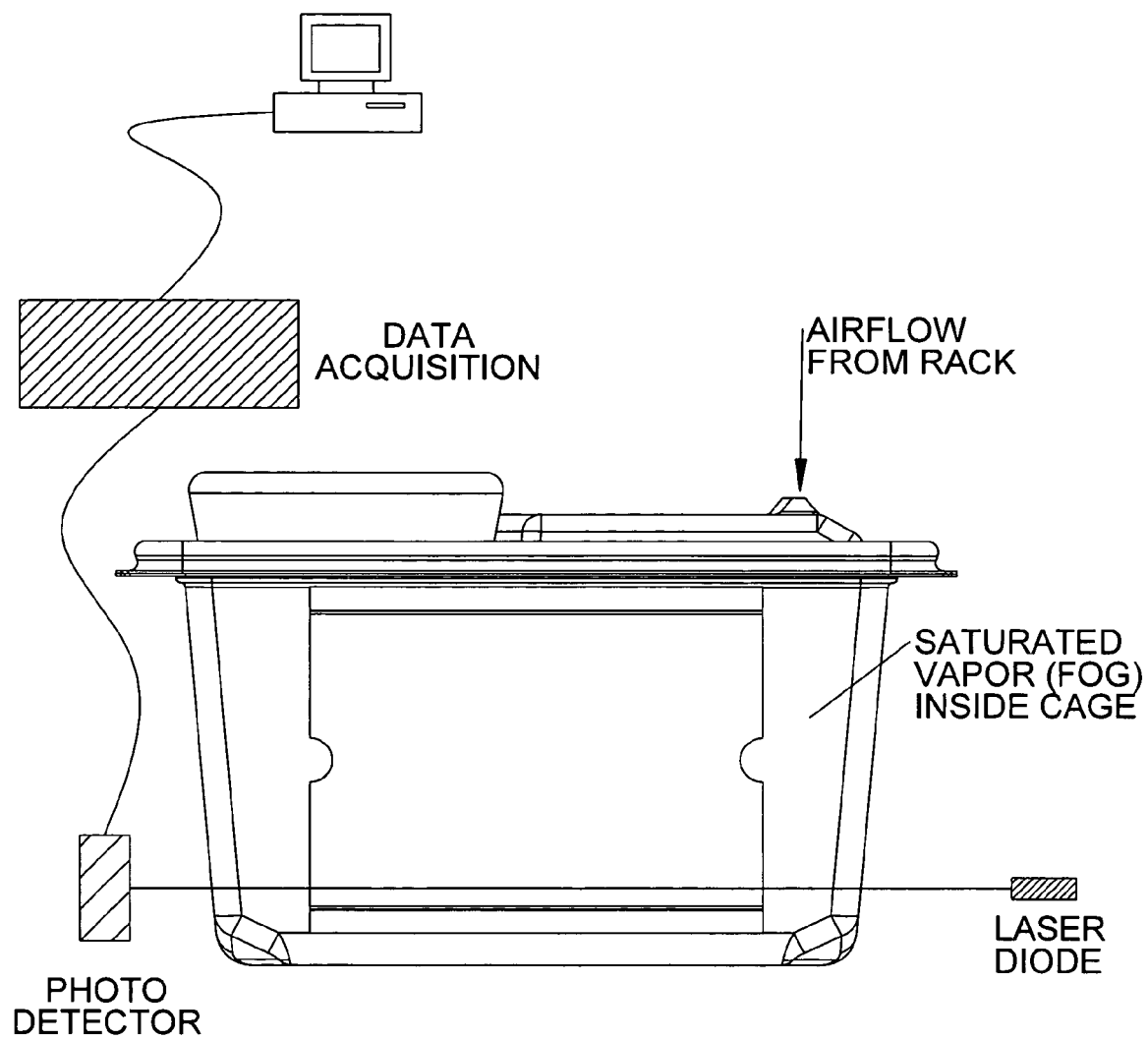
FIG. 43A and FIG. 43B show systems for monitoring cage parameters such as airflow, air exchange and temperature regulation.
Figure 43B:
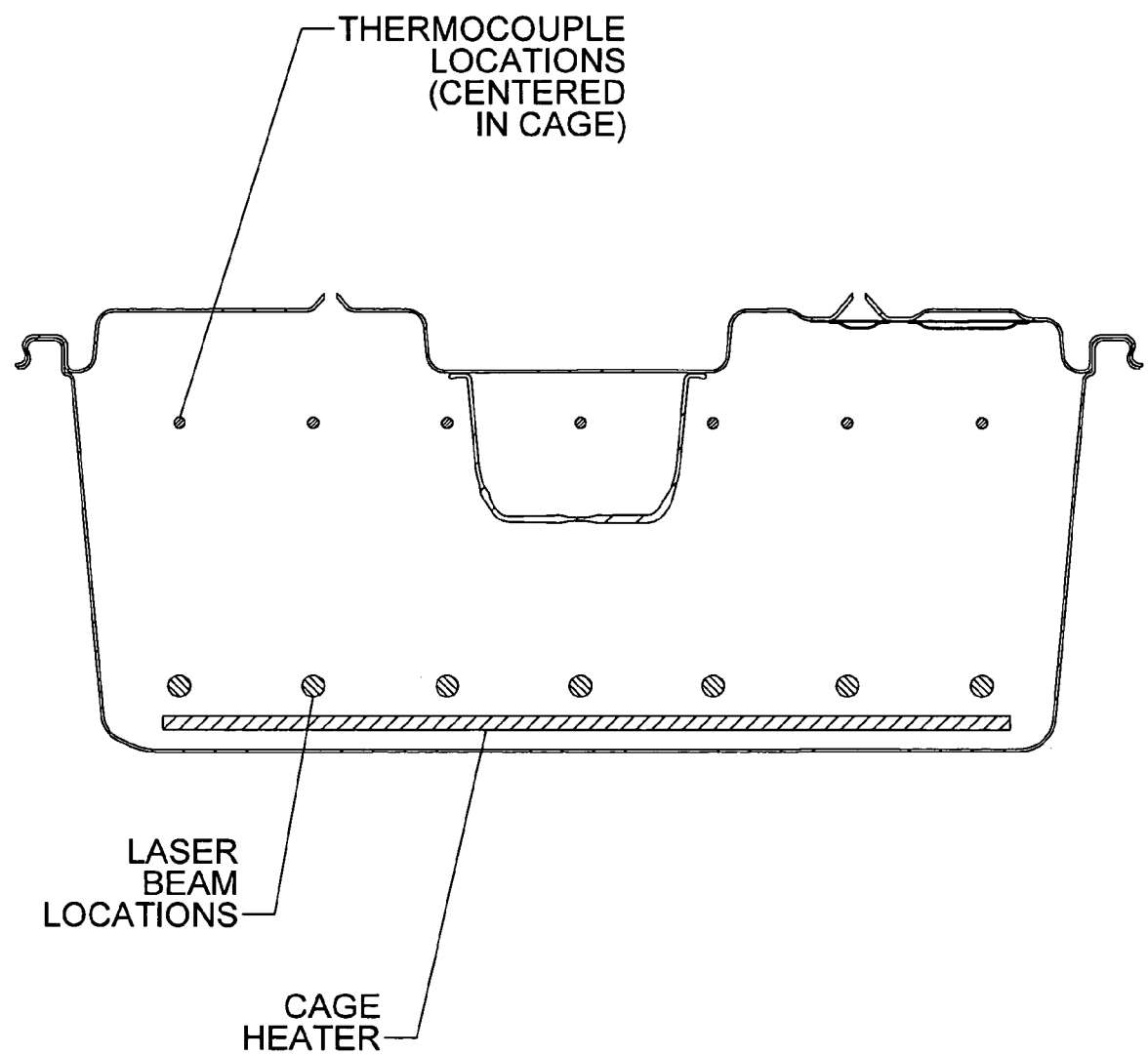

Controller circuitry and software can be contained within a control unit. FIG. 40 is an isometric view of the controller assembly embodiment. Plastic housing (600) is shown clipped onto a metal bracket (603) that can be attached to a convenient location on a rack module. Optional cable (607) allows electrical signals to pass between the controller and the blower enclosures. Cable (607) generally is not included when the controller assembly communicates via wireless transceivers. The controller can be utilized by the user to select the desired ACH or airflow via buttons (602). The user can also select the desired differential pressure via buttons (601). The controller displays the setpoint and actual values in real time on a LCD display (605). The controller communicates to both supply and exhaust blowers to sense their speed and pressures to equal the desired setpoint. The controller also can identify failures such as leaks and/or blower failures. Button (604) is a mute button to silence an audible alarm. The controller can be programmed to sound an alarm when a parameter, such as airflow or air pressure, deviates at a specified increment from the set point. Button (605) is a reset button to reset the circuitry and clear any alarms. FIG. 41 is a front view of the same controller. Approximate dimensions in certain embodiments are 9" width×4.5" height×1" depth. FIG. 42A and FIG. 43B show wiring diagram embodiments of a controller module embodiment.

Following are examples of controller components and parameters for use with an animal containment system.

1. Software a. PIC Setup: PIC peripherals include an AD converter, timer1 (internal), and timer0 (internal). The A/D is setup for dual voltage references and a conversion clock appropriate for 20 MHz. Otherwise, all the I/O ports are set as I/O ports.

b. Control Algorithm: The control algorithm samples the pressure signals approximately every 100 ms. This value is compared to the current setpoint (calc_setpoints), and if it is lower or higher the blower speed is increased or decreased to move the actual pressure to the desired pressure. If the control algorithm operated at the full speed of the PIC CPU, the duty cycle would swing wildly from 100% to 0%. To prevent this from happening, intentional delays are introduced in the control algorithm to slow its response rate. The length of these delays varies depending on how far away the current pressure is from the desired pressure, and where the desired pressure is in an absolute sense (high end or low end). The three stages are: (a) very far away from the setpoint: change the duty cycle rapidly; (b) near the setpoint: change the duty cycle slowly; (c) at the setpoint: change the duty cycle rapidly, but limit the change to +−0.02%. The distance thresholds are different depending on if the setpoint is a high pressure or a low pressure, to account for the non-linear duty-cycle to pressure relationship. All thresholds are in counts (not including the zero offset) and located as defines in the beginning of the code. Anytime the setpoint is changed, fan_onoff( ) and startup_fans( ) are both executed.

c. LCD Control: The LCD is initialized at startup in a standard fashion, as indicated in the datasheet. The 4 bit interface is used, without the cursor or blinking character, to prevent shadows during updates. After startup, there is really only one lcd function, which is put_lcd_byte, and its copy for interrupt use put_lcd_byte_INT. All lcd string, int, and char printing functions use this function to talk to the lcd.

d. User Interface: Any keypress generates an interrupt which tells the pic to vector to the ISR. The keypress ISR determines which key was pressed, then updates the ACH and DP (whichever is appropriate), and then immediately updates the LCD with the new ACH and DP. If the buzzer snooze key was pressed, the snooze is reset (if the buzzer is active), and the LCD is NOT updated.

e. RPM Verification: Each blower is sequentially checked for a valid RPM signal, every 100 ms. Ignored and bad blowers are not checked for a valid RPM signal. If a blower is checked for an RPM signal and it has an invalid or no RPM signal, it is immediately shut off, and fan_onoff( ) and startup_fans( ) is executed to start up an alternate blower if appropriate (and available).

f. Auto Zero: At startup, all blowers are shutdown, and a 15 second timer is started. At the end of 15 seconds, the firmware assumes the pressure inside each manifold has reached ambient. Any voltage from the pressure sensors can be interpreted as a zero-offset. The PIC reads this offset, stores it, and applies it to all future pressure sensor readings. This offset is erased at every reset.

g. Function descriptions:

vided. The LCD data lines connect directly to the PIC I/O port lines. The LCD contrast is controlled via R10. The lcd backlight voltage is dropped from 12V to nominal via R4. Both PWM controller boards can be interfaced, and all control lines from both controller boards connect directly to the PIC CPU I/O ports. Output of both pressure sensors can be filtered and voltage references can be provided. A 5V shunt type voltage reference (D6) provides two stable references to the PIC ADC converter, and powers both pressure sensors. Ports R8 and R9 allow adjustment of the voltage references, nominally set to 2.5V and 0.45V, respectively. Keypad input and interrupt can be provided, and the output of 5 switches (keys) is debounced and connected individually to the PIC I/O ports. The output of all 5 keys is OR'd together via diodes and along with Q1 generates a keyboard-interrupt.

3. PWM Controller Board

The controller board often has the following functions: (i) increase or decrease blower speed in response to requests from the PIC CPU; (ii) allow one or both blowers to be disconnected from power; (iii) condition the tachometer output of each blower for transmission to the PIC CPU; and (iv) provide a physical and electrical mounting point for a pressure sensor.

a. Variable PWM Blower Controller: the controller board is designed to control two blowers simultaneously. A large

| Function | Description |
| --- | --- |
| void ad_sample ( void ) | performs a single ADC conversion using the current ADC channel |
| void put_lcd_byte ( unsigned char lcd_byte ) | writes a byte to the LCD using the current register |
| void put_lcd_byte_INT ( unsigned char lcd_byte ) | identical to put_lcd_bytes( ), but a copy is required for use in the interrupt service routine |
| void update_display_INT(void) | updates just the ACH and DP setpoints on the display |
| void lcd_init( void ) | initializes the LCD, runs only once at startup |
| void lcd_print_string ( const char* ) | prints a zero terminated string |
| void lcd_print_char ( unsigned char ) | prints a single byte |
| void lcd_print_int ( unsigned int ) | prints an unsigned integer. 4 digits, all leading zeros converted to spaces |
| void lcd_address ( unsigned char ) | moves the lcd cursor to the specified locations. Top line is 0 through 15, bottom is 16 through 31 |
| void calc_setpoints ( void ) | calculates the current setpoints in counts using the selected ACH and DP |
| void keypress ( void ) | in/decrements ACH and DP depending on the key pressed, or performs buzzer snooze function |
| void calc_actual ( void ) | calculates the actual ACH and DP |
| void check_rpm ( unsigned char rpm_ch ) | checks the currently selected fan (rpm_ch) rpm for validity and updates fan failure flag if bad |
| void update_display ( void ) | completely updates the LCD display including actual/set ACH and DP, and alarm indicators |
| void startup_fans ( void ) | resets the PWM to a default value and waits for all non-ignored/non-bad fans to start |
| void fan_onoff ( void ) | determines which fans should be on and which should be off based on which fans are bad, ignored, +/−100% modes, and positive only mode |
| void auto_zero ( void ) | runs at startup only. Determines pressure sensor offset by shutting off all fans, waiting, and storing the value |

2. MCU Board

The MCU board can have the following functions: (i) interface to the LCD and provide contrast control and backlight power; (ii) interface to both PWM controller boards; (ii) filter the output of both pressure sensors and provide voltage reference; and (iv) keypad input and interrupt. The LCD can be interfaced and contrast control and backlight power is proresistor is connected in series with one of the blowers to create an approximately 100 rpm speed difference at all times between the two blowers to prevent audible beat frequencies. The voltage across the blowers (and thus their speed) is varied using a filtered-PWM technique. A variable duty-cycle square wave with 12 bit resolution is generated as follows: (i) U5 and U8 are used as a 12 bit equity comparator; (ii) U3, U7, and U11 form a 12 bit up/down counter whose output is clocked up or down by the PIC CPU (PWM increase/decrease); (iii) the comparator constantly compares a continuously running 12 bit counter (U4) with the U3/U7/U11 counter; (iv) when the two counters are equal, the output pulse goes to a flip-flop (U6), which outputs the variable duty-cycle square wave; (v) the duty cycle varies because the output of the U3/U7/U11 counter is controlled by the PIC CPU, and therefore the point when the two counters is equal (and the flip flop toggles) is controlled by the PIC CPU; (vi) the PWM output of the flip flop is fed to the main switching mosfet (Q4) which the blowers are connected in series with. A large capacitor (C2) in parallel with the blowers filters the PWM output to reduce audible hum at the PWM frequency, and to prevent the blower tachometer signal from becoming corrupted with PWM variations; (vii) OSC1 determines the fundamental frequency of the PWM signal. At 1 MHz, it is 1/(4096*1 uS)=244 Hz; (viii) Q2, D1, and their associated passives are used to prevent the U3/U7/U11 counter from rolling over at 0 and 4096; and (ix) the 12 bit resolution of the PWM circuit allows the PIC CPU to change the duty cycle in 0.02% increments.

b. Blower Power Control: Each blower can be independently disconnected from the power supply. This function is required to allow the PIC CPU to disconnect a non-functioning blower, to use only one blower for very low pressure settings, or to shut off both blowers if a +100% or −100% differential pressure setting is selected by the user. Q1, Q3, Q5, Q6 and their associated resistors form a normally-open, active-high switch which can be controlled via logic levels from the PIC CPU.

c. Tachometer Signal Conditioning: Since both blowers are essentially floating with respect to ground, their tachometer output measured relative to ground will be corrupted with very large voltage transients resulting from the difference in voltage between the negative side of C2 and ground. U1 is used as a differential amplifier, which converts the floating TACH+/CAP− tachometer signal to a single-ended, ground referenced tachometer signal without transients.

d. Pressure Sensor: Mounting holes for the pressure sensor are provided, as well as a bypass capacitor and a pcb footprint for an optional rc filter. The power, ground, and signal output lines for the pressure sensor are completely isolated from the rest of the PCM controller circuit and layout.

Thus, provided in certain embodiments are animal containment system blowers comprising two or more fans, a fan motor driving each fan, a fan speed controller in connection with each fan motor, and one or more air pressure or airflow sensors in connection with the fan speed controller. In such embodiments, the controller sometimes increases or decreases the speed of one or more fan motors and adjusts the air pressure to a set level and/or the airflow to a set level based upon one or more signals from the one or more sensors corresponding to air pressure or airflow. The fans in the blower sometimes are oriented in series.

Provided also herein are methods for adjusting air pressure or airflow in an animal containment cage to a set level, which comprise sensing air pressure or airflow in the animal containment cage unit or an air conduit connected thereto, and increasing or decreasing the speed of one or more fan motors in a blower assembly comprising two or more fans and a fan motor separately driving each fan until the air pressure or airflow reaches the set level. In certain embodiments, the two or more fans are in series.

Provided also is a controller that regulates airflow or air pressure in an animal containment system comprising a user interface and a processor, where the user interface comprises an air pressure and/or airflow setpoint input function; and the processor generates a fan speed signal for one or more blowers based on the setpoint and an airflow or air pressure signal from one or more sensors in the animal containment system. The controller sometimes is connected directly (e.g., by wire or cable) to the one or more blowers, and it sometimes is in wireless communication with the one or more blowers. The controller sometimes is connected directly (e.g., by wire or cable) to the one or more sensors, and it sometimes is in wireless communication with the one or more sensors.

Airflow

Ventilated cages flush contaminated air and heat that accumulates in the cage due to one or more contained animals. One approach is introducing large flow rates in hopes to keep the cage bedding dry and to evacuate ammonia and other gases. Some approaches, however, allow for large areas of recirculation or bypass. The latter approaches can allow dirty air to re-circulate without exiting the cage for several minutes.

Cages provided herein allow for transverse cage airflow designed to minimize air recirculation and bypass, thereby providing efficient use of airflow for air exchange and temperature regulation. In some embodiments, provided is an animal containment cage comprising a cover and a base, where the cover comprises an air inlet and an air exit, a baffle between the air inlet and air exit that extends downwards into the interior of the cage, and air flows downward from the inlet, through the cage interior and out the exhaust exit. In certain embodiments, air flows in a substantially U-shaped pattern, and sometimes the cage comprises nesting material for an animal and air flows in proximity to or through the nesting material. The air inlet sometimes is at substantially one end of the cover and the air exhaust exit is at substantially the end of the cover. The air inlet sometimes comprises an air supply connector, and the air exhaust exit sometimes comprises an array of apertures and/or one or more air exhaust connectors. The baffle sometimes extends from one wall of the cage to the opposite wall, and sometimes is one or more surfaces of a feeding tray. The baffle often is in effective sealing connection with two walls of a cage (e.g., a feeding trough resting on two cradles, one in each of two opposing sidewalls) to prevent or substantially reduce airflow around baffle sides and permit airflow under the baffle.

Airflow, differential pressure and air-exchange rates can be evaluated in a variety of manners. Described hereafter is an example of a test procedure that can be utilized to measure effectiveness of the cage airflow for various cage systems. An optical apparatus shown in FIG. 43A and FIG. 43B is prepared and utilized to quantify the ability of a cage to clear saturated water droplets or fog. A flexible heater is placed on top of the bedding material to simulate the heat load of one or more caged animals, such as five (5) mice. With external airflow to the system turned off (e.g., airflow from a rack is turned off), saturated fog is injected into the cage. A laser is positioned in a first beam location selected from one or more beam locations, as shown in FIG. 43A. The heater, laser, and photodetector then are turned on. Next the data acquisition system records data when the airflow system is turned on (e.g., airflow from a rack to the cage is established). A computer converts photodetector signal into a strip chart of laser power (e.g., light intensity at the detector) versus time. When the initial amount of fog is present the photodetector reads a low laser power or light intensity due to the majority of the laser light being scattered away by the fog. After the cage airflow begins and clears fog the photodetector reads an increasingly higher laser power or light intensity due to the reduction in fog concentration. The rate at which the measured laser intensity increases is related to the cage airflow and air exchange effectiveness. Systems may provide an air exchange rate of about 60 exchanges per hour, about 50 exchanges per hour, about 45 exchanges per hour, about 40 exchanges per hour, about 35 exchanges per hour, about 30 exchanges per hour, about 25 exchanges per hour, about 20 exchanges per hour, about 15 exchanges per hour, about 10 exchanges per hour, or about 5 exchanges per hour.

Temperature regulation efficiency in cages may be linked to airflow parameters. Temperature readings can be acquisitioned from one or more thermocouples placed in the upper half of the cage (e.g., FIG. 43B). Temperature readings can be simultaneously acquisitioned while airflow and air exchange rates are determined. The ability of the system to remove hot air is related to the amount and the effectiveness of the cage airflow. If the air re-circulates or bypasses certain parts of the cage, the system will experience a higher temperature.

The same procedure can be repeated at multiple points along the side of the cage. The time constants can be averaged to determine effectiveness of airflow, air exchange and temperature regulation. These measurements can be acquisitioned for different types of cages to determine the proper airflow rate or select the best cage for a particular application.

Animal Containment Systems

A component described above can be combined with one or more other components described herein and/or with one or more other components utilized in an animal containment facility. For example, an animal containment system sometimes comprises one or more of the following: one or more cages (e.g., cage base member, cover member and insert member); one or more rack units each comprising one or more rack modules; one or more airflow assemblies (e.g., an air supply blower and/or an air exhaust blower); and one or more detection, monitoring or sensing devices. In some embodiments, air is provided to cages by a central airflow system in an animal containment facility, and sometimes air is provided by an airflow system described herein (e.g., an airflow assembly joined to the top of a rack).

Figure 44:
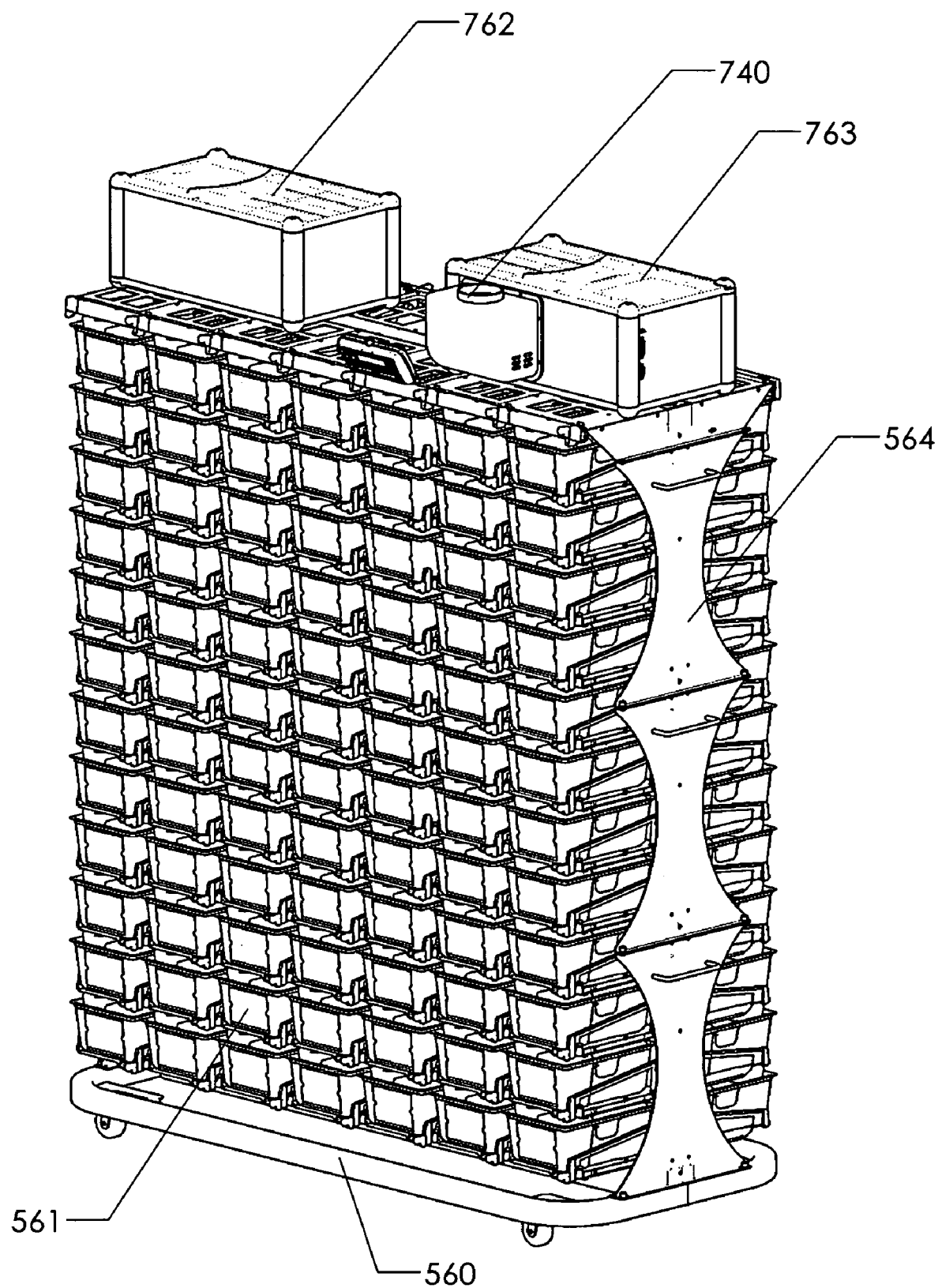
FIG. 44 is an isometric view of an entire system assembly embodiment with three rack modules.

FIG. 44 is an isometric view of a system assembly embodiment with three rack modules. A tram assembly (560) allows for a mobile rack system. The base member of the tram assembly (560) also restricts airflow of the bottom most module. Each module (564) stores multiple cage assemblies (561). Ventilation is provided by a supply blower (762), air is exhausted from cages via an exhaust blower (763), which can be coupled to an optional mixing box (740).

Processes for Constructing and Using Animal Containment Systems

Provided are processes for constructing animal containment systems and using components described herein. In an embodiment, provided is a process for replacing a cage in an animal containment system, which comprises: (a) removing a used cage that contains an animal from an animal containment system comprising one or more cages, (b) transferring the animal to an unused cage, or placing an animal not formerly housed in the system in an unused cage, (c) placing the unused cage in the containment system, and (d) repeating steps (a) to (c) within a period of time. In some embodiments, provided are processes for replacing a cage in an animal containment system, which comprise: (a) removing a cage that contains an animal from an animal containment system comprising one or more cages, (b) transferring the animal to a single-use cage, or placing an animal not formerly housed in the system in a single-use cage, (c) placing the single-use cage in the containment system, and (d) repeating steps (a) to (c) within a period of time. In some embodiments, the period of time is 180 days or less, 150 days or less, 120 days of less, 90 days or less, 60 days or less, 30 days or less, or 29, 28, 27, 26, 25, 24, 23, 22, 21, 20, 19, 18, 17, 16, 15, 14, 13, 12, 11, 10, 9, 8, 7, 6, 5, 4, 3, or 2 days or less, or 1 day. Steps (a) to (c) often are repeated by continuously replacing cages only with unused, single-use cages and without replacing used cages with sterilized and/or washed cages that were formerly used to contain an animal. Each used, single-use cage often is disposed of without washing or sterilizing it or re-using it to contain an animal. The cage sometimes comprises a cage base, a cover member and an optional insert member. Often, all components of a cage (e.g., cage base, cover member, food tray) are unused before they are contacted with an animal. An unused, single-use cage often is comprised of newly manufactured components, components not washed in an animal containment facility, components not sterilized in an animal containment facility, and components that are not re-used. An unused, single-use cage typically never before contained an animal, and an animal generally never was placed into it. A used cage often is removed from a rack unit in the system, often a rack unit comprising modules described herein, and an unused, single-use cage often is placed in the same position in the rack unit from which the used cage was removed. In some embodiments, the animal containment system comprises one or more rack units, one or more rack modules, one or more cage detection system members and/or one or more airflow system members.

Certain embodiments include processes for replacing a cage in an animal containment system, which comprise: (a) removing a cage that contains an animal from an animal containment system comprising one or more cages, (b) transferring the animal to an unused single-use cage, (c) placing the single-use cage of step (b) in the containment system, and (d) repeating steps (a) to (c) within 30 days or less. In certain embodiments, steps (a) to (c) are repeated within 14 days or less; an animal never is or was placed in the unused, single-use cage unit before step (b); steps (a) to (c) are repeated continuously until the death of the animal; steps (a) to (c) are repeated continuously; the cage removed in step (a) is a single-use cage; and the cage removed in step (a) is disposed. In certain embodiments, the containment system is an animal husbandry containment system. Sometimes the walls of the single-use cage are constructed from a polymer and are about 0.01 inches to about 0.08 inches thick, or about 0.01 inches to about 0.05 inches thick, about 0.02 inches to about 0.06 inches or about 0.02 inches to about 0.03 inches thick.

Also provided is a process for assembling a detachable rack unit that receives animal containment cages, which comprises: connecting two or more rack modules to form a rack unit, where the rack modules are detachable. The rack modules sometimes are connected in a vertical orientation, sometimes connected in a horizontal orientation, and sometimes are connected vertically and horizontally. In some embodiments, the rack modules are connected without tools. One or more rack modules used to assemble a rack unit sometimes comprise a mounted structure that comprises a slidable member that can be reversibly associated with a cage and immobilize the cage on the rack module, embodiments of which are described herein.

Provided also is a process for cleansing a rack unit assembled from rack unit modules from an animal containment system, which comprises: disconnecting rack unit modules, washing each rack unit module, and connecting cleansed rack modules to assemble a cleansed rack unit. One or more cleansed rack modules sometimes are connected to one another and sometimes one or more cleansed rack mod ules are connected to unused rack modules (e.g., newly manufactured rack modules or rack modules that had not previously stored cages). In certain embodiments one or more washed rack modules are connected. In some embodiments, a rack unit is disconnected and connected for rack module cleansing on a periodic basis, such as every 180 days or less, 150 days or less, 120 days of less, 90 days or less, 60 days or less, or 30 days or less. Rack modules sometimes are disconnected and connected by hand without tools. Rack modules are cleansed using appropriate washing equipment and sometimes sterilizing equipment.

Provided also are process for assembling a modular rack unit for containing animal cages, which comprise: connecting two or more rack modules by joining rack unit modules by a connector, where the rack modules are detachable. In certain embodiments, the connector is connected without a tool.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, yet these modifications and improvements are within the scope and spirit of the invention.

The invention illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the invention claimed. The term "a" or "an" can refer to one of or a plurality of the elements it modifies (e.g., "a cage" can mean one or more cages) unless it is contextually clear either one of the elements or more than one of the elements is described. The term "about" as used herein refers to a value sometimes within 10% of the underlying parameter (i.e., plus or minus 10%), a value sometimes within 5% of the underlying parameter (i.e., plus or minus 5%), a value sometimes within 2.5% of the underlying parameter (i.e., plus or minus 2.5%), or a value sometimes within 1% of the underlying parameter (i.e., plus or minus 1%), and sometimes refers to the parameter with no variation. For example, a weight of "about 100 grams" can include weights between 90 grams and 110 grams. Thus, it should be understood that although the present invention has been specifically disclosed by representative embodiments and optional features, modification and variation of the concepts herein disclosed may be resorted to by those skilled in the art, and such modifications and variations are considered within the scope of this invention.

Embodiments of the invention are set forth in the claims which follow.

What is claimed is:

1. A free-standing rodent containment cage comprising a base and a cover, wherein:
    the cover and base are constructed from a polymer;
    the base comprises a wall or walls and a bottom;
    the wall or walls of the base are 0.01 to 0.03 inches thick;
    the cage is free-standing;
    the base or cover, or base and cover, have at least one corner or edge present in the interior of the cage, accessible to a rodent that can be contained in the cage, and defined by surfaces having an angle $\alpha$ is greater than 180 degrees and less than 360 degrees;
    all corners and edges of the base or cover, or base and cover, present in the interior of the cage, accessible to a rodent that can be contained in the cage, and defined by surfaces having said angle $\alpha$, have a minimum radius $\phi$;
    $\phi = 0.25/(\tan((\pi/360)(360-\alpha)))$; inches and
    $\alpha$ is measured in the cage interior.

2. The free-standing rodent containment cage of claim 1, which comprises a filter in effective connection with the cover.

3. The free-standing rodent containment cage of claim 2, which is ventilated and in effective connection with a blower.

4. The free-standing rodent containment cage of claim 2, which is ventilated and in effective connection with a vacuum.

5. The free-standing rodent containment cage of claim 2, which is ventilated and in effective connection with a blower and a vacuum.

6. The free-standing rodent containment cage of claim 2, which comprises a filter shield, wherein:
    the filter shield is between the interior of the cage and the filter, and
    the filter shield comprises a surface with apertures that is offset from the filter and covers the filter.

7. The free-standing rodent containment cage of claim 1, wherein the cage is free-standing in a rack.

8. The free-standing rodent containment cage of claim 7, wherein the cage is one of a plurality of free-standing cages in a rack.

9. The free-standing rodent containment cage of claim 1, wherein the polymer is polyethylene teraphthalate.

10. The free-standing rodent containment cage of claim 1, wherein the polymer is polyvinyl chloride.

11. The free-standing rodent containment cage of claim 1, wherein the polymer is polyethylene.

12. The free-standing rodent containment cage of claim 11, wherein the polymer is high-density polyethylene.

13. The free-standing rodent containment cage of claim 1, wherein the polymer is polyethylenefluoroethylene.

14. The free-standing rodent containment cage of claim 1, wherein the polymer is polystyrene.

15. The free-standing rodent containment cage of claim 14, wherein the polymer is high-density polystyrene.

16. The free-standing rodent containment cage of claim 1, wherein the polymer is an acrylnitrile butadiene styrene copolymer.

17. The free-standing rodent containment cage of claim 1, wherein the polymer is polypropylene.

18. The free-standing rodent containment cage of claim 1, wherein the cover and the wall or walls of the base are 0.01 to 0.02 inches thick.

* * * * *

UNITED STATES PATENT AND TRADEMARK OFFICE
CERTIFICATE OF CORRECTION

PATENT NO. : 7,527,020 B2  Page 1 of 1
APPLICATION NO. : 11/300664
DATED : May 5, 2009
INVENTOR(S) : Dee L. Conger et al.

It is certified that error appears in the above-identified patent and that said Letters Patent is hereby corrected as shown below:

Col. 48 in Claim 1, line 11, insert the word --which-- before the word "is".
Col. 48 in Claim 1, line 17, remove the word "inches" and insert it after the last parenthesis and before the semi-colon.

Signed and Sealed this

First Day of September, 2009

David J. Kappos
*Director of the United States Patent and Trademark Office*

UNITED STATES PATENT AND TRADEMARK OFFICE
Certificate

Patent No. 7,527,020 B2                                                          Patented: May 5, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dee L. Conger, La Jolla, CA (US); Thomas M. Perazzo, San Diego, CA (US); and Matthew D. d'Artenay, San Diego, CA (US).

Signed and Sealed this Twenty-sixth Day of June 2012.

JOSHUA J. MICHENER
*Supervisory Patent Examiner*
Art Unit 3635
Technology Center 3600